(12) United States Patent
Berteig et al.

(10) Patent No.: US 7,548,238 B2
(45) Date of Patent: Jun. 16, 2009

(54) COMPUTER GRAPHICS SHADER SYSTEMS AND METHODS

(75) Inventors: Rolf Berteig, Seattle, WA (US); Thomas Driemeyer, Berlin (DE); Martin-Karl LeFrancois, Berlin (DE); Rolf Herken, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 1 day.

(21) Appl. No.: 11/479,952

(22) Filed: Jun. 30, 2006

(65) Prior Publication Data

US 2007/0018980 A1   Jan. 25, 2007

Related U.S. Application Data

(60) Continuation-in-part of application No. 10/462,500, filed on Jun. 16, 2003, now Pat. No. 7,173,617, which is a division of application No. 10/232,069, filed on Aug. 30, 2002, now Pat. No. 6,606,092, which is a division of application No. 09/108,596, filed on Jul. 1, 1998, now Pat. No. 6,496,190.

(60) Provisional application No. 60/051,507, filed on Jul. 2, 1997.

(51) Int. Cl.
*G06T 15/00* (2006.01)

(52) U.S. Cl. .................. 345/426; 345/428; 345/503; 345/660

(58) Field of Classification Search ............... 345/426, 345/428, 419, 503, 660
See application file for complete search history.

(56) References Cited

U.S. PATENT DOCUMENTS

| 6,191,787 | B1 | 2/2001 | Lu |
| 6,215,495 | B1 | 4/2001 | Grantham |
| 6,478,735 | B1 | 11/2002 | Pope |
| 6,578,197 | B1 | 6/2003 | Peercy |
| 6,606,092 | B2 | 8/2003 | Driemeyer |
| 7,015,909 | B1 * | 3/2006 | Morgan, III et al. ......... 345/426 |
| 7,176,919 | B2 | 2/2007 | Driebin |
| 7,180,518 | B2 * | 2/2007 | Saito et al. .................. 345/505 |

FOREIGN PATENT DOCUMENTS

| EP | 0 528 631 | 2/1993 |
| WO | 95 06298 | 3/1995 |

OTHER PUBLICATIONS

Abram, Whitted, "Building Block Shaders", Computer Graphics, vol. 24, No. 4, Aug. 1990.
Whitted et al., "A Software Testbed for the Development of 3D Raster Graphics Systems," ACM Trans. Graphics, vol. 1, No. 1, Jan. 1982, pp. 43-58.

(Continued)

*Primary Examiner*—Phu K Nguyen
(74) *Attorney, Agent, or Firm*—Jacobs & Kim LLP; David Jacobs

(57) ABSTRACT

Methods and systems are described that unite various shading applications under a single language, enable the simple re-use and re-purposing of shaders, facilitate the design and construction of shaders without need for computer programming, and enable the graphical debugging of shaders.

33 Claims, 43 Drawing Sheets

OTHER PUBLICATIONS

Cook, "Shade Tree," Proc. Siggraph 1984, in: Computer Graphics, vol. 18, No. 3, Jul. 1984, pp. 223-231.

Perlin, "An Image Synthesizer," Proc. Siggraph 1985, in: Computer Graphics, vol. 19, No. 3, Jul. 1985, pp. 287-296.

Egbert et al., Application Graphics Modeling Support Through Object Orientation, Computer, vol. 25, No. 10, Oct. 1, 1992, pp. 84-91.

Doellner et al., "Object-oriented 3D Modelling, Animation and Interaction," J. Visualization and Computer Animation, Jan-Mar. 1997, vol. 18, No. 1, pp. 33-64.

Rost, et al., PEX: A Network-Transparent 3D Graphics System, IEEE Computer Graphics and Applications, vol. 9, No. 4, Jul. 1989, pp. 14-26.

Pixar, "The Renderman Interface," Version 3.1, Sep. 1989, section 12 "Shader Execution Environment," pp. 109-114.

\* cited by examiner

Wood Material Phenomenon 60

PHENOMENON EDITOR WINDOW 70

Dialog Canvas for Wood

Resulting Dialog for Wood

|        Node | % of shader |
|------------:|-------------|
|       Add 1 | 0.5         |
|       Add 2 | 0.5         |
|    Falloff 1| 11.5        |
|   Multiply 1| 1.0         |
|   Multiply 2| 1.0         |
|      Phong 1| 62.3        |
|  Reflection 1| 23.2       |

310

320

330

340

350

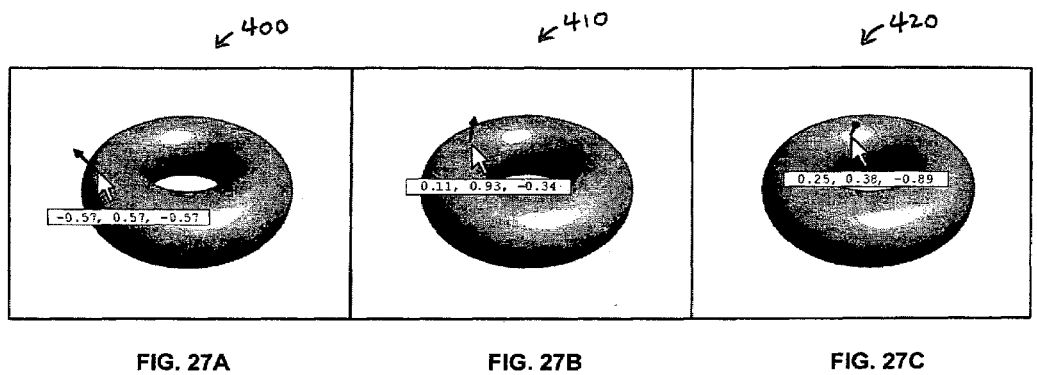
FIG. 27A    FIG. 27B    FIG. 27C
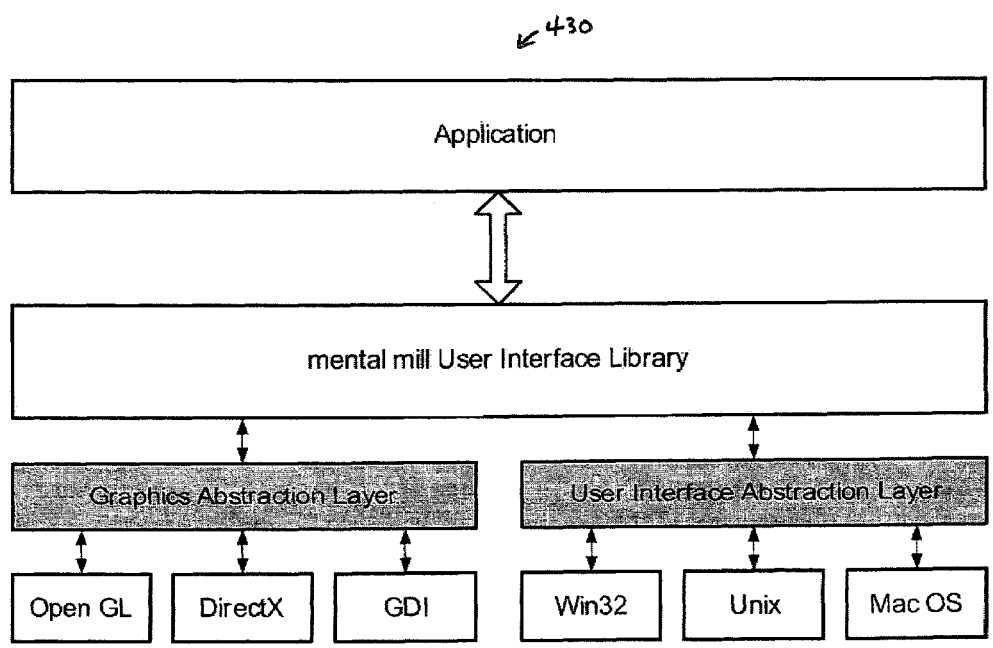
FIG. 28

| | |
|---|---|
| `Color eval_diffuse(`<br>`    Vector3 in_dir,`<br>`    Vector3 out_dir);` | Given an input and output direction, this method returns the light transport factor for diffuse reflectance. |
| `Color eval_glossy(`<br>`    Vector3 in_dir,`<br>`    Vector3 out_dir);` | Given an input and output direction, this method returns the light transport factor for glossy reflectance. Glossy reflections are oriented primarily in one direction, but some amount of scattering usually produces a blurry highlight. |
| `Color eval_specular(`<br>`    Vector3 in_dir,`<br>`    Int specular_component,`<br>`    out Vector3 out_dir,`<br>`    out Ray_type out_type);` | Given an input direction and the specular component index, this method computes the output direction for ideally specular reflection and stores the result in the out_dir parameter. It also stores the type of reflection in the out_type parameter and returns the transport factor for specular reflectance. |
| `Int specular_components();` | Returns the number of ideally specular components. |

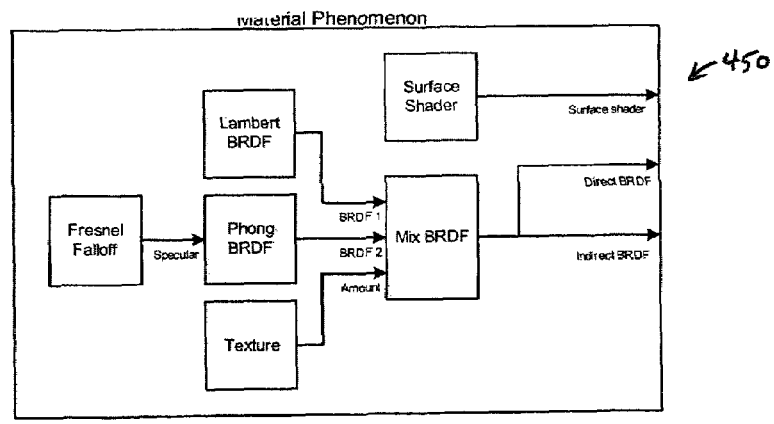

FIG. 30

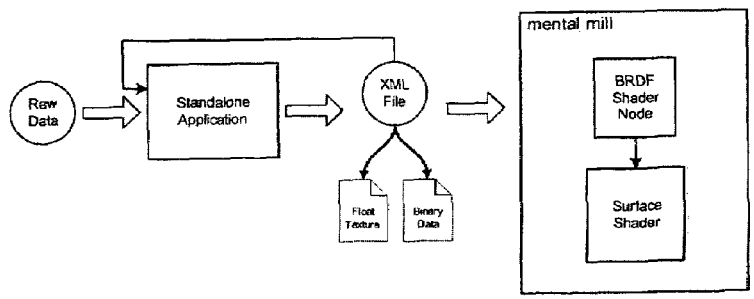

FIG. 31

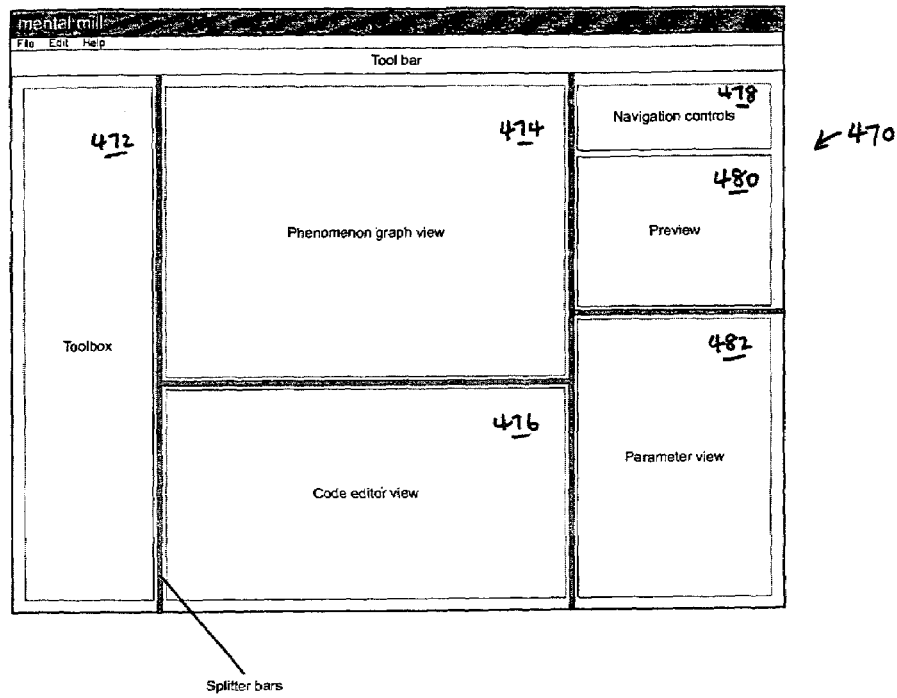
FIG. 32
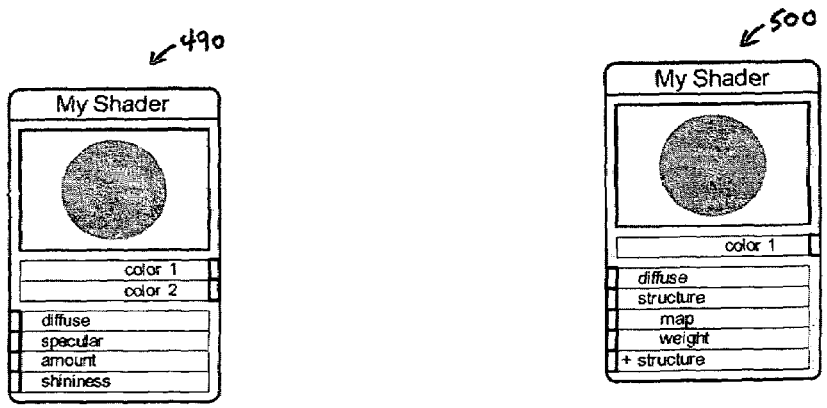
FIG. 33
FIG. 34

```
shader phong
{
    parameter:
        Color diffuse;
        Color specular;
        Scalar shininess;
        Light_list light_list;

public:
        Color shade()
        {
            Color result(0,0,0,0);
            lights (light_list)
            {
                result += light.dot_nl * light.color;
```

| Compile | Errors and compiler output |

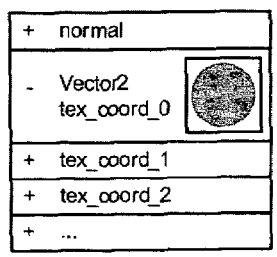
FIG. 46
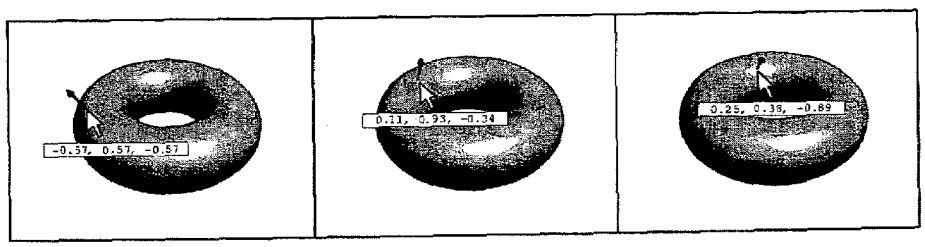
FIG. 47A  FIG. 47B  FIG. 47C
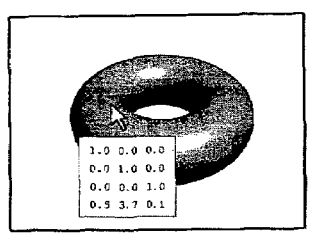 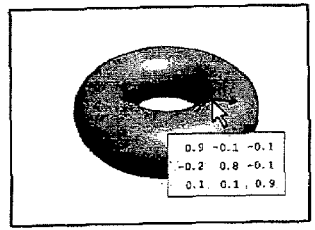 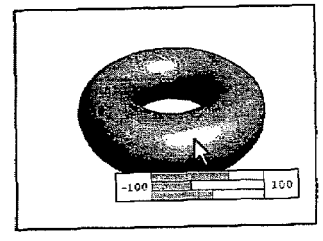
FIG. 48  FIG. 49  FIG. 50

| Event type | Description |
|---|---|
| MODULE_INIT | Sent when the library is loaded |
| MODULE_EXIT | Sent before the library is unloaded |
| CLASS_INIT | Sent once per shader class before any shader instance is called for the first time. |
| CLASS_EXIT | Sent once per shader class after rendering with the class is completed. |
| INSTANCE_INIT | Sent once per shader instance before that shader instance is invoked for shading. This event is sent after the Class_init event. |
| INSTANCE_EXIT | Sent once per shader instance when rendering is completed. This event is sent before the Class_exit event. |
| FRAME_INIT | Sent at the beginning of a frame before rendering starts. |
| FRAME_EXIT | Sent when rendering of a frame is completed. |
| PRIMITIVE_INIT | This event is only sent when rendering takes place on the GPU. It is sent before object geometry is sent to hardware. |
| PRIMITIVE_EXIT | Also applicable to hardware rendering only. Sent after rendering of an object has completed. |

FIG. 51

| Variable | Value |
|---|---|
| v4 | <1.0, 2.0, 3.0, 4.0> |
| v2 | <1.0, 2.0> |
| v3 | <0.0, 1.0, 2.0> |

FIG. 52

| && | logical and |
|---|---|
| \|\| | logical or |
| ^^ | logical exclusive or |
| ! | logical negation |

FIG. 53

| < | less than |
|---|---|
| <= | less than or equal to |
| > | greater than |
| >= | greater than or equal to |
| == | equal |
| != | not equal |

| | |
|---|---|
| Vector3 origin | The ray origin |
| Vector3 position | The intersection point on the surface |
| Vector3 direction | The ray direction. This vector is unit length. |
| Vector3 normal | The surface normal for shading. This vector is unit length. |
| Vector3 geometry_normal | The true surface normal for the current geometry. This vector is unit length. |
| Vector3 motion | Tangential motion vector |
| Vector2 parametric_uv | The parametric uv coordinate for the surface |
| Vector2 raster | The raster coordinates for the fragment being rendered |
| Vector4 texture_coordinate[256] | The array of texture spaces (up to 256). See also the get_texture_component() function. |
| Vector3 texture_tangent[256] | The array of tangent vectors for each texture space. The tangent vector is a unit length vector in the plane defined by the surface normal, which points in the direction of the positive u axis of the corresponding texture space. |
| Vector3 texture_binormal[256] | The array of binormal vectors for each texture space. The binormal vector is a unit length vector in the plane defined by the surface normal, which points in the direction of the positive v axis of the corresponding texture space. |
| Matrix3x3 tangent_space[256] | The array of tangent space matrices for each texture space. These matrices are available as a convenience and are constructed from the texture_tangent, texture_binormal, and normal as the x, y, and z axis of the coordinate system, respectively. |
| Vector3 texture_du[256] | The array of surface derivatives with respect to the u direction of the specified texture space. This array contains derivatives for each texture space. It is similar to texture_tangent except that the vectors in texture_du are not normalized or necessarily orthogonal to texture_dv or normal. |
| Vector3 texture_dv[256] | The array of surface derivatives with respect to the v direction of the specified texture space. This array contains derivatives for each texture space. It is similar to texture_binormal except that the vectors in texture_dv are not normalized or necessarily orthogonal to texture_du or normal. |
| Scalar ray_length | The length of the current ray |
| Scalar dot_nd | The dot product of the normal and the ray direction |

FIG. 59A

| | |
|---|---|
| Scalar shutter_time | The point in time within the shutter interval in seconds. The shutter_time will have the value 0.0 at the beginning of the shutter interval. |
| Scalar shutter_position | The normalized position within the shutter interval. This variable will have the value 0.0 at the start of the interval and 1.0 at the end. |
| Scalar shutter_open | The time in seconds of the beginning of the shutter interval. |
| Scalar shutter_close | The time in seconds of the end of the shutter interval. |
| Scalar shutter_duration | The length of the shutter interval in seconds |
| Bool backside | Set to true when the ray hits the geometry from behind. In this case both the normal and geometry_normal are inverted. |
| String ray_type | The type of the current ray, see the ray type section below |
| String ray_shader | The shader context in which the ray was emitted, see the ray type section below |
| Scalar importance | The effect of the current shader on the final pixel color (ranges from 0-1) |
| Scalar surface_ior | The index of refraction of the surface |
| Scalar outside_ior | The index of refraction of the medium the ray was in before intersecting the surface |
| Bool orthographic | Set to true if all eye rays are parallel |
| Scalar focal_length | The camera's focal length |
| Scalar aperture | The camera's aperture |
| Scalar aspect_ratio | The pixel aspect ratio (width / height) |
| Scalar near_clip | The distance to the near clipping plane |
| Scalar far_clip | The distance to the far clipping plane |
| Vector2 camera_offset | The camera plane offset in pixels |
| Scalar dof_radius | The depth of field radius |
| Int image_x_resolution | The width of the image in pixels |
| Int image_y_resolution | The height of the image in pixels |
| Int window_left | When rendering a cropped region, this specifies the size of the left margin in pixels |
| Int window_right | When rendering a cropped region, this specifies the size of the right margin in pixels |
| Int window_top | When rendering a cropped region, this specifies the size of the top margin in pixels |
| Int window_bottom | When rendering a cropped region, this specifies the size of the bottom margin in pixels |
| Int animation_frame | The current frame number |
| Scalar animation_time | The time of the current sample in seconds, including the position within the shutter interval |

| | |
|---|---|
| Matrix4x4 internal_to_object | Matrix to transform points from internal space to object space |
| Matrix4x4 internal_to_world | Matrix to transform points from internal space to world space |
| Matrix4x4 internal_to_camera | Matrix to transform points from internal space to camera space |
| Matrix4x4 internal_to_raster | Matrix to transform points from internal space to raster space |
| Matrix4x4 world_to_internal | Matrix to transform points from world space to internal space |
| Matrix4x4 world_to_object | Matrix to transform points from world space to object space |
| Matrix4x4 world_to_camera | Matrix to transform points from world space to camera space |
| Matrix4x4 world_to_raster | Matrix to transform points from world space to raster space |
| Matrix4x4 object_to_internal | Matrix to transform points from object space to internal space |
| Matrix4x4 object_to_world | Matrix to transform points from object space to world space |
| Matrix4x4 object_to_camera | Matrix to transform points from object space to camera space |
| Matrix4x4 object_to_raster | Matrix to transform points from object space to raster space |
| Matrix4x4 camera_to_internal | Matrix to transform points from camera space to internal space |
| Matrix4x4 camera_to_world | Matrix to transform points from camera space to world space |
| Matrix4x4 camera_to_object | Matrix to transform points from camera space to object space |
| Matrix4x4 camera_to_raster | Matrix to transform points from camera space to raster space |
| Matrix4x4 raster_to_internal | Matrix to transform points from raster space to internal space |
| Matrix4x4 raster_to_world | Matrix to transform points from raster space to world space |
| Matrix4x4 raster_to_object | Matrix to transform points from raster space to object space |
| Matrix4x4 raster_to_camera | Matrix to transform points from raster space to camera space |

| | |
|---|---|
| Vector3 light_position | The position of the sample point on the light |
| Vector3 light_direction | The direction of the light for spot or parallel light sources. This vector is unit length. |
| Vector3 light_to_surface | A vector that points from the light position to the surface position. This vector is unit length. |
| Scalar light_distance | The distance between the surface point and the light point. |
| Vector3 light_dot_nl | The dot product of the unit vector pointing toward the light point from the surface position and the surface normal. |
| Vector3 light_normal | The normal at the sample point on the surface of an area light. This vector is unit length. |
| Vector3 light_uv | The surface parameter of the sample point on an area light. |
| Vector4 light_texture_coordinate[256] | Additional texture spaces for the surfaces of area lights. |
| Vector3 light_texture_tangent[256] | The array of tangent vectors for each light texture space. The tangent vector is a unit length vector in the plane defined by the light surface normal, which points in the direction of the positive u axis of the corresponding texture space. |
| Vector3 light_texture_binormal[256] | The array of binormal vectors for each light texture space. The binormal vector is a unit length vector in the plane defined by the light surface normal, which points in the direction of the positive v axis of the corresponding texture space. |
| Bool get_shader_parameter( String parameter_name, out Type value) | Get a parameter value from the shader that invoked the light shader. The parameter_name argument must be a literal string. The type of the value argument can be one of the basic built-in types. |

| | |
|---|---|
| Color volume_input | The input value to which the volume shader should apply its effect. For example a volume shader may compute its result by interpolating between the volume_input value and another color that is computed as a result of the ray traveling through the volume. |

FIG. 62

| | |
|---|---|
| void set_near(<br>    Scalar near) | Set the distance from the origin of the ray at which intersection testing begins. |
| void set_far(<br>    Scalar far) | Set the distance from the origin of the ray at which intersection testing ends. |
| void set_ray_type(<br>    String ray_type) | Set the ray type for the ray. Defaults to "reflect". This parameter must be a literal string. |
| void set_ray_dispersal_group(<br>    String raygroup) | Set the ray dispersal group. Defaults to "specular". This parameter must be a literal string. |
| void set_importance(<br>    Scalar importance) | Specify the relative importance of the contribution from this ray with a value that ranges from 0 to 1. |

| | |
|---|---|
| `Scalar get_texture_component(`<br>`    Int space,`<br>`    Int component)` | This function provides access to texture spaces that have a dimension greater than 4, otherwise it is equivalent to the state variable `texture_coordinate`. The space parameter specifies the desired texture space and the component parameter specifies the desired component within that space. |
| `Int get_texture_dimension(`<br>`    Int space)` | Returns the number of components (dimension) of the specified texture space |
| `Bool is_ray_dispersal_group(`<br>`    String group)` | Returns true if the current ray is a member of the given group. This parameter must be a literal string. |
| `Bool is_ray_history_group(`<br>`    String history)` | Returns true if the current ray is a member of the given history group. This parameter must be a literal string. |
| `Bool trace(`<br>`    Ray ray,`<br>`    Ray ray_dx,`<br>`    Ray ray_dy,`<br>`    Trace_options options,`<br>`    String gather_output_name,`<br>`    String layer_name)` | Trace the given ray. The `ray_dx` and `ray_dy` parameters specify the ray differentials. This function can defer the tracing of the ray to a time that is convenient for the renderer. The resulting output specified by the `gather_output_name` parameter is stored in the layer specified by the `layer_name` parameter. Gather outputs can either be an output of the shader assigned to the surface the ray intersects with or the name of a state variable. To specify a state variable as a gather output, prefix the state variable name with `"State::"`. For example: `State::normal`. For clarity a shader parameter name can also be prefixed with `"State::"`. |
| `Bool trace_immediate(`<br>`    Ray ray,`<br>`    Ray ray_dx,`<br>`    Ray ray_dy,`<br>`    Trace_options options,`<br>`    String gather_output_name,`<br>`    out T result,`<br>`    ...)` | Trace a ray immediately without the possibility of deferral. This function returns false if nothing was hit or the trace depth was exhausted. If a hit is encountered one or more output values are stored in the given result variables. This function can accept a variable number of pairs of `gather_output_name` and `result` parameters. For each specified output name the value of that output will be stored in the corresponding result variable. The type of the result variable must match the type of the requested output. To specify a state variable as a gather output, prefix the state variable name with `"State::"`. For example: `State::normal`. For clarity a shader parameter name can also be prefixed with `"State::"`. |
| `Int get_trace_depth(`<br>`    String ray_type)` | Get the accumulated trace depth of the given ray type. The `ray_type` parameter must be a literal string and the value `"total"` can be used to request the total accumulated trace depth of all the ray types. |
| `Scalar occlusion(`<br>`    String mode,`<br>`    Trace_options options)` | Get the ambient occlusion for the given point. Returns 1.0 for full occlusion and 0.0 for no occlusion. The mode parameter can be one of `"front"`, `"backside"`, or `"volume"`. |
| `Color reflect_environment()` | Generates a reflection ray and samples the environment. This is a shortcut for computing a reflection vector and using it to trace an environment ray. |
| `Color refract_environment()` | Generates a refraction ray and samples the environment. This is a shortcut for computing a refraction vector and using it to trace an environment ray. |

| | |
|---|---|
| `void error(`<br>`    String format, ...)`<br>`void warning(`<br>`    String format, ...)`<br>`void info(`<br>`    String format, ...)`<br>`void progress(`<br>`    String format, ...)` | These functions all output messages within their respective categories. The format string follows the C language printf function format specifier convention and is followed by a variable number of arguments. |
| `Matrix4x4 get_transform(`<br>`    String from,`<br>`    String to)` | Get a transformation matrix to transform from one space to another including user-defined coordinate systems. The from and to parameters can be the name of a user-defined coordinate system or "internal", "object", "world", "camera", "light", or "raster". |
| `Vector3 transform_point(`<br>`    String from,`<br>`    String to,`<br>`    Vector3 pt)` | Transform a point from one coordinate system to another. The from and to parameters can be the name of a user-defined coordinate system or "internal", "object", "world", "camera", "light", or "raster". |
| `Vector3 transform_vector(`<br>`    String from,`<br>`    String to,`<br>`    Vector3 v)` | Transform a vector from one coordinate system to another. The translation component of the coordinate systems is ignored when transforming the vector. The from and to parameters can be the name of a user-defined coordinate system or "internal", "object", "world", "camera", "light", or "raster". |
| `Vector3 transform_normal(`<br>`    String from,`<br>`    String to,`<br>`    Vector3 pt)` | Transform a normal from one coordinate system to another. As with vector transformations, the translation component of the coordinate systems is ignored. Additionally the transpose of the inverse transformation matrix is used. The from and to parameters can be the name of a user-defined coordinate system or "internal", "object", "world", "camera", "light", or "raster". |

| | |
|---|---|
| `direction` | A vector pointing from the surface point to the light position. |
| `color` | The color of the light |
| `dot_nl` | The dot product of the vector pointing toward the light and the surface normal |

COMPUTER GRAPHICS SHADER SYSTEMS AND METHODS

CROSS-REFERENCE TO RELATED APPLICATIONS

This application for patent is a Continuation-In-Part of commonly owned, U.S. application for patent Ser. No. 10/462,500 filed Jun. 16, 2003 now U.S. Pat. No. 7,173,617, which is a Divisional of application Ser. No. 10/232,069 filed on Aug. 30, 2002, now U.S. Pat. No. 6,606,092 which is a Divisional of U.S. patent application Ser. No. 09/108,596, filed Jul. 1, 1998 (now U.S. Pat. No. 6,496,190, issued Dec. 17, 2002), which claims the benefit of U.S. Provisional Patent Application Ser. No. 60/051,507, filed Jul. 2, 1997, each and all of which are incorporated herein by reference.

FIELD OF THE INVENTION

The invention relates generally to the field of computer graphics, computer-aided design and the like, and more particularly to systems and methods for generating shader systems and using the shader systems so generated in rendering an image of a scene. The invention in particular provides a new type of component useful in a computer graphics system, identified herein as a "phenomenon," which comprises a system including a packaged and encapsulated shader DAG ("directed acyclic graph") or set of cooperating shader DAGs, each of which can include one or more shaders, which is generated and encapsulated to assist in defining at least a portion of a scene, in a manner which will ensure that the shaders can correctly cooperate during rendering.

BACKGROUND OF THE INVENTION

In computer graphics, computer-aided geometric design and the like, an artist, draftsman or other user (generally referred to herein as an "operator") attempts to generate a three-dimensional representation of objects in a scene, as maintained by a computer, and thereafter render respective two-dimensional images of the objects in the scene from one or more orientations. In the first, representation generation phase, conventionally, computer graphics systems generate a three-dimensional representation from, for example, various two-dimensional line drawings comprising contours and/or cross-sections of the objects in the scene and by applying a number of operations to such lines which will result in two-dimensional surfaces in three-dimensional space, and subsequent modification of parameters and control points of such surfaces to correct or otherwise modify the shape of the resulting representation of the object.

During this process, the operator also defines various properties of the surfaces of the objects, the structure and characteristics of light sources which illuminate the scene, and the structure and characteristics of one or more simulated cameras which generate the images. After the structure and characteristics of the scene, light source(s) and camera(s) have been defined, in the second phase, an operator enables the computer to render an image of the scene from a particular viewing direction.

The objects in the scene, light source(s) and camera(s) are defined, in the first, scene definition phase, by respective multiple-dimensional mathematical representations, including at least the three spatial dimensions, and possibly one time dimension. The mathematical representations are typically stored in a tree-structured data structure. The properties of the surfaces of the objects, in turn, are defined by "shade trees," each of which includes one or more shaders which, during the second, scene rendering, phase, enables the computer to render the respective surfaces, essentially providing color values representative of colors of the respective surfaces. The shaders of a shade tree are generated by an operator, or are provided a priori by a computer graphics system, in a high-level language such as C or C++, which together enable the computer to render an image of a respective surface in the second, scene rendering, phase.

A number of problems arise from the generation and use of shaders and shade trees as typically provided in computer graphics arrangements. First, shaders generally cannot cooperate with each other unless they are programmed to do so. Typically, input values provided to shaders are constant values, which limits the shaders' flexibility and ability to render features in an interesting and life-like manner. In addition, it is generally difficult to set up systems of cooperating shaders which can get their input values from a common source.

In order to provide solutions to such problems, the above cited U.S. Pat. No. 6,496,190 described a computer graphics system in which a new type of entity, referred to as a "phenomenon", can be created, instantiated and used in rendering an image of a scene. A phenomenon is an encapsulated shader DAG ("directed acyclic graph") comprising one or more nodes, each comprising a shader, or an encapsulated set of such DAGs which are interconnected so as to cooperate, which are instantiated and attached to entities in the scene which are created during the scene definition process to define diverse types of features of a scene, including color and textural features of surfaces of objects in the scene, characteristics of volumes and geometries in the scene, features of light sources illuminating the scene, features of simulated cameras which will be simulated during rendering, and numerous other features which are useful in rendering.

Phenomena selected for use by an operator in connection with a scene may be predefined, or they may be constructed from base shader nodes by an operator using a phenomenon creator. The phenomenon creator ensures that phenomena are constructed so that the shaders in the DAG or cooperating DAGs can correctly cooperate during rendering of an image of the scene.

Prior to being attached to a scene, a phenomenon is instantiated by providing values, or functions which are used to define the values, for each of the phenomenon's parameters, using a phenomenon editor.

After a representation of a scene has been defined and phenomena attached, a scene image generator can generate an image of the scene. In that operation, the scene image generator operates in a series of phases, including a pre-processing phase, a rendering phase and a post-processing phase. During a pre-processing phase, the scene image generator can perform pre-processing operations, such as shadow and photon mapping, multiple inheritance resolution, and the like. The scene image generator may perform pre-processing operations if, for example, a phenomenon attached to the scene includes a geometry shader to generate geometry defined thereby for the scene. During the rendering phase, the scene image generator renders the image. During the post-processing phase, the scene image generator may perform post-processing operations if for example, a phenomenon attached to the scene includes a shader that defines post-processing operations, such as depth of field or motion blur calculations which are dependent on velocity and depth information stored in connection with each pixel value in the rendered image.

The phenomena system described in U.S. Pat. No. 6,496, 190 is extremely useful. However, in recent years many shading platforms and languages have been developed, such that currently existing shader languages are narrowly focused on specific platforms and applications contexts, whether hardware shading for video games, or software shading for visual effects in motion pictures. This platform dependence typical of conventional shader systems and languages can be a significant limitation.

It would be desirable to provide shader methods and systems that are platform independent, and which can unite various shading tools and applications under a single language or system construct.

It would also be desirable to provide such methods and systems which enable the efficient and simple re-use and re-purposing of shaders, such as may be useful in the convergence of video games and feature films, an increasingly common occurrence (e.g., Lara Croft—Tomb Raider).

It would also be desirable to provide methods and systems that facilitate the design and construction of shaders without the need for computer programming, as may be useful for artists.

Still further, it would be desirable to provide such methods and systems that enable the graphical debugging of shaders, allowing shader creators to find and resolve defects in shaders.

SUMMARY OF THE INVENTION

The present invention, various aspects of which are herein collectively termed "Mental Mill", addresses the above-mentioned limitations of the prior art, and provides platform-independent methods and systems that can unite various shading applications under a single language (herein termed the "MetaSL shading language"), enable the simple re-use and re-purposing of shaders, facilitate the design and construction of shaders without need for computer programming, enable the graphical debugging of shaders, and accomplish many other useful functions.

One aspect of the invention involves methods and systems that facilitate the creation of simple and compact componentized shaders, referred to herein as Metanodes, that can be combined in shader networks to build more complicated and visually interesting shaders.

A further aspect of the invention is a Mental Mill shading language, referred to herein as MetaSL (Meta Shading Language). MetaSL is designed as a simple yet expressive language specifically for implementing shaders. It is also designed to unify existing shading applications, which previously were focused on specific platforms and contexts (e.g., hardware shading for games, software shading for feature film visual effects), under a single language and management structure.

The Mental Mill thus enables the creation of Metanodes (i.e., shader blocks) written in MetaSL, that can be attached and combined to form sophisticated shader graphs and phenomena.

The shader graphs provide intuitive graphical user interfaces for creating shaders, which are accessible even to users lacking technical expertise to write shader software code.

Another aspect of the invention relates to a library of APIs to manage shader creation.

In a further aspect of the invention, the Mental Mill GUI libraries harness the shader graph paradigm to provide a complete GUI for building shader graphs and phenomena.

In another aspect of the invention, because the MetaSL shading language is effectively configurable as a superset of all currently existing and future shading languages for specific hardware platforms, and hence independent of such instantiations of special purpose graphics hardware, it enables the use of dedicated compilers in the Mental Mill system for generating optimized software code for a specific target platform in a specific target shader language (such as Cg, HLSL, or the like), from a single, re-usable MetaSL description of a Phenomenon (which in turn is comprised of Metanodes in MetaSL).

The platform/language optimized code for the specific target platform/language can then be converted to machine code for specific hardware (integrated circuit chip) instantiations by the native compiler for the shading language at issue. (That native compiler need not be, and in the general case will not be, part of Mental Mill.) This can be especially useful, for example, where a particular chip is available at a given point in time, but may soon be superseded by the next generation of that chip.

In this regard, it is noted that prior attempts to represent complex visual effects, i.e., Phenomena, in such shading languages as Cg, have led to code that was not optimal for the compilation process to machine code; and in such cases the compilation process is extremely slow, thereby defeating the desired real-time performance, or the hardware level shader code was not as efficient as it could be, so that the code executed much too slowly. The foregoing aspect of the present invention addresses and resolves this problem associated with such prior efforts.

A further aspect of the invention relates to a novel interactive, visual, real-time debugger for the shader programmer/writer (i.e., the programmer in the MetaSL shading language) in the Phenomenon creation environment. This debugger, described in greater detail below, allows the effect of a change in even a single line of code to be immediately apparent from visual feedback in a "viewport" where a test scene with the shader, Metanode, or Phenomenon under development is constantly rendered.

Further aspects, examples, details, embodiments and practices of the invention are set forth below in the Detailed Description of the Invention.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 27A-C depict a series of views of a debugger screen, in which numeric values for variables at pixel locations are displayed based upon mouse location.

FIG. 28 depicts a diagram of a GUI library architecture.

FIG. 29 shows a table 0101 listing the methods required to implement a BRDF shader.

FIG. 30 shows a diagram of an example configuration, in which two BRDFs are mixed FIG. 31 is a diagram illustrating a pipeline for shading with acquired BRDFs.

FIG. 32 depicts a screenshot of a basic layout of a GUI.

FIG. 33 depicts a view of a graph node.

FIG. 34 depicts a view of a graph node including structures of sub-parameters.

FIG. 46 depicts a view of a portion of a variable list.

FIGS. 47A-C depicts a series of views illustrating a visualization technique in which a vector is drawn as an arrow positioned on an image surface as a user drags a mouse over the image surface.

FIG. 48 depicts a view illustrating a visualization technique for a matrix.

FIG. 49 depicts a view illustrating a visualization technique for three direction vectors.

FIG. 50 depicts a view illustrating a visualization technique for viewing vector type values using a gauge style display.

FIG. 51 depicts a table listing Event_type parameters and their descriptions.

FIG. 52 depicts a table illustrating the results of a vector construction method.

FIG. 53 depicts a table setting forth Boolean operators.

FIG. 54 depicts a table listing comparison operators.

FIGS. 59A-B depict a table listing a set of state variables.

FIG. 60 depicts shows a table listing transformation matrices.

FIG. 61 depicts a table listing light shader state variables.

FIG. 62 depicts a table listing volume shader state variables.

FIG. 63 depicts a table listing the methods of the Trace_options class.

FIGS. 64-65 set forth tables listing the functions that are provided as part of the intersection state and depend on values accessible through the state variable.

FIG. 66 depicts a table listing members of the Light_iterator class.

FIG. 73 depicts a screenshot of a debugger screen when the selected statement is in a loop.

FIG. 74 depicts a screenshot of a debugger screen, in which texture coordinates are viewed.

DETAILED DESCRIPTION OF THE INVENTION

Figure 1:
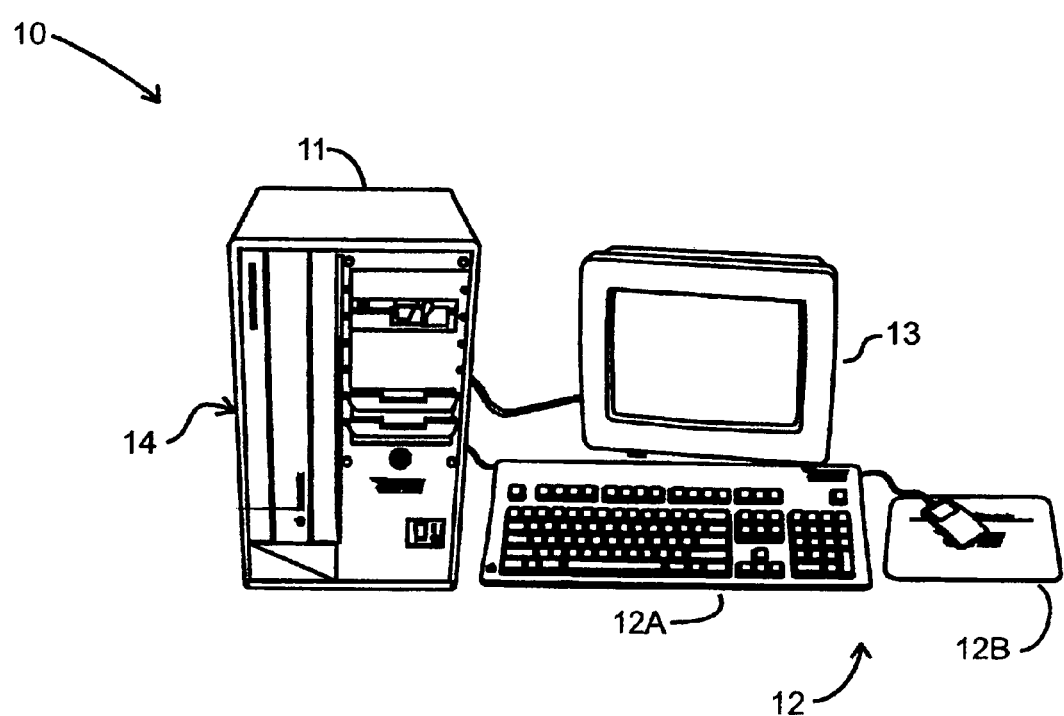
FIG. 1 depicts a computer graphics system that provides for enhanced cooperation among shaders by facilitating generation of packaged and encapsulated shader DAGs, each of which can include one or more shaders, which shader DAGs are generated in a manner so as to ensure that the shaders in the shader DAG can correctly cooperate during rendering, constructed in accordance with the invention.

The present invention provides improvements to the computer graphics entity referred to as a "phenomenon", which was described in commonly owned U.S. Pat. No. 6,496,190 incorporated herein by reference. Accordingly, we first discuss, in Section I below, the various aspects of the computer graphics "phenomenon" described in U.S. Pat. No. 6,496,190, and then, in Section II, which is subdivided into four subsections, we discuss the present improvements to the phenomenon entity."

Section I. Computer Graphics "Phenomena"

U.S. Pat. No. 6,496,190 described a new computer graphics system and method that provided enhanced cooperation among shaders by facilitating generation of packaged and encapsulated shader DAGS, each of which can include one or more shaders, generated in a manner so as to ensure that the shaders in the shader DAGs can correctly cooperate during rendering.

In brief summary, a computer graphics system is provided in which a new type of entity, referred to as a "phenomenon," can be created, instantiated and used in rendering an image of a scene. A phenomenon is an encapsulated shader DAG comprising one or more nodes each comprising a shader, or an encapsulated set of such DAGs which are interconnected so as to cooperate, which are instantiated and attached to entities in the scene which are created during the scene definition process to define diverse types of features of a scene, including color and textural features of surfaces of objects in the scene, characteristics of volumes and geometries in the scene, features of light sources illuminating the scene, features of simulated cameras which will be simulated during rendering, and numerous other features which are useful in rendering.

Phenomena selected for use by an operator in connection with a scene may be predefined, or they may be constructed from base shader nodes by an operator using a phenomenon creator. The phenomenon creator ensures that phenomena are constructed so that the shaders in the DAG or cooperating DAGs can correctly cooperate during rendering of an image of the scene.

Prior to being attached to a scene, a phenomenon is instantiated by providing values, or functions which are used to define the values, for each of the phenomenon's parameters, using a phenomenon editor.

After a representation of a scene has been defined and phenomena attached, a scene image generator can generate an image of the scene. In that operation, the scene image generator operates in a series of phases, including a pre-processing phase, a rendering phase and a post-processing phase. During a pre-processing phase, the scene image generator can perform pre-processing operations, such as shadow and photon mapping, multiple inheritance resolution, and the like. The scene image generator may perform pre-processing operations if, for example, a phenomenon attached to the scene includes a geometry shader to generate geometry defined thereby for the scene. During the rendering phase, the scene image generator renders the image. During the post-processing phase, the scene image generator may perform post-processing operations if for example, a phenomenon attached to the scene includes a shader that defines post-processing operations, such as depth of field or motion blur calculations which are dependent on velocity and depth information stored in connection with each pixel value in the rendered image.

FIG. 1 depicts elements comprising a computer graphics system 10 constructed in accordance with the invention. The computer graphics system 10 provides for enhanced cooperation among shaders by facilitating generation of new computer graphic components, referred to herein as "phenomenon" (in the singular) or "phenomena" (in the plural), which are used to define features of a scene for use in rendering. A phenomenon is a packaged and encapsulated system comprising one or more shaders, which are organized and interconnected in the form of one or more directed acyclic graphs ("DAGs"), with each DAG including one or more shaders. The phenomena generated by the computer graphics system 10 are generated in such a manner as to ensure that the shader or shaders in each shader DAG can correctly cooperate during rendering, to facilitate the rendering of realistic or complex visual effects. In addition, for phenomena which comprise multiple cooperating shader DAGs, the computer graphics system 10 generates the phenomena such that the shaders in all of the shader DAGs can correctly cooperate during the rendering, to facilitate the rendering of progressively realistic or complex visual effects.

With reference to FIG. 1, the computer graphics system 10 in one embodiment includes a computer including a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, processor, memory and mass storage devices such as disk and/or tape storage elements (not separately shown) which perform processing and storage operations in connection with digital data provided thereto. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 may include one or more network ports, generally identified by reference numeral 14, which are connected to communication links which connect the computer system 10 in a computer network. The network ports enable the computer system 10 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

As noted above, computer graphics system 10 provides for enhanced cooperation among shaders by facilitating generation of phenomena comprising packaged and encapsulated shader DAGs or cooperating shader DAGs, with each shader DAG comprising at least one shader, which define features of a three-dimensional scene. Phenomena can be used to define diverse types of features of a scene, including color and textural features of surfaces of objects in the scene, characteristics of volumes and geometries in the scene, features of light sources illuminating the scene, features of simulated cameras or other image recording devices which will be simulated during rendering, and numerous other features which are useful in rendering as will be apparent from the following description. The phenomena are constructed so as to ensure that the shaders in the DAG or cooperating DAGs can correctly cooperate during rendering of an image of the scene.

Figure 2:
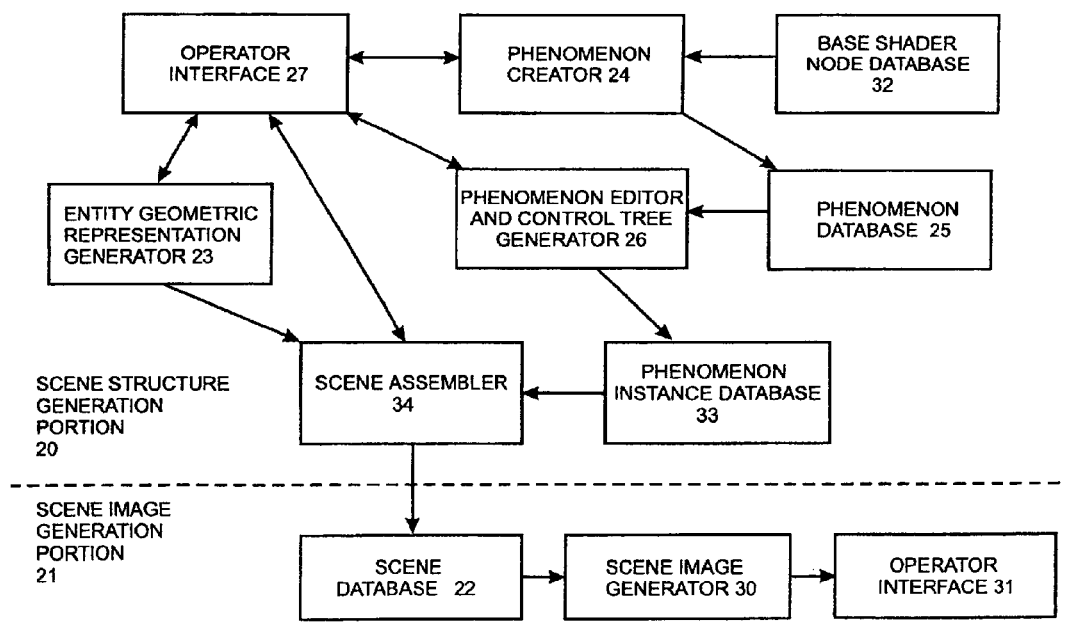
FIG. 2 is a functional block diagram of the computer graphics system depicted in FIG. 1.

FIG. 2 depicts a functional block diagram of the computer graphics system 10 used in one embodiment of the invention. As depicted in FIG. 2, the computer graphics system 10 includes two general portions, including a scene structure generation portion 20 and a scene image generation portion 21. The scene structure generation portion 20 is used by an artist, draftsman or the like (generally, an "operator") during a scene entity generation phase to generate a representation of various elements which will be used by the scene image generation portion 21 in rendering an image of the scene, which may include, for example, the objects in the scene and their surface characteristics, the structure and characteristics of the light source or sources illuminating the scene, and the structure and characteristics of a particular device, such as a camera, which will be simulated in generating the image when the image is rendered. The representation generated by the scene structure generation portion 20 is in the form of a mathematical representation, which is stored in the scene object database 22. The mathematical representation is evaluated by the image rendering portion 21 for display to the operator. The scene structure generation portion 20 and the scene image generation portion 21 may reside on and form part of the same computer, in which case the scene object database 22 may also reside on that same computer or alternatively on a server for which the computer 20 is a client. Alternatively, the portions 20 and 21 may reside on and form parts of different computers, in which case the scene object database 22 may reside on either computer or a server for both computers.

More particularly, the scene structure generation portion 20 is used by the operator to generate a mathematical representation defining comprising the geometric structures of the objects in the scene, the locations and geometric characteristics of light sources illuminating the scene, and the locations, geometric and optical characteristics of the cameras to be simulated in generating the images that are to be rendered. The mathematical representation preferably defines the three spatial dimensions, and thus identifies the locations of the object in the scene and the features of the objects. The objects may be defined in terms of their one-, two- or three-dimensional features, including straight or curved lines embedded in a three-dimensional space, two-dimensional surfaces embedded in a three-dimensional space, one or more bounded and/or closed three-dimensional surfaces, or any combination thereof. In addition, the mathematical representations may also define a temporal dimension, which may be particularly useful in connection with computer animation, in which the objects and their respective features are considered to move as a function of time.

In addition to the mathematical representation of the geometrical structure of the object(s) in the scene to be rendered, the mathematical representation further defines the one or more light sources which illuminate the scene and a camera. The mathematical representation of a light source particularly defines the location and/or the direction of the light source relative to the scene and the structural characteristics of the light source, including whether the light source is a point source, a straight or curved line, a flat or curved surface or the like. The mathematical representation of the camera particularly defines the conventional camera parameters, including the lens or lenses, focal length, orientation of the image plane, and so forth.

The scene structure generation portion 20 also facilitates generation of phenomena, which will be described in detail below, and association of the phenomena to respective elements of the scene. Phenomena generally define other information that is required for the completion of the definition of the scene which will be used in rendering. This information includes, but is not limited to, characteristics of the colors, textures, and so forth, of the surfaces of the geometrical entities defined by the scene structure generation portion 20. A phenomenon may include mathematical representations or other objects which, when evaluated during the rendering operation, will enable the computer generating the rendered image to display the respective surfaces in the desired manner. The scene structure generation portion 20, under control of the operator, effectively associates the phenomena to the mathematical representations for the respective elements (that is, objects, surfaces, volumes and the like) with which they are to be used, effectively "attaching" the phenomena to the respective elements.

After the mathematical representations have been generated by the scene structure generation portion 20 and stored in the scene representation database 22, the scene image generation portion 21 is used by an operator during a rendering phase to generate an image of the scene on, for example, the video display unit 13 (FIG. 1).

The scene structure generation portion 20 includes several elements, including an entity geometrical representation generator 23, a phenomenon creator 24, a phenomenon database 25, a phenomenon editor 26, a base shader node database 32, a phenomenon instance database 33 and a scene assembler 34, all of which operate under control of operator input information entered through an operator interface 27. The operator interface 27 may generally include the operator input devices 12 and the video display unit 13 of computer graphics system 10 as described above in connection with FIG. 1. The entity geometrical representation generator 23, under control of operator input from the operator interface 27, facilitates the generation of the mathematical representation of the objects in the scene and the light source(s) and camera as described above. The phenomenon creator 24 provides a mechanism whereby the operator, using the operator interface 27 and base shader nodes from the base shader node database 32, can generate phenomena which can be used in connection with the scene or otherwise (as will be described below). After a phenomenon is generated by the phenomenon creator 24, it (that is, the phenomenon) will be stored in the phenomenon database 25. After a phenomenon has been stored in the phenomenon database 25, an instance of the phenomenon can be created by the phenomenon editor 26. In that operation, the operator will use the phenomenon editor 26 to provide values for the phenomenon's various parameters (if any). For example, if the phenomenon has been created so as to provide features, such as color balance, texture graininess, glossiness, or the like, which may be established, adjusted or modified based on input from the operator at attachment time or thereafter, the phenomenon editor 26 allows the operator, through the operator interface 27, to establish, adjust or modify the particular feature. The values for the parameters may be either fixed, or they may vary according to a function of a variable (illustratively, time). The operator, using the scene assembler 34, can attach phenomenon instances generated using the phenomenon editor 26 to elements of the scene as generated by the entity geometrical representation generator 23.

Although the phenomenon editor 26 has been described as retrieving phenomena from the phenomenon database 25 which have been generated by the phenomenon creator 24 of the scene structure generation portion 20 of computer graphics system 10, it will be appreciated that one or more, and perhaps all, of the phenomena provided in the computer graphics system 10 may be predefined and created by other devices (not shown) and stored in the phenomenon database 25 for use by the phenomenon editor 26. In such a case, the operator, controlling the phenomenon editor through the operator interface 27, can select appropriate predefined phenomena for attachment to the scene.

The scene image generation portion 21 includes several components including an image generator 30 and an operator interface 31. If the scene image generation portion 21 forms part of the same computer as the scene structure generation portion 20, the operator interface 31 may, but need not, comprise the same components as operator interface 27. On the other hand, if the scene image generation portion 21 forms part of a different computer from the computer of which the scene structure generation portion, the operator interface 31 will generally comprise different components as operator interface 27, although the components of the two operator interfaces 31 and 27 may be similar. The image generator 30, under control of the operator interface 31, retrieves the representation of the scene to be rendered from the scene representation database 22 and generates a rendered image for display on the video display unit of the operator interface 31.

Before proceeding further, it would be helpful to further describe a "phenomenon" used in connection with the invention. A phenomenon provides information that, in addition to the mathematical representation generated by the entity geometrical representation generator 23, is used to complete the definition of the scene which will be used in rendering, including, but not limited to, characteristics of the colors, textures, and closed volumes, and so forth, of the surfaces of the geometrical entities defined by the scene structure generation portion 20. A phenomenon comprises one or more nodes interconnected in the form of a directed acyclic graph ("DAG") or a plurality of cooperating DAGs. One of the nodes is a primary root node which is used to attach the phenomenon to an entity in a scene, or, more specifically, to a mathematical representation of the entity. Other types of nodes which can be used in a phenomenon comprise optional root nodes and shader nodes. The shader nodes can comprise any of a plurality of conventional shaders, including conventional simple shaders, as well as texture shaders, material shaders, volume shaders, environmental shaders, shadow shaders, and displacement shaders, and material shaders which can be used in connection with generating a representation to be rendered. In addition, a number of other types of shader nodes can be used in a phenomenon, including (i) Geometry shaders, which can be used to add geometric objects to the scene. Geometry shaders essentially comprise pre-defined static or procedural mathematical representations of entities in three-dimensional space, similar to representations that are generated by the entity geometrical representation generator 23 in connection with in connection with entities in the scene, except that they can be provided at pre-processing time to, for example, define respective regions in which other shaders used in the respective phenomenon are to be delimited. A geometry shader essentially has access to the scene construction elements of the entity geometrical representation generator 23 so that it can alter the scene representation as stored in the scene object database to, for example, modify or create new geometric elements of the scene in either a static or a procedural manner. It should be noted that a Phenomenon that consists entirely of a geometry shader DAG or of a set of cooperating geometry shader DAGs can be used to represent objects in a scene in a procedural manner. This is in contrast to typical modeling, which is accomplished in a modeling system by a human operator by performing a sequence of modeling operations to obtain the desired representation of an object in the computer. Hence, in the essence, a geometry phenomenon represents an encapsulated and automated, parameterized abstract modeling operation. An instance of a geometry phenomenon (that is, a geometry phenomenon associated with a set of parameter values which are either fixed or which vary in a predetermined manner with time or the like) will result in a specific geometric scene extension when it is evaluated by the scene image generator 30 at runtime during a pre-processing phase. (ii) Photon shaders, which can be used to control the paths of photons in the scene and the characteristics of interaction of photons with surfaces of objects in the scene, such as absorption, reflection and the like. Photon shaders facilitate the physically correct simulation of global illumination and caustics in connection with rendering. In one embodiment, photon shaders are used during rendering by the scene image generator 30 during a pre-processing operation. (iii) Photon volume shaders, which are similar to photon shaders, except that they operate in connection with a three-dimensional volume of space in the scene instead of on the surface of an object. This allows simulation of caustics and global illumination to be extended to volumes and accompanying enclosed participating media, such as scattering of photons by dust or fog particles in the air, by water vapor such as in clouds, or the like. (iv) Photon emitter shaders, which are also similar to photon shaders, except that they are related to light sources and hence to emission of photons. The simulated photons for which emission is simulated in connection with photon emitter shaders may then be processed in connection with the photon shaders, which can be used to simulate path and surface interaction characteristics of the simulated photons, and photon volume shaders which can be used to simulate path and other characteristics in three-dimensional volumes in particular along the respective paths. (v) Contour shaders, which are used in connection with generation of contour lines during rendering. In one embodiment, there are three sub-types of contour shaders, namely, contour store shaders, contour contrast shaders and contour generation shaders. A contour store shader is used to collect contour sampling information for, for example, a surface. A contour contrast shader is used to compare two sets of the sampling information which is collected by use of a contour store shader. Finally, a contour generation shader is used to generation contour dot information for storage in a buffer, which is then used by an output shader (described below) in generating contour lines. (vi) Output shaders, which are used to process information in buffers generated by the scene image generator 30 during rendering. An output shader can access pixel information generated during rendering to, in one embodiment, perform compositing operations, complex convolutions, and contour line drawing from contour dot information generated by contour generation shaders as described above. (vii) Three-dimensional volume shaders, which are used to control how light, other visible rays and the like pass through part or all of the empty three-dimensional space in a scene. A three-dimensional volume shader may be used for any of a number of types of volume effects, including, for example, fog, and procedural effects such as smoke, flames, fur, and particle clouds. In addition, since a three-dimensional volume shader is used in connection with light, they are also useful in connection with shadows which would arise from the procedural effects; and (viii) Light shaders, which are used to control emission characteristics of light sources, including, for example, color, direction, and attenuation characteristics which can result from properties such as the shapes of respective light sources, texture projection, shadowing and other light properties.

Other types of shaders, which may be useful in connection with definition of a scene may also be used in a phenomenon.

A phenomenon is defined by (i) a description of the phenomenon's externally-controllable parameters, (ii) one primary root node and, optionally, one or more optional root nodes, (iii) a description of the internal structure of the phenomenon, including the identification of the shaders that are to be used as nodes and how they are interconnected to form a DAG or a plurality of cooperating DAGs, and (iv) optionally, a description of dialog boxes and the like which may be defined by the phenomenon for use by the phenomenon editor 26 to allow the operator to provide values for parameters or properties that will be used in evaluation of the respective phenomenon. In addition, a phenomenon may include external declarations and link-executable code from libraries, as is standard in programming.

As noted above, a phenomenon may include a plurality of cooperating DAGs. In such a phenomenon, during rendering, information generated from processing of one or more nodes of a first DAG in the phenomenon may be used in processing in connection with one or more nodes of a second DAG in the phenomenon. The two DAGs are, nonetheless, processed independently, and may be processed at different stages in the rendering process. The information generated by a respective node in the first DAG which may be "cooperating" with a node in the second DAG (that is, which may be used by the node in the second DAG in its processing, may be transferred from the respective node in the first DAG to the node in the second DAG over any convenient communication channel, such as a buffer which may be allocated therefor. Providing all of the DAGs which may need to cooperate in this manner in a single phenomenon ensures that all of the conditions for cooperation will be satisfied, which may not be the case if the DAGs are provided unencapsulated or separated in distinct phenomena or other entities.

As an example of a phenomenon including several cooperating DAGs, a phenomenon may include several DAGs, including a material shader DAG, an output shader DAG and instructions for generating a label frame buffer. The material shader DAG includes at least one material shader for generating a color value for a material and also stores label information about the objects which are encountered during processing of the material shader DAG in the label frame buffer which is established in connection with processing of the label frame buffer generation instructions. The output shader DAG, in turn, includes at least one output shader which retrieves the label information from the label frame buffer to facilitate performing object-specific compositing operations. In addition to the label frame buffer generation instructions, the phenomenon may also have instructions for controlling operating modes of the scene image generator 30 such that both DAGs can function and cooperate. For example, such instructions may control the minimum sample density required for the two DAGs to be evaluated.

As a second example of a phenomenon including multiple cooperating shader DAGs, a material phenomenon may represent a material that is simulated by both a photon shader DAG, which includes at least one photon shader, and a material shader DAG, which includes at least one material shader. During rendering, the photon shader DAG will be evaluated during caustics and global illumination pre-processing, and the material shader DAG will be evaluated later during rendering of an image. During processing of the photon shader DAG, information representing simulated photons will be stored in such a way that it can be used during later processing of the material shader DAG to add lighting contributions from the caustic or global illumination pre-processing stage. In one embodiment, the photon shader DAG stores the simulated photon information in a photon map, which is used by the photon shader DAG to communicate the simulated photon information to the material shader DAG.

As a third example of a phenomenon including multiple cooperating shader DAGs, a phenomenon may include a contour shader DAG, which includes at least one shader of the contour shader type, and an output shader DAG, which includes at least one output shader. The contour shader DAG is used to determine how to draw contour lines by storing "dots" of a selected color, transparency, width and other attributes. The output shader DAG is used to collect all cells created during rendering and, when the rendering is completed, join them into contour lines. The contour shader DAG includes a contour store shader, a contour contrast shader and a contour generation shader. The contour store shader is used to collect sampling information for later use by a contour contrast shader. The contour contrast shader, in turn, is used to determine whether the sampling information collected by the contour store shader is such that a contour dot is to be placed in the image, and, if so, the contour generation shader actually places the contour dot. This illustrative phenomenon illustrates four-stage cooperation, including (1) a first stage, in which sampling information is collected (by the contour store shader); (2) a second stage, in which the decision as to whether a contour cell is to be placed (by the contour contrast shader); (3) a third stage, in which the contour dot is created (by the contour generation shader); and (4) a fourth stage, in which created contour dots are created (by the output shader DAG).

None of the shaders in any stage makes use of another shader in another stage, but instead are processed and evaluated individually at different times, but they cooperate to enable the generation of the final result.

As a fourth example of a phenomenon including multiple cooperating shader DAGs, a phenomenon may include a volume shader DAG and a geometry shader DAG. The volume shader DAG includes at least one volume shader that defines properties of a bounded volume, for example a fur shader that simulates fur within the bounded volume. The geometry shader DAG includes at least one geometry shader that is used to include an outer boundary surface as a new geometry into the scene before rendering begins, with appropriate material and volume shader DAGs attached to the outer boundary surface to define the calculations that are to be performed in connection with hair in connection with the original volume shader DAG. In this illustrative phenomenon, the cooperation is between the geometry shader DAG and the volume shader DAG, with the geometry shader DAG introducing a procedural geometry in which the geometry shader DAG supports the volume shader DAG. The volume shader DAG makes use of this geometry, but it would not be able to create the geometry itself since the geometry is generated using the geometry shader DAG during a pre-processing operation prior to rendering, whereas the volume shader DAG is used during rendering. The cooperation illustrated in connection with this fourth illustrative example differs from that illustrated in connection with the first through third illustrative examples since the shader or shaders comprising the geometry shader procedurally provide elements that are used by the volume shader DAG, and do not just store data, as is the case in connection with the cooperation in connection with the first through third illustrative examples.

All of these examples illustrate computer graphic effects in which an image of a scene can be rendered using multiple cooperating but independent shader DAGs which are bundled and encapsulated into a single phenomenon.

Figure 3:
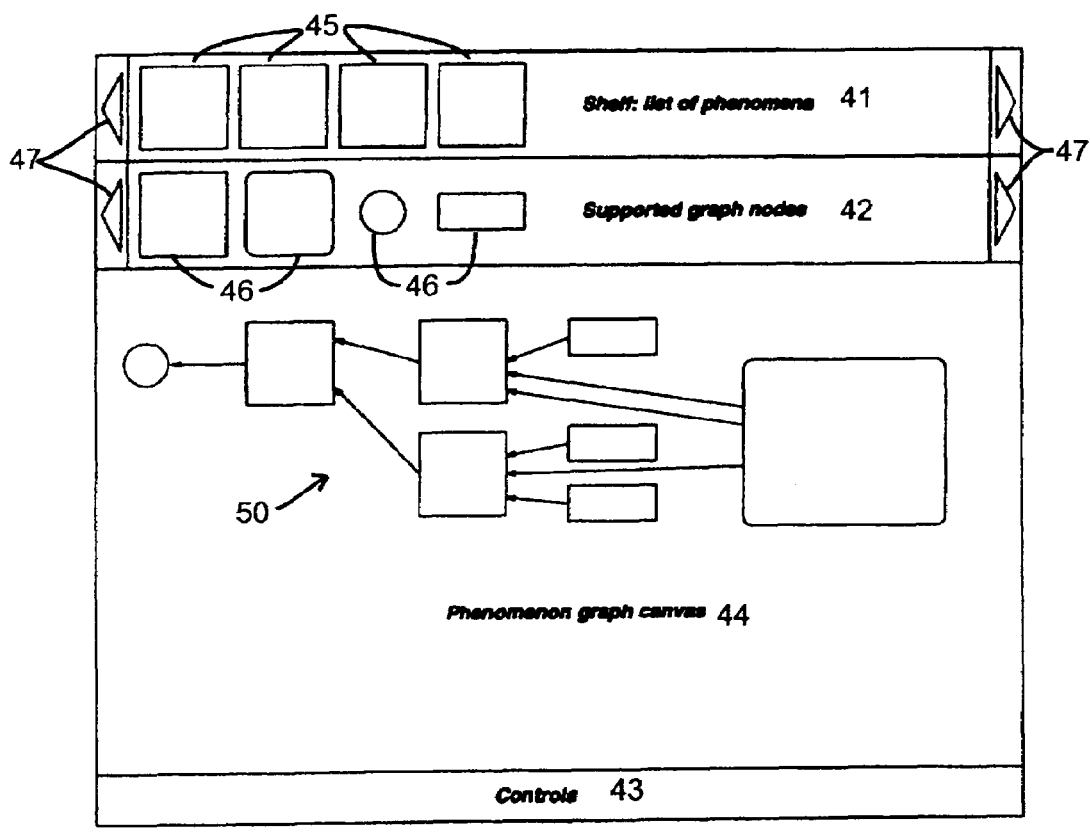
FIG. 3 depicts a graphical user interface for one embodiment of the phenomenon creator used in the computer graphics system whose functional block diagram is depicted in FIG. 2.

With this background, the operations performed in connection with the phenomenon creator 24 and phenomenon editor 26 will be described in connection with FIGS. 3 and 5, respectively. In addition, an illustrative phenomenon created in connection with the phenomenon creator 24 will be described in connection with FIG. 4, and details of the operations performed by the phenomenon editor 26 in connection with the phenomenon depicted in connection with FIG. 4 will be described in connection with FIGS. 6A and 6B. FIG. 3 depicts a phenomenon creator window 40, which the phenomenon creator 24 enables the operator interface 27 to display to the operator, to enable the operator to define a new phenomenon and modify the definition of an existing phenomenon. The phenomenon creator window 40 includes a plurality of frames, including a shelf frame 41, a supported graph node frame 42, a controls frame 43 and a phenomenon graph canvas frame 44. The shelf frame 41 can include one or more phenomenon icons, generally identified by reference numeral 45, each of which represents a phenomenon which has been at least partially defined for use in the scene structure generation portion 20. The supported graph node frame 42 includes one or more icons, generally identified by reference numeral 46, which represent entities, such as interfaces, the various types of shaders which can be used in a phenomenon, and the like, which can the operator can select for use in a phenomenon. As will be described below, the icons depicted in the supported graph node frame 42 can be used by an operator to form the nodes of the directed acyclic graph defining a phenomenon to be created or modified. In one embodiment, there are a number of types of nodes, including: (i) A primary root node, which forms the root of the directed acyclic graph and forms the connection to the scene and typically provides a color value during rendering. (ii) Several types of optional root nodes, which may be used as anchor points in a phenomenon DAG to support the main root node (item (i) above). Illustrative types of optional root nodes include: (a) A lens root node, which can be used to insert lens shaders or lens shader DAGs into a camera for use during rendering; (b) A volume root node, which can be used to insert global volume (or atmosphere) shaders or shader DAGs into a camera for use during rendering; (c) An environment root node, which can be used to insert global environment shader or shader DAGs into a camera for use during rendering; (d) A geometry root node, which can be used to specify geometry shaders or shader DAGs that may be pre-processed during rendering to enable procedural supporting geometry or other elements of a scene to be added to the scene database; (e) A contour store root node, which can be used to insert a contour store shader into a scene options data structure; (f) An output root node, which can be used in connection with post processing after a rendering phase, and (g) A contour contrast root, which can be used to insert a contour contrast shader into the scene options data structure. (iii) A shader node, which represents a shader, that is, a function written in a high-level language such as C or C++. (iv) A light node, which is used in conjunction with a light source. A light node provides the light source with a light shader, color, intensity, origin and/or direction, and optionally, a photon emitter shader. (v) A material node, which is used in conjunction with a surface. A material node provides a surface with a color value, and has inputs for an opaque indication, indicating whether the surface is opaque, and for material, volume, environment, shadow, displacement, photon, photon volume, and contour shaders. (vi) A phenomenon node, which is a phenomenon instance. (vii) A constant node, which provides a constant value, which may be an input to any of the other nodes. The constant value may be most types of data types in the programming language used for the entities, such as shaders, represented by any of the other nodes, such as scalar, vector, logical (Boolean), color, transformation, and so forth; and (viii) A dialog node, which represents dialog boxes which may be displayed by the phenomenon editor 26 to the operator, and which may be used by the operator to provide input information to control the phenomenon before or during rendering. The dialog nodes may enable the phenomenon editor 26 to enable pushbuttons, sliders, wheels, and so forth, to be displayed to allow the operator to specify, for example, color and other values to be used in connection with the surface to which the phenomenon including the dialog node is connected. As shown in FIG. 3, the shelf frame 41 and the supported graph node frame 42 both include left and right arrow icons, generally identified by reference numeral 47, which allow the icons shown in the respective frame to be shifted to the left or right (as shown in FIG. 3), to shift icons to be displayed in the phenomenon creator window 40 if there are more entities than could be displayed at one time.

The controls frame 43 contains icons (not shown) which represent buttons which the operator can use to perform control operations, including, for example, deleting or duplicating nodes in the shelf frame 41 or supported graph node frame 42, beginning construction of a new phenomenon, starting an on-line help system, exiting the phenomenon creator 24, and so forth.

The phenomenon graph canvas 44 provides an area in which a phenomenon can be created or modified by an operator. If the operator wishes to modify an existing phenomenon, he or she can, using a "drag and drop" methodology using a pointing device such as a mouse, select and drag the icon 45 from the shelf frame 41 representing the phenomenon to the phenomenon graph canvas 44. After the selected icon 45 associated with the phenomenon to be modified has been dragged to the phenomenon graph canvas 44, the operator can enable the icon 45 to be expanded to show one or more nodes, interconnected by arrows, representing the graph defining the phenomenon. A graph 50 representing an illustrative phenomenon is depicted in FIG. 3. As shown in FIG. 3, the graph 50 includes a plurality of graph nodes, comprising circles and blocks, each of which is associated with an entity which can be used in a phenomenon, which nodes are interconnected by arrows to define the graph associated with the phenomenon.

After the graph associated with the icon 45 which has been dragged to the phenomenon graph canvas 44 has been expanded to show the graph defining the phenomenon associated with the icon 45, the operator can modify the graph defining the phenomenon. In that operation, the operator can, using a corresponding "drag and drop" methodology, select and drag icons 46 from the supported graph nodes frames 42 representing the entities to be added to the graph to the phenomenon graph canvass 44, thereby to establish a new node for the graph. After the new node has been established, the operator can interconnect it to a node in the existing graph by clicking on both nodes in an appropriate manner so as to enable an arrow to be displayed therebetween. Nodes in the graph can also be disconnected from other nodes by deleting arrows extending between the respective nodes, and deleted from the graph by appropriate actuation of a delete pushbutton in the controls frame 43.

Similarly, if the operator wishes to create a new phenomenon, he or she can, using the corresponding "drag and drop" methodology, select and drag icons 46 from the supported graph nodes frames 42 representing the entities to be added to the graph to the phenomenon graph canvas 44, thereby to establish a new node for the graph to be created. After the new node has been established in the phenomenon graph canvas 44, the operator can interconnect it to a node in the existing graph by clicking on both nodes in an appropriate manner so as to enable an arrow to be displayed therebetween. Nodes in the graph can also be disconnected from other nodes by deleting arrows extending between the respective nodes, and deleted from the graph by appropriate actuation of a delete pushbutton in the controls frame 43.

After the operator has specified the DAG or set of cooperating DAGs for the phenomenon, either for a new phenomenon or for a modified phenomenon, and before the phenomenon represented by the graph is stored in the phenomenon database 25, the phenomenon creator 24 will examine the phenomenon graph to verify that it is consistent and can be processed during rendering. In that operation, the phenomenon creator 24 will ensure that the interconnections between graph nodes do not form a cycle, thereby ensuring that the graph or graphs associated with the phenomenon form directed acyclic graphs, and that interconnections between graph nodes represent respective input and output data types which are consistent. It will be appreciated that, if the phenomenon creator 24 determines that the graph nodes do form a cycle, the phenomenon will essentially form an endless loop that generally cannot be properly processed. These operations will ensure that the phenomenon so created or modified can be processed by the scene image generation portion when an image of a scene to which the phenomenon is attached is being rendered.

After the operator has created or modified a phenomenon, it will be stored in the phenomenon database 25.

Figure 4:
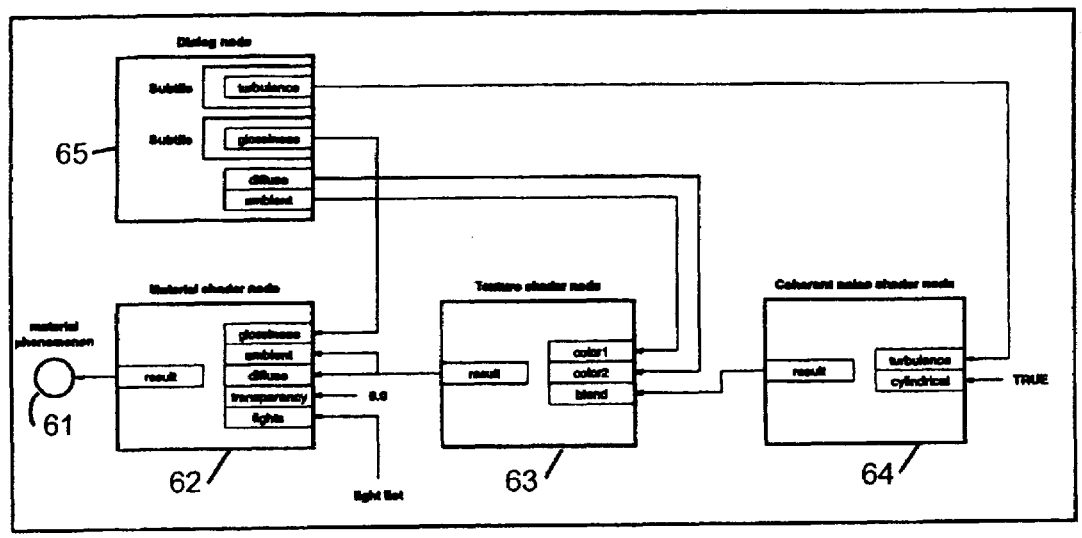
FIG. 4 graphically depicts an illustrative phenomenon generated using the phenomenon creator depicted in FIGS. 2 and 3.
Figure 5:
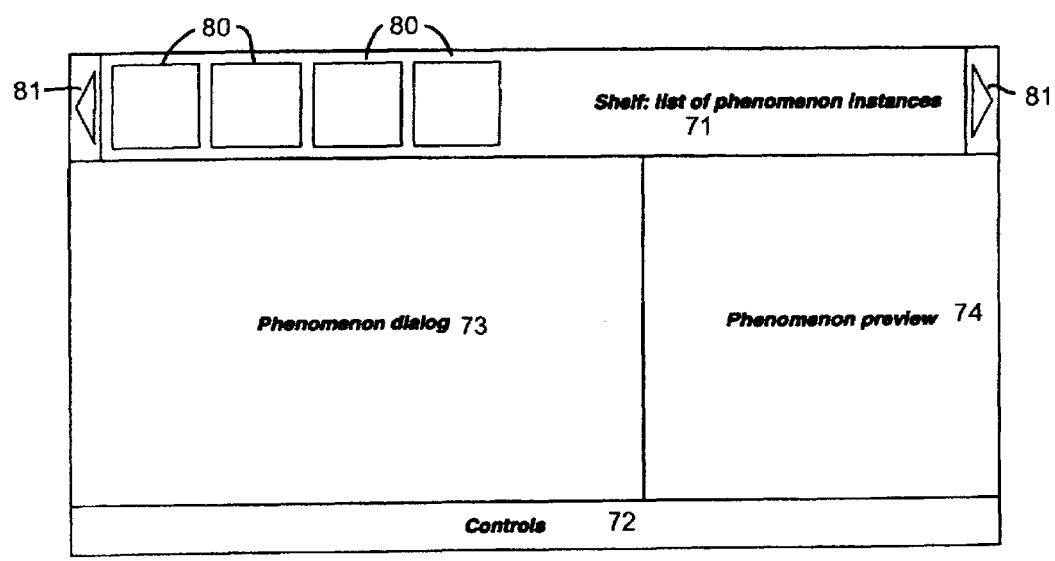
FIG. 5 depicts a graphical user interface for one embodiment of the phenomenon editor used in the computer graphics system whose functional block diagram is depicted in FIG. 2.

FIG. 4 depicts an illustrative phenomenon created in connection with the phenomenon creator 24 which can be generated using the phenomenon creator window described above in connection with FIG. 3. The illustrative phenomenon depicted in FIG. 4, which is identified by reference numeral 60, is one which may be used for surface features of a wood material. With reference to FIG. 4, the phenomenon 60 includes one root node, identified by reference numeral 61, which is used to attach the phenomenon 60 to an element of a scene. Other nodes in the graph include a material shader node 62, a texture shader node 63, a coherent noise shader node 64, which represent a material shader, a texture shader and a coherent noise shader, respectively, and a dialog node 65. The dialog node 65 represents a dialog box that is displayed by the phenomenon editor 26 to allow the operator to provide input information for use with the phenomenon when the image is rendered.

Details of a material shader, a texture shader and a coherent noise shader are known to those skilled in the art and will not be-described further herein. Generally, the material shader has one or more outputs, represented by "result," which are provided to the root node 61. The material shader, in turn, has several inputs, including a "glossiness" input, an "ambient" color input, a "diffuse" color input, a "transparency" input, and a "lights" input, and the material shader node 62 represented thereby is shown as receiving inputs therefor from the dialog node 65 (in the case of the glossiness input), from the texture shader node 63 (in the case of the ambient and diffuse color inputs), from a hard-wired constant (in the case of the transparency input) and from a lights list (in the case of the lights input). The hard-wired constant value, indicated as "0.0," provided to the transparency input indicates that the material is opaque. The "glossiness" input is connected to a "glossiness" output provided by the dialog node 65, and, when the material shader represented by node 62 is processed during rendering, it will obtain the glossiness input value therefor from the dialog box represented by the dialog node, as will be described below in connection with FIGS. 6A and 6B.

The ambient and diffuse inputs of the material shader represented by node 62 are provided by the output of the texture shader, as indicated by the connection of the "result" output of node 63 to the respective inputs of node 62. When the wood material phenomenon 60 is processed during the rendering operation, and, in particular, when the material shader represented by node 62 is processed, it will enable the texture shader represented by node 63 to be processed to provide the ambient and diffuse color input values. The texture shader, in turn, has three inputs, including ambient and diffuse color inputs, represented by "color1" and "color2" inputs shown on node 63, and a "blend" input. The values for the ambient and diffuse color inputs are provided by the operator using the dialog box represented by the dialog node 65, as represented by the connections from the respective diffuse and ambient color outputs from the dialog node 65 to the texture shader node 63 in FIG. 4.

In addition, the input value for the input of the texture shader represented by node 63 is provided by the coherent noise shader represented by node 64. Thus, when the texture shader represented by node 63 is processed during the rendering operation, it will enable the coherent noise shader represented by node 64 to be processed to provide the blend input value. The coherent noise shader has two inputs, including a "turbulence" input and a "cylindrical" input. The value for the turbulence input is provided by the operator using the dialog box represented by the dialog node 65, as represented by the connections from the turbulence output from the dialog node 65 to the coherent noise shader node 64. The input value for the cylindrical input, which is shown as a logical value "TRUE," is hard-wired into the phenomenon 60.

Operations performed by the phenomenon editor 26 will be described in connection with FIG. 5. FIG. 5 depicts a phenomenon editor window 70 which the phenomenon editor 26 enables to be displayed by the operator interface 27 for use by an operator in one embodiment of the invention to establish and adjust input values for phenomena which have been attached to a scene. In particular, the operator can use the phenomenon editor window to establish values for phenomena which are provided by dialog boxes associated with dialog nodes, such as dialog node 65 (FIG. 4), established for the respective phenomena during the creation or-modification as described above in connection with FIG. 3. The phenomenon editor window 70 includes a plurality of frames, including a shelf frame 71 and a controls frame 72, and also includes a phenomenon dialog window 73 and a phenomenon preview window 74. The shelf frame 71 depicts icons 80 representing the various phenomena which are available for attachment to a scene. As with the phenomenon creator window 40 (FIG. 3), the shelf frame includes left and right arrow icons, generally identified by reference numeral 81, which allow the icons shown in the respective frame to be shifted to the left or right (as shown in FIG. 3), to shift icons to be displayed in the phenomenon editor window 70 if there are more icons than could be displayed at one time.

The controls frame 73 contains icons (not shown) which represent buttons which the operator can use to perform control operations, including, for example, deleting or duplicating icons in the shelf frame 71, starting an on-line help system, exiting the phenomenon editor 26, and so forth.

The operator can select a phenomenon whose parameter values are to be established by suitable manipulation of a pointing device such as a mouse in order to create an instance of a phenomenon. (An instance of a phenomenon corresponds to a phenomenon whose parameter values have been fixed.) After the operator has selected a phenomenon, the phenomenon editor 26 will enable the operator interface 27 to display the dialog box associated with its dialog node in the phenomenon dialog window. An illustrative dialog box, used in connection with one embodiment of the wood material phenomenon 60 described above in connection with FIG. 4, will be described below in connection with FIGS. 6A and 6B. As the operator provides and adjusts the input values that can be provided through the dialog box, the phenomenon editor 26 effectively processes the phenomenon and displays the resulting output in the phenomenon preview window 74. Thus, the operator can use the phenomenon editor window 70 to view the result of the values which he or she establishes using the inputs available through the dialog box displayed in the phenomenon dialog window.

Figure 6A:
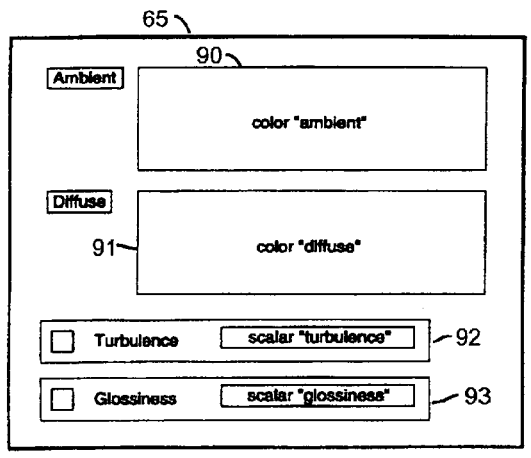
FIGS. 6A and 6B depict details of the graphical user interface depicted in FIG. 5.
Figure 6B:
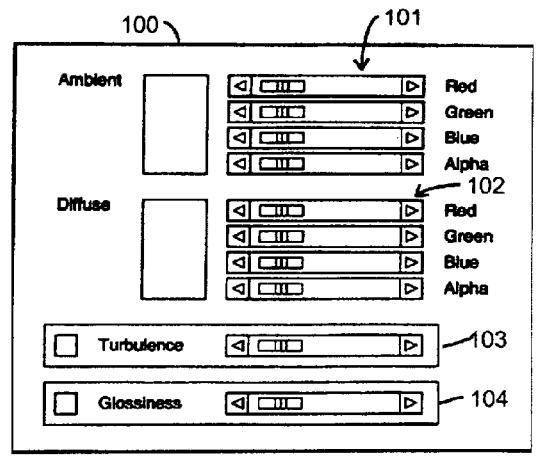

FIGS. 6A and 6B graphically depict details of a dialog node (in the case of FIG. 6A) and an illustrative associated dialog box (in the case of FIG. 6B), which are used in connection with the wood material phenomenon 60 depicted in FIG. 4. The dialog node, which is identified by reference numeral 65 in FIG. 4, is defined and created by the operator using the phenomenon creator 24 during the process of creating or modifying the particular phenomenon with which it is associated. With reference to FIG. 6A, the dialog box 65 includes a plurality of tiles, namely, an ambient color tile 90, a diffuse color tile 91, a turbulence tile 92 and a glossiness tile 93. It will be appreciated that the respective tiles 90 through 93 are associated with the respective ambient, diffuse, turbulence and glossiness output values provided by the dialog node 65 as described above in connection with FIG. 4. The ambient and diffuse color tiles are associated with color values, which can be specified using the conventional red/green/blue/alpha, or "RGBA," color/transparency specification, and, thus, each of the color tiles will actually be associated with multiple input values, one for each of the red, green and blue colors in the color representation and one for transparency (alpha). On the other hand, each of the turbulence and glossiness tiles 92 and 93 is associated with a scalar value.

FIG. 6B depicts an illustrative dialog box 100 which is associated with the dialog node 65 (FIG. 6A), as displayed by the operator interface 27 under control of the phenomenon editor 26. In the dialog box 100, the ambient and diffuse color tiles 90 and 91 of the dialog node 65 are each displayed by the operator interface 27 as respective sets of sliders, generally identified by reference numerals 101 and 102, respectively, each of which is associated with one of the colors in the color representation to be used during processing of the associated phenomenon during rendering. In addition, the turbulence and glossiness tiles 92 and 93 of the dialog node 65 are each displayed by the operator interface as individual sliders 103 and 104. The sliders in the respective sets of sliders 101 and 102 may be manipulated by the operator, using a pointing device such as a mouse, in a conventional manner thereby to enable the phenomenon editor 26 to adjust the respective combinations of colors for the respective ambient and diffuse color values provided by the dialog node 65 to the shaders associated with the other nodes of the phenomenon 60 (FIG. 4). In addition, the sliders 103 and 104 associated with the turbulence and glossiness inputs may be manipulated by the operator thereby to enable the phenomenon editor 26 to adjust the respective turbulence and glossiness values provided by the dialog node 65 to the shaders associated with the other nodes of the wood material phenomenon 60.

Figure 7:
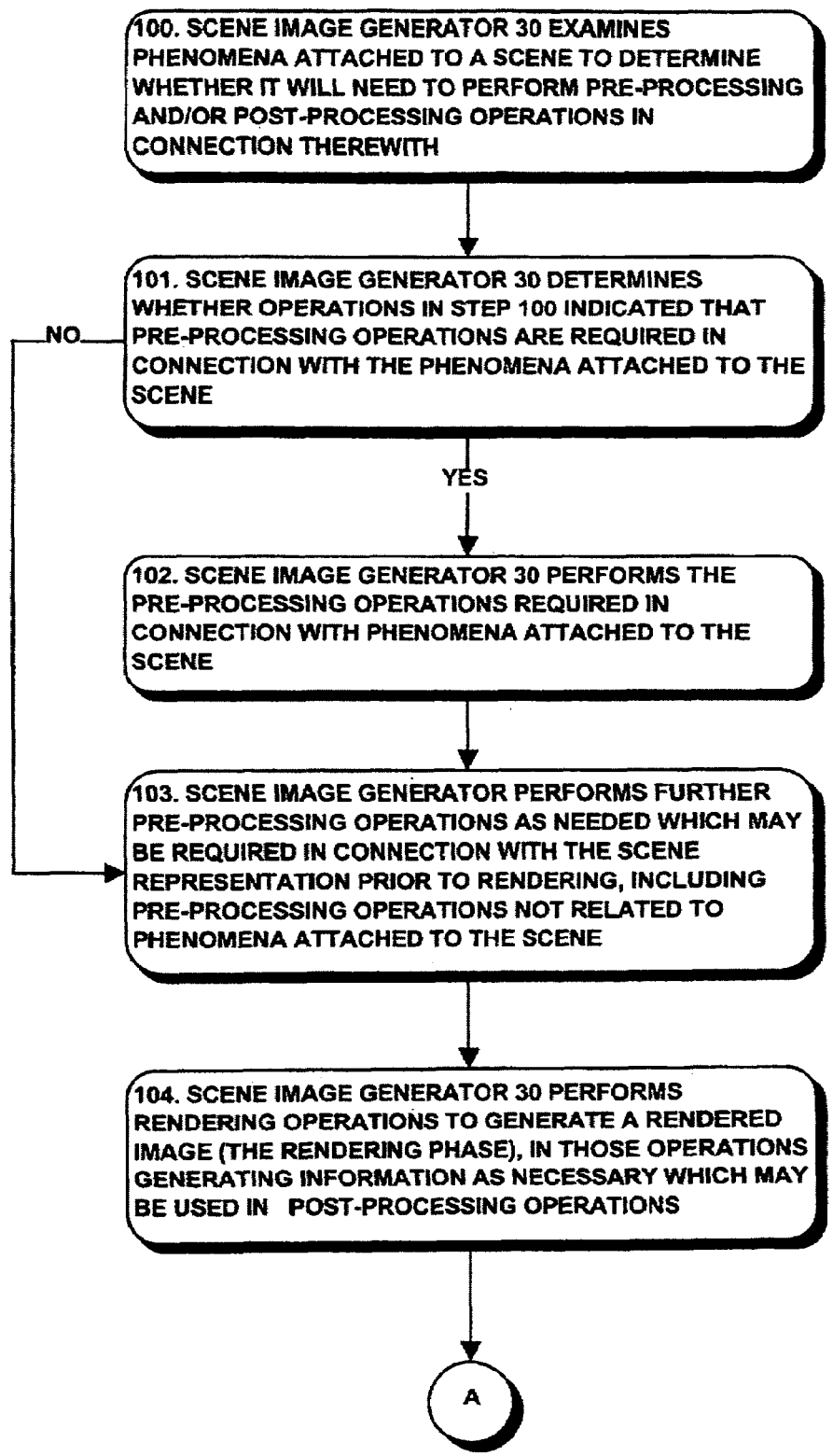
FIGS. 7 and 7A show a flowchart depicting operations performed by a scene image generation portion of the computer graphics system depicted in FIG. 2 in generating an image of a scene.
Figure 7A:
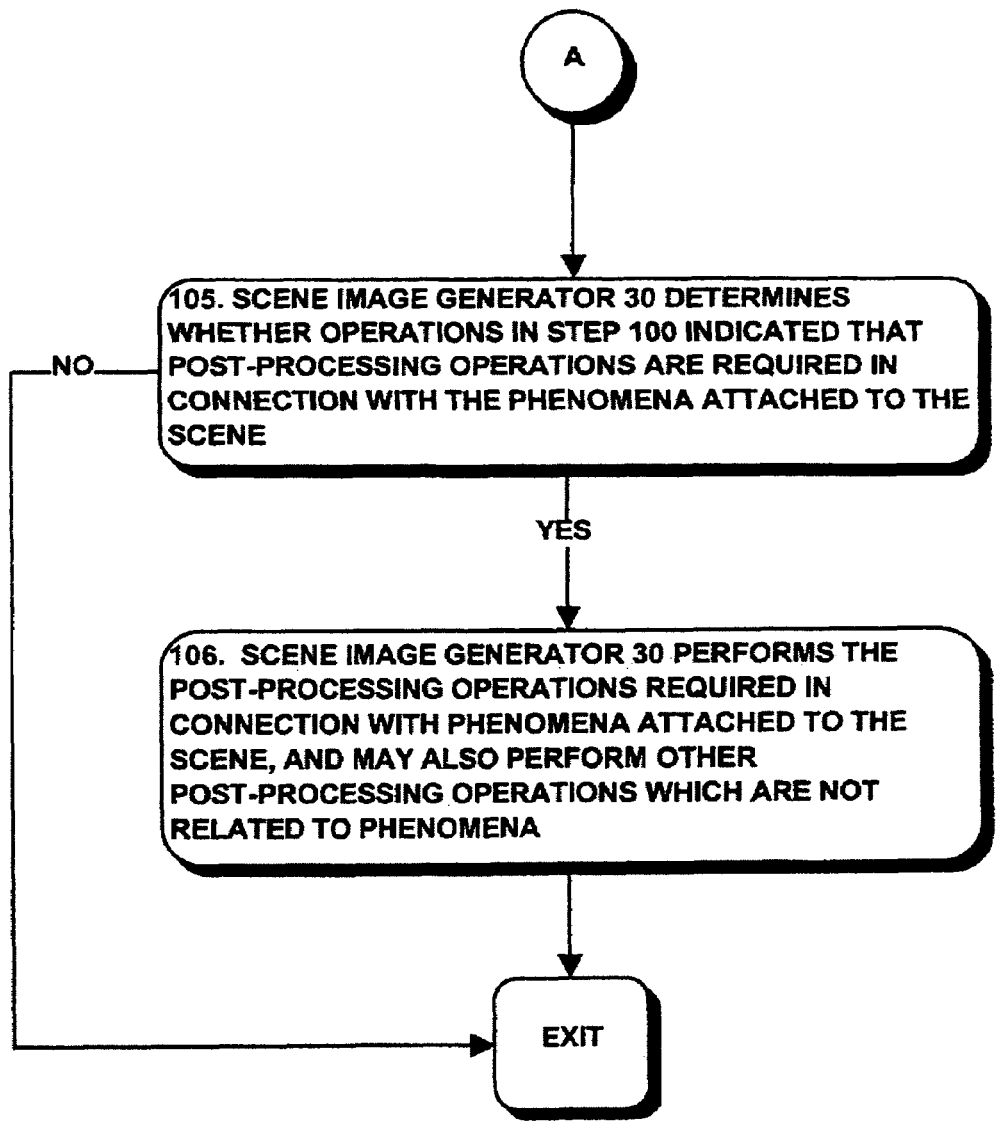

Returning to FIG. 2, after the operator, using the phenomenon editor 26, has established the values for the various phenomena and phenomena instances associated with a scene, those values are stored with the scene in the scene object database 22. Thereafter, an image of scene can be rendered by the scene image generation portion 21, in particular by the scene image generator 30 for display by the operator interface 31. Operations performed by the scene image generator 30 will generally be described-in connection with the flowchart depicted in FIG. 7. With reference to FIG. 7, the scene image generator 30 operates in a series of phases, including a pre-processing phase, a rendering phase and a post-processing phase. In the pre-processing phase, the scene image generator 30 will examine the phenomena which are attached to a scene to determine whether it will need to perform pre-processing and/or post-processing operations in connection therewith (step 100). The scene image generator 30 then determines whether the operations in step 100 indicated that pre-processing operations are required in connection with at least one phenomenon attached to the scene to (step 101), and, if so, will perform the pre-processing operations (step 102). Illustrative pre-processing operations include, for example, generation of geometry for the scene if a phenomenon attached to the scene includes a geometry shader, to generate geometry defined thereby for the scene. Other illustrative pre-processing operations include, for example, shadow and photon mapping, multiple inheritance resolution, and the like. Following step 102, or step 101 if the scene image generator 30 makes a negative determination in that step, the scene image generator 30 can perform further pre-processing operations which may be required in connection with the scene representation prior to rendering, which are not related to phenomena attached to the scene (step 103).

Following step 103, the scene image generator 30 will perform the rendering phase, in which it performs rendering operations in connection with the pre-processed scene representation to generate a rendered image (step 104). In that operation, the scene image generator 30 will identify the phenomena stored in the scene object database 22 which are to be attached to the various components of the scene, as generated by the entity geometric representation generator 23 and attach all primary and optional root nodes of the respective phenomena to the scene components appropriate to the type of the root node. Thereafter, the scene image generator 30 will render the image. In addition, the scene image generator 30 will generate information as necessary which may be used in post-processing operations during the post-processing phase.

Following the rendering phase (step 104), the scene image generator 30 will perform the post-processing phase. In that operation, the scene image generator 30 will determine whether operations performed in step 100 indicated that post-processing operations are required in connection with phenomena attached to the scene (step 105). If the scene image generator 30 makes a positive determination in step 105, it will perform the post-processing operations required in connection with the phenomena attached to the scene (step 106). In addition, the scene image generator 30 may also perform other post-processing operations which are not related to phenomena in step 106. The scene image generator 30 may perform post-processing operations in connection with manipulate pixel values for color correction, filtering to provide various optical effects. In addition, the scene image generator 30 may perform post-processing operations if, for example, a phenomenon attached to the scene includes an output shader that defines post-processing operations, such as depth of field or motion blur calculations that can be, in one embodiment, entirely done in an output shader, for example, dependent on the velocity and depth information stored in connection with each pixel value, in connection with the rendered image.

The invention provides a number of advantages. In particular, the invention provides a computer graphics system providing arrangements for creating (reference the phenomenon creator 24) and manipulating (reference the phenomenon editor 26) phenomena. The phenomena so created are processed by the phenomenon creator 24 to ensure that they are consistent and can be processed during rendering. Since the phenomena are created prior to being attached to a scene, it will be appreciated that they can be created by programmers or others who are expert in the development in computer programs, thereby alleviating others, such as artists, draftsmen and the like of the necessity developing them. Also, phenomena relieve the artist from the complexity of instrumenting the scene with many different and inter-related shaders by separating it (that is, the complexity) into an independent task performed by a phenomenon creator expert user in advance. With phenomena, the instrumentation becomes largely automated. Once a phenomenon or phenomenon instance has been created, it is scene-independent and can be re-used in many scenes thus avoiding repetitive work.

It will be appreciated that a number of changes and modifications may be made to the invention. As noted above, since phenomena may be created separately from their use in connection with a scene, the phenomenon creator 24 used to create and modify phenomena, and the phenomenon editor 26 used to create phenomenon instances, may be provided in separate computer graphics systems. For example, a computer graphics system 10 which includes a phenomenon editor 26 need not include a phenomenon creator 24 if, for example, the phenomenon database 25 includes appropriate previously-created phenomena and the operator will not need to create or modify phenomena.

Furthermore, as noted above, the values of parameters of a phenomenon may be fixed, or they may vary based on a function of one or more variables. For example, if one or more values of respective parameters vary in accordance with time as a variable, the phenomenon instance can made time dependent, or "animated." This is normally discretized in time intervals that are labeled by the frame-numbers of a series of frames comprising an animation, but the time dependency may nevertheless take on the form of any phenomenon parameter valued function over the time, each of which can be tagged with an absolute time value, so that, even if an image is rendered at successive frame numbers, the shaders are not bound to discrete intervals.

In this connection, the phenomenon editor is used to select time dependent values for one or more parameters of a phenomenon, creating a time dependent "phenomenon instance." The selection of time dependent values for the parameters of a phenomenon is achieved, in one particular embodiment, by the graphically interactive attachment of what will be referred to herein as "phenomenon property control trees" to an phenomenon. A phenomenon property control tree, which may be in the form of a tree or a DAG, is attached to phenomenon parameters, effectively outside of the phenomenon, and is stored with the phenomenon in the phenomenon instance database. A phenomenon property control tree consists of one or more nodes, each of which is a shader in the sense of the functions that it provides, for example, motion curves, data look-up functions and the like. A phenomenon property control tree preferably can remain shallow, and will normally have only very few branching levels. A phenomenon property control tree can consist of only one shader, which defines a function to compute the value for the parameter associated with it at run time. A phenomenon property control tree can remain shallow because the phenomenon allows and encourages encapsulation of the complicated shader trees or DAGs, facilitating evaluation in an optimized manner during the rendering step, by for example, storing data for re-use. Allowing an operator to attach such phenomenon property control trees to control the phenomenon's parameters greatly increases the flexibility of the user to achieve custom effects based on his use of a predefined and packaged phenomenon. The number of distinct phenomenon instances that may be created this way is therefore greatly increased, while the ease of use is not compromised thanks to the encapsulation of all complexity in the phenomenon.

In addition, it will be appreciated that the appearance and structures of the windows used in connection with the phenomenon creator 24 and phenomenon editor 26, described in connection with FIGS. 3 and 5, may differ from those described herein.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

While the phenomena system described in U.S. Pat. No. 6,496,190 and discussed above has proven extremely useful, in recent years many shading platforms and languages have been developed, such that currently existing shader languages are narrowly focused on specific platforms and applications contexts, whether hardware shading for video games, or software shading for visual effects in motion pictures. This platform dependence typical of conventional shader systems and languages can be a significant limitation.

Accordingly, the following section and its subsections describe: (1) shader methods and systems that are platform independent, and that can unite various shading tools and applications under a single language or system construct; (2) methods and systems that enable the efficient and simple re-use and re-purposing of shaders, such as may be useful in the convergence of video games and feature films, an increasingly common occurrence (e.g., Lara Croft—Tomb Raider); (3) methods and systems that facilitate the design and construction of shaders without the need for computer programming, as may be useful for artists; and (4) methods and systems that enable the graphical debugging of shaders, allowing shader creators to find and resolve defects in shaders.

II. The Mental Mill

Figure 8:
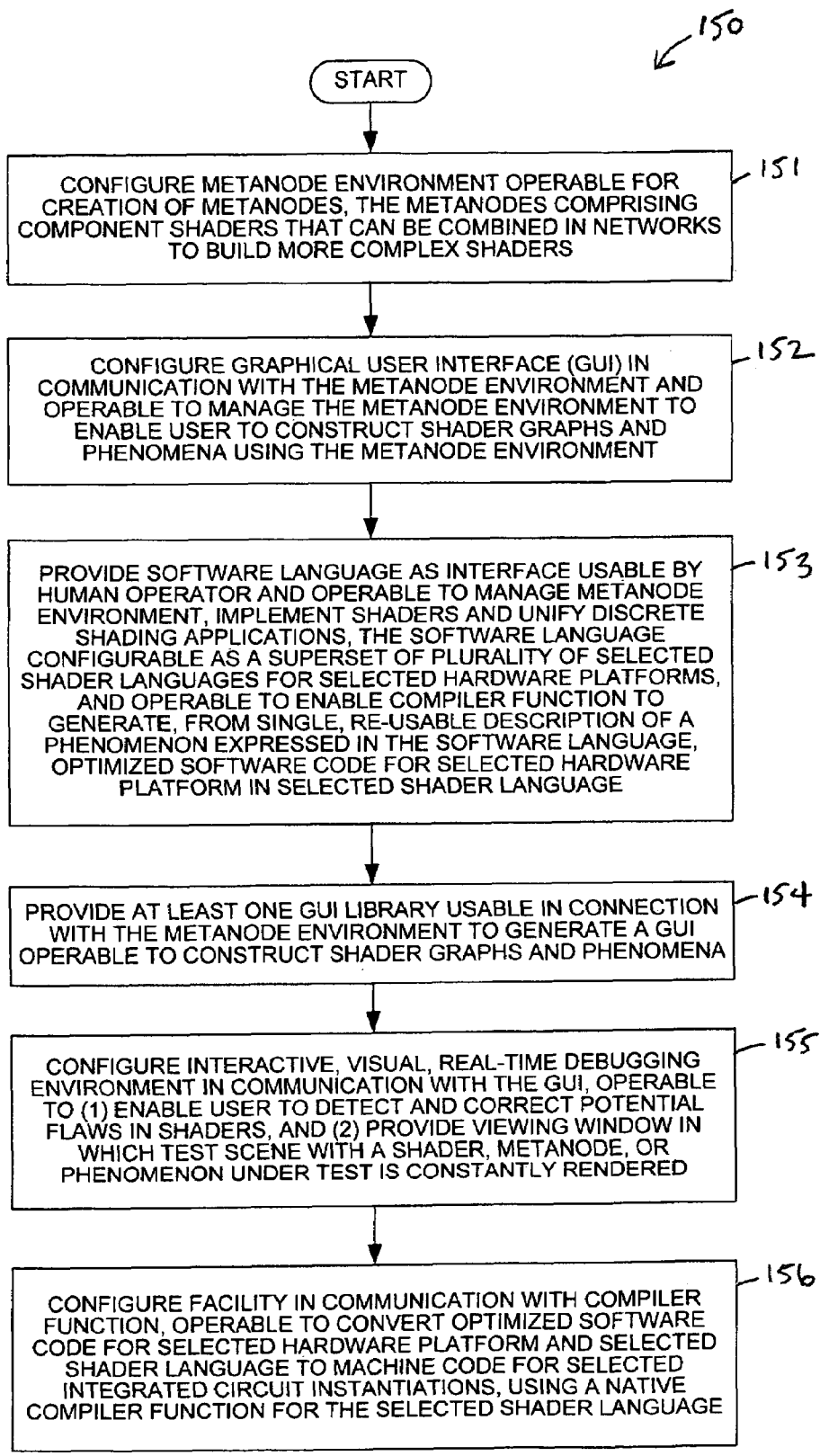
FIG. 8 depicts a flowchart of an overall method according to an aspect of the invention.

FIG. 8 shows a flowchart of an overall method 150 according to an aspect of the invention. The described method enables the generation of an image of a scene in a computer graphics system from a representation to which at least one instantiated phenomenon has been attached, the instantiated phenomenon comprising an encapsulated shader DAG comprising at least one shader node.

In step 151, a metanode environment is configured that is operable for the creation of metanodes, the metanodes comprising component shaders that can be combined in networks to build more complex shaders.

In step 152, a graphical user interface (GUI) is configured that is in communication with the metanode environment and is operable to manage the metanode environment to enable a user to construct shader graphs and phenomena using the metanode environment.

In step 153, a software language is provided as an interface usable by a human operator and operable to manage the metanode environment, implement shaders and unify discrete shading applications. The software language is configurable as a superset of a plurality of selected shader languages for selected hardware platforms, and operable to enable a compiler function to generate, from a single, re-usable description of a phenomenon expressed in the software language, optimized software code for a selected hardware platform in a selected shader language.

In step 154, at least one GUI library is provided that is usable in connection with the metanode environment to generate a GUI operable to construct shader graphs and phenomena.

In step 155, an interactive, visual, real-time debugging environment is configured that is in communication with the GUI, and that is operable to (1) enable the user to detect and correct potential flaws in shaders, and (2) provide a viewing window in which a test scene with a shader, metanode, or phenomenon under test is constantly rendered.

In step 156, a facility is configured that is in communication with the compiler function, and that is operable to convert the optimized software code for the selected hardware platform and selected shader language to machine code for selected integrated circuit instantiations, using a native compiler function for the selected shader language.

The following discussion is organized into four major sections as follows:

A. Mental Mill Functional Overview;
B. Mental Mill GUI Specification;
C. MetaSL Design Specification;
D. MetaSL Shader Debugger.

A. Mental Mill Functional Overview

The mental mill™ technology provides an improved approach to the creation of shaders for visual effects. The mental mill solves many problems facing shader writers today and future-proofs shaders from the changes and evolutions of tomorrow's shader platforms.

In addition to providing a user interface for standalone operation, the mental mill further includes a library providing APIs to manage shader creation. This library can be integrated into third-party applications in a componentized fashion, allowing the application to use only the components of mental mill it requires.

The foundation of mental mill shading is the mental mill shading language MetaSL™. MetaSL is a simple yet expressive language designed specifically for implementing shaders. The mental mill encourages the creation of simple and compact componentized shaders (referred to as Metanodes™) which can be combined in shader networks to build more complicated and visually interesting shaders.

The goal of MetaSL is not to introduce yet another shading language but to leverage the power of existing languages through a single meta-language, MetaSL. Currently existing shader languages focus on relatively specific platforms or contexts, for example hardware shading for games or software shading for feature film visual effects. MetaSL unifies these shading applications into a single language.

The mental mill allows the creation of shader blocks called "metanodes," which are written in MetaSL to be attached and combined in order to form sophisticated shader graphs and Phenomena™. Shader graphs provide intuitive graphical user interfaces for creating shaders that are accessible to users who lack the technical expertise to write shader code. The mental mill graphical user interface libraries harness the shader graph paradigm to provide the user a complete graphical user interface for building shader graphs and Phenomena. As discussed in detail below, the present invention provides a "metanode environment," i.e., an environment that is operable for the creation and manipulation of metanodes. As further discussed below, the described metanode environment may be implemented as software, or as a combination of software and hardware.

A standalone application is included as part of mental mill, however since mental mill provides a cross-platform, componentized library, it is also designed to be integrated into third-party applications. The standalone mental mill application simply uses these libraries in the same way any other application would. The mental mill library can be broken down into the following pieces: (1) Phenomenon creator graphical user interface (GUI); (2) Phenomenon shader graph compiler; and (3) MetaSL shading language compiler.

The mental mill Phenomenon creator GUI library provides a collection of GUI components that allow the creation of complex shaders and Phenomenon by users with a wide range of technical expertise.

The primary GUI component is the shader graph view. This view allows the user to construct Phenomena by creating shader nodes (Metanodes or other Phenomena) and attaching them together in a graphs described. The shader graph provides a clear visual representation of the shader program that is not found when looking at shader code. This makes shader creation accessible to those users without the technical expertise to write shader code. The GUI library also provides other user interface components, summarized here:

- Shader parameter editor—Provides sliders, color pickers, and other controls to facilitate the editing of shader parameter values.
- Render preview window—Provides the user interactive feedback on the progress of their shader.
- Phenomenon library explorer—Allows the user to browse and maintain a library of pre-built Phenomena.
- Metanode library explorer—Allows the user to browse and maintain an organized toolbox of Metanodes; the fundamental building blocks of Phenomenon.
- Code editor and Integrated Development Environment (IDE)—Provides the tools a more technical user needs to develop new Metanodes with MetaSL. The IDE is integrated with the mental mill GUI to provide interactive visual feedback. In addition, the IDE provides a high level interactive visual debugger for locating and correcting defects in shaders.

The mental mill GUI library is both componentized and cross-platform. The library has been developed without dependencies on the user interface libraries of any particular operating system or platform.

Furthermore, the mental mill GUI library is designed for integration into third-party applications. While the components of the GUI library have default appearances and behaviors, plug-in interfaces are provided to allow the look and feel of the Phenomenon creator GUI to be customized to match the look and feel of the host application.

The MetaSL shading language unites the many shading languages available today and is extensible to support new languages and platforms as they appear in the future. This allows MetaSL to provide insulation from platform dependencies.

MetaSL is a simple yet powerful language targeted at the needs of shader writers. It allows shaders to be written in a compact and highly readable syntax that is approachable by users that might not otherwise feel comfortable programming.

Because a MetaSL shader is written without dependencies on particular platforms, MetaSL shaders can be used in a variety of different ways. A single shader can be used when rendering offline in software or real-time in hardware. The same shader can be used across different platforms, such as those used by the next generation of video game consoles.

By writing shaders in MetaSL, the time invested in developing shaders is protected from the obsolescence of any particular language and is leveraged by the potential to be re-used on many different platforms.

The MetaSL compiler that is part of the mental mill library is itself extendable. The front-end of the compiler is a plug-in so that parsers for other languages or syntaxes can replace the MetaSL front end. Similarly the back-end of the compiler is also a plug-in so new target platforms can easily be supported in the future. This extensibility to both ends of the mental mill compiler library allows it to become the hub of shader generation.

Shader writers typically face difficulties on several fronts. The following sections outline these issues and the rationale behind the creation of the mental mill technology, which is designed to provide a complete solution set.

Shaders developed with mental mill are platform independent. This is a key feature of mental mill and insures that the effort invested in developing shaders is not wasted as target platforms evolve. This platform independence is provided for both shaders written in MetaSL and shader graphs of Metanodes.

The mental mill libraries provide application programming interfaces (APIs) to generate shaders for a particular platform dynamically on demand from either a Phenomenon shader graph or a monolithic MetaSL shader. Alternatively, mental mill makes it possible to export a shader in the format required by a target platform to a static file. This allows the shader to be used without requiring the mental mill library.

Figure 9:
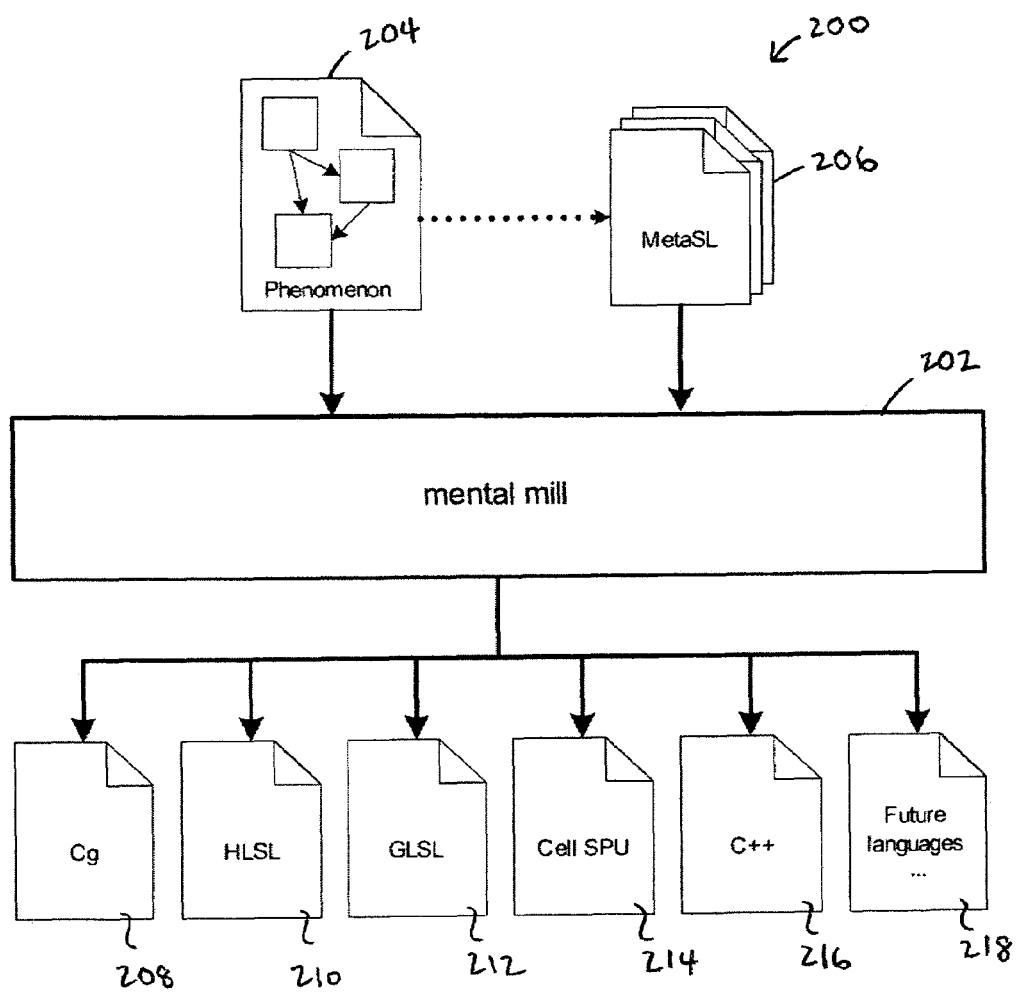
FIG. 9 depicts a software layer diagram illustrating the platform independence of the mental mill.

FIG. 9 shows a diagram of an overall system 200 according to an aspect of the invention. As shown in FIG. 9, the system 200 includes a mental mill processing module 202 that contains a number of submodules and other components, described below. The mental mill processing module 202 receives inputs in the form of Phenomena 204 and MetaSL code 206. The mental mill processing module 202 then provides as an output source code in a selected shader language, including: Cg 208, HLSL 210, GLSL 212, Cell SPU 214, C++ 216, and the like. In addition, the mental mill 202 is adaptable to provide as an output source code in future languages 218 that have not yet been developed.

A component of platform independence is insulation from particular rendering algorithms. For example, hardware rendering often employs a different rendering algorithm as compared to software rendering. Hardware rendering is very fast for rendering complex geometry, but may not directly support advanced lighting algorithms such as global illumination.

Figure 10:
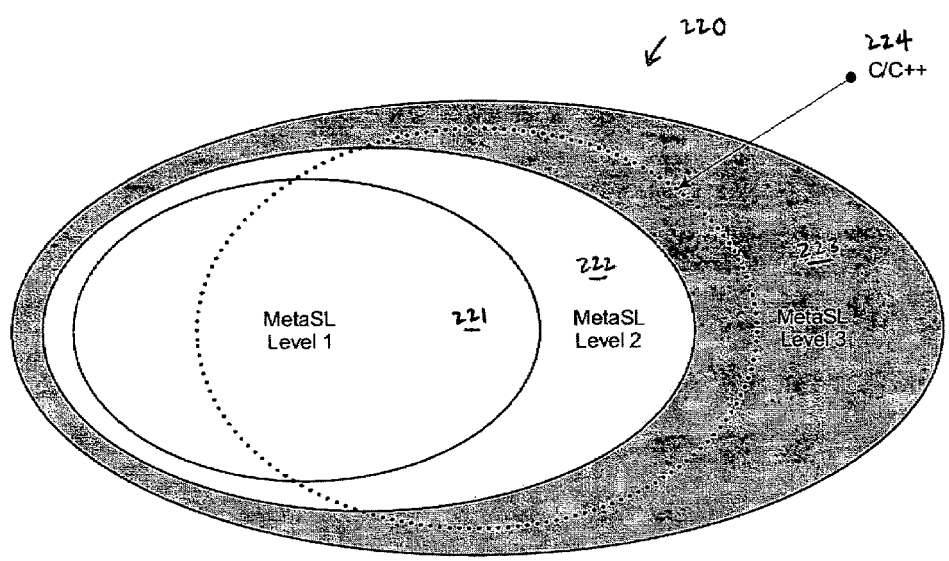
FIG. 10 depicts an illustration of the levels of MetaSL as subsets.

MetaSL can be considered to be divided into three subsets or levels, with each level differing in both the amount of expressiveness and suitability for different rendering algorithms. FIG. 10 shows a diagram illustrating the levels of MetaSL 220 as subsets. The dotted ellipse region 224 shows C++ as a subset for reference.

Level 1 (221)—This is the most general subset of MetaSL. Shaders written within this subset can easily be targeted to a wide variety of platforms. Many types of shaders will be able to be written entirely within this subset.

Level 2 (222)—A superset of Level 1 (221), Level 2 (222) adds features typically only available with software rendering algorithms such as ray tracing and global illumination. Like Level 1 (221), Level 2 (222) is still relatively simplified language and shaders written within Level 2 (222) may still be able to be partially rendered on hardware platforms. This makes it possible to achieve a blending of rendering algorithms where part of the rendering takes place on hardware and part on software.

Level 3 (223)—This is a superset of both Levels 1 (221) and 2 (222). In addition Level 3 (223) is also a superset of the popular C++ language. While Level 3 (223) shaders can only ever execute in software, Level 3 (223) is the most expressive of the three levels since it includes all the features of C++. However few shaders need the complexity of C++ and given that Level 1 (221) has the least general set of possible targets, most shaders will likely be written using only Levels 1 (221) and 2 (222).

Figure 11:
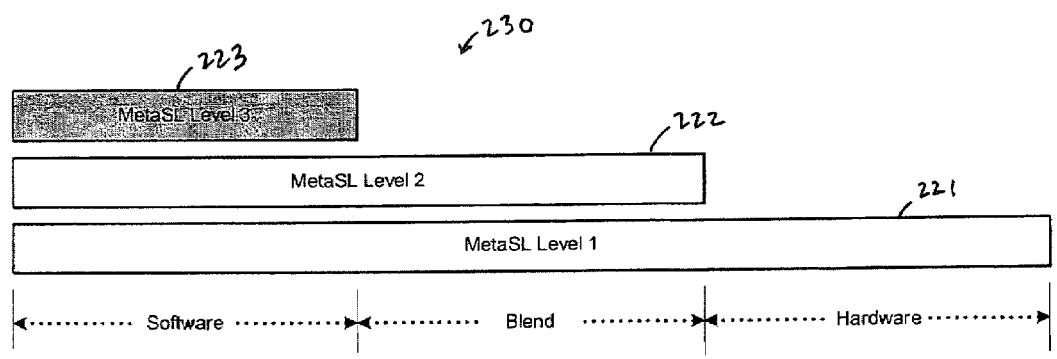
FIG. 11 depicts a bar diagram illustrating the levels of MetaSL and their applicability to hardware and software rendering.

While Level 1 (221) appears to be the smallest subset of MetaSL, it is also the most general in the types of platforms it will support. MetaSL Level 3 (223) is the largest superset, containing even all of C++, making it extremely powerful and expressive. For the applications that require it, Level 3 (223) allows complex shaders to be written that use all the features of C++. The cost of using Level 223 comes from the limited targets that support it. FIG. 11 is a bar chart 230 illustrating the levels of MetaSL and their applicability to hardware and software rendering.

Level 1 and 2 shaders (221, 222) have a high degree of compatibility, with the only difference being that Level 2 shaders (222) utilize advanced algorithms not capable of running on a GPU. However the MetaSL compiler can use a Level 2 shader (222) as if it were a Level 1 shader (221) (and target hardware platforms) by removing functions not supported by Level 1 (221) and replacing them with no-ops. This feature, and the ability of the MetaSL compiler to also detect the level of a given shader, allows the MetaSL compiler to simultaneously generate a hardware and software version of a shader (or only generate a software shader when it is required). The hardware shader can be used for immediate feedback to the user through hardware rendering. A software rendering can then follow up with a more precise image.

Another useful feature of mental mill is the ability to easily repurpose shaders. One key example of this comes from the convergence of video games and feature films. It is not uncommon to see video games developed with licenses to use content from successful films. Increasingly feature films are produced based on successful video games as well. It makes sense to use the same art assets for a video game and the movie it was based on, but in the past this has been a challenge for shaders since the film is rendered using an entirely different rendering algorithm than the video game. The mental mill overcomes this obstacle by allowing the same MetaSL shader to be used in both contexts.

The shader graph model for constructing shaders also encourages the re-use of shaders. Shader graphs inherently encourage the construction of shaders in a componentized fashion. A single Metanode, implemented by a MetaSL shader, can be used in different ways in many different shaders. In fact entire sub-trees of a graph can be packaged into a Phenomenon and re-used as a single node.

The mental mill graphical user interface provides a method to construct shaders that doesn't necessarily involve programming. Therefore, an artist or someone who is not comfortable writing code will now have the ability to create shaders for themselves. In the past, an artist needed to rely on a programmer to create shaders; which is a slow process possibly involving many iterations between the programmer and the artists. Giving the artist control over the shader creation process not only frees up programmers for other tasks, but allows the artist to more freely explore the possibilities enabled through custom shaders.

The mental mill user interface also provides a development environment for programmers and technical directors. Programmers can create custom Metanodes written in MetaSL and artists can then use these nodes to create new shaders. Technical directors can create complex custom shader graphs which implement units of functionality and package those graphs into Phenomenon. These different levels of flexibility and complexity give users extensive control over the shader creation process and can involve users of widely ranging technical and artistic expertise.

An important aspect of the creation of shaders is the ability to analyze flaws, determine their cause, and find solutions. In other words, the shader creator must be able to debug their shader. Finding and resolving defects in shaders is necessary regardless of whether the shader is created by attaching Metanodes to form a graph or writing MetaSL code, or both. The mental mill provides functionality for users to debug their shaders using a high level, visual technique. This allows shader creators to visually analyze the states of their shader to quickly isolate the source of problems. A prototype application has been created as a proof of concept of this shader debugging system.

Nearly all applications of shaders, such as offline or real-time interactive rendering, require shaders to achieve the highest level of performance possible. Typically shaders are invoked in the most performance critical section of the renderer and therefore can have a significant impact on overall performance. Because of this it is crucial for shader creators to be able to analyze the performance of their shaders at a fine granularity to isolate the computationally expensive portions of their shaders.

The mental mill provides such analysis, referred to as profiling, through an intuitive graphical representation. This allows the mental mill user to receive visual feedback indicating the relative performance of portions of their shaders. This profiling information is provided at both the node level for nodes that are part of a graph or Phenomenon, and at the statement level for the MetaSL code contained in a Metanode.

The performance timing of a shader can be dependent on the particular input values driving that shader. For example, a shader may contain a loop where the number of iterations through the loop is a function of a particular input parameter value. The mental mill graphical profiler allows shader performance to be analyzed in the context of the shader graph where the node resides, which makes the performance results relative to the particular input values driving the node in that context.

The performance information at any particular granularity is normalized to the overall performance cost of a node, the entire shader, or the cost to render an entire scene with multiple shaders. For example, the execution time of a MetaSL statement within a Metanode can be expressed as a percentage of the total execution time of that Metanode or the total execution time of the entire shader if the Metanode is a member of a graph.

The graphical representation of performance results can be provided using multiple visualization techniques. For example, one technique is to present the normalized performance cost by mapping the percentage to a color gradient.

Figures 12, 13:
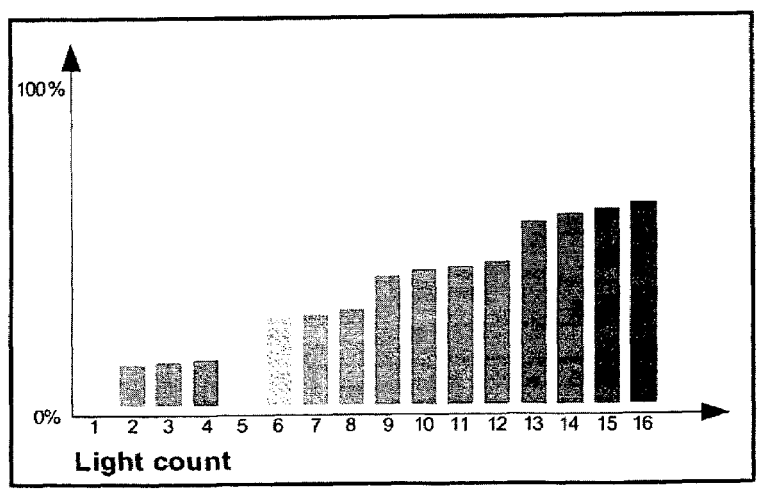
FIG. 12 depicts a screenshot of a graphical performance analysis window.
FIG. 13 depicts a bar graph of performance results with respect to a range of values of particular input parameter.

FIG. 12 shows a screenshot 230 illustrating this aspect of the invention. A MetaSL code listing 232 appears at the center of the screen 230. A color bar 234 appears to the left of each statement 232 indicating relative performance. The first 10 percentage points are mapped to a blue gradient and the remaining 90 percentage points are mapped to a red gradient. Using nonlinear mappings such as this focuses the user's attention on the "hotspots" in their MetaSL code. In addition the user can access the specific numeric values used to select colors from the gradient. As the user sweeps their mouse over the color bars, a popup will display the execution time of the statement as a percentage of the total execution time.

When a shader is part of an animation its performance characteristics may change over time, either because the overall cost to render the scene changes over time or the shader itself is a function of time. The graphical representation of the performance results will update as the animation progresses to reflect these changes in the performance profile. In the FIG. 12 screen 230, the colored bars 234 next to each statement of code 232 will change color to reflect changes in measured performance as an animation is played back.

FIG. 13 shows a performance graph 240 illustrating another visualization technique. Graph 240 displays performance results with respect to a range of values of a particular input parameter. In this example, the performance cost of the illumination loop of a shader is graphed with respect to the number of lights in the scene. The jumps in performance cost in this example indicate points at which the shader must be decomposed into passes to accommodate the constraints of graphics hardware.

Figures 14, 15:
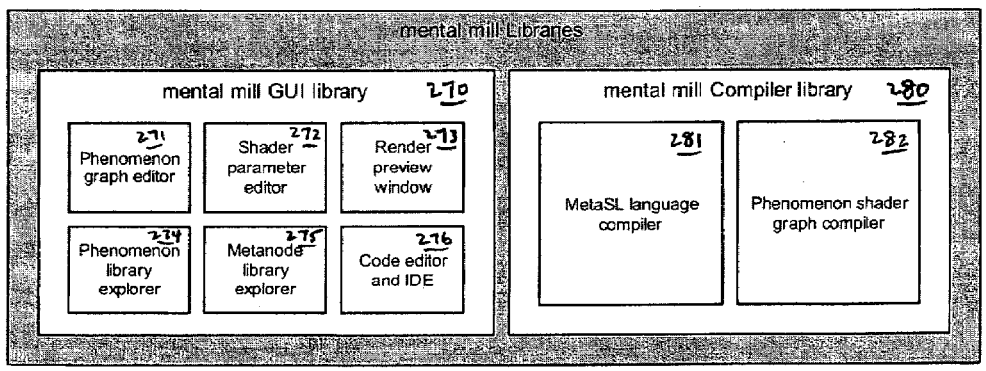
FIG. 14 depicts a screen view in which performance results are displayed in tabular form.
FIG. 15 depicts a diagram of a library module, illustrating the major categories of the mental mill libraries.

The mental mill can also display performance results in tabular form. FIG. 14 shows a table 250, in which the performance timings of each node of a Phenomenon are displayed with respect to the overall performance cost of the entire shader.

The graphical profiling technique provided by mental mill, like other features of mental mill, is platform independent. This means that performance timings can be generated for any supported target platform. As new platforms emerge and new back-end plug-ins to the mental mill compiler are provided, these new platforms can be profiled in the same way. However any particular timing is measured with respect to some selected target platform. For example the same shader can be profiled when executed on hardware versus software or on different hardware platforms. Different platforms have individual characteristics and so the performance profile of a particular shader may look quite different when comparing platforms. The ability for a shader creator to analyze their shader on different platforms is critical in order to develop a shader that executes with reasonable performance on all target platforms.

FIG. 15 shows a diagram of the mental mill libraries component 260. The mental mill libraries component 260 is divided into two major categories: the Graphical User Interface (GUI) library 270 and the Compiler library 280. The GUI library 270 contains the following components: phenomenon graph editor 271; shader parameter editor 272; render preview window 273; phenomenon library explorer 274; Metanode library explorer 275; and code editor and IDE 276. The compiler library 280 contains the following components: MetaSL language compile 281; and Phenomenon shader graph compiler 282.

Figure 16:
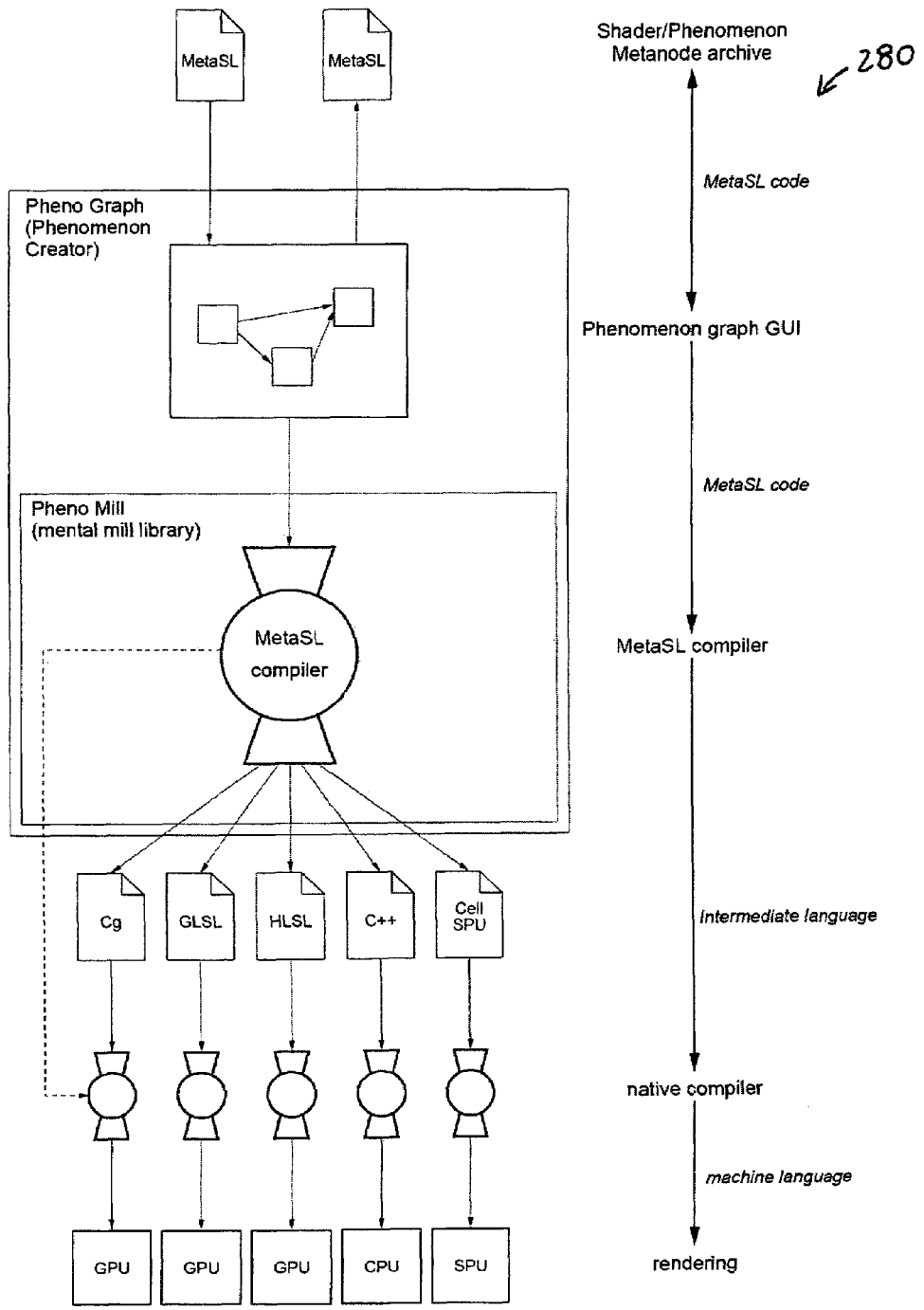
FIG. 16 depicts a diagram of the mental mill compiler library.

FIG. 16 shows a more detailed diagram of the compiler library 280. The mental mill compiler library 280 provides the ability to compile a MetaSL shader into a shader targeted at a specific platform, or multiple platforms simultaneously. The compiler library 280 also provides the ability to compile the shader graphs which implement Phenomenon into flat monolithic shaders. By flattening shader graphs into single shaders, the overhead of shader to shader calls is reduced to nearly zero. This allows graphs built from small shader nodes to be used effectively without incurring a significant overhead.

Figure 17:
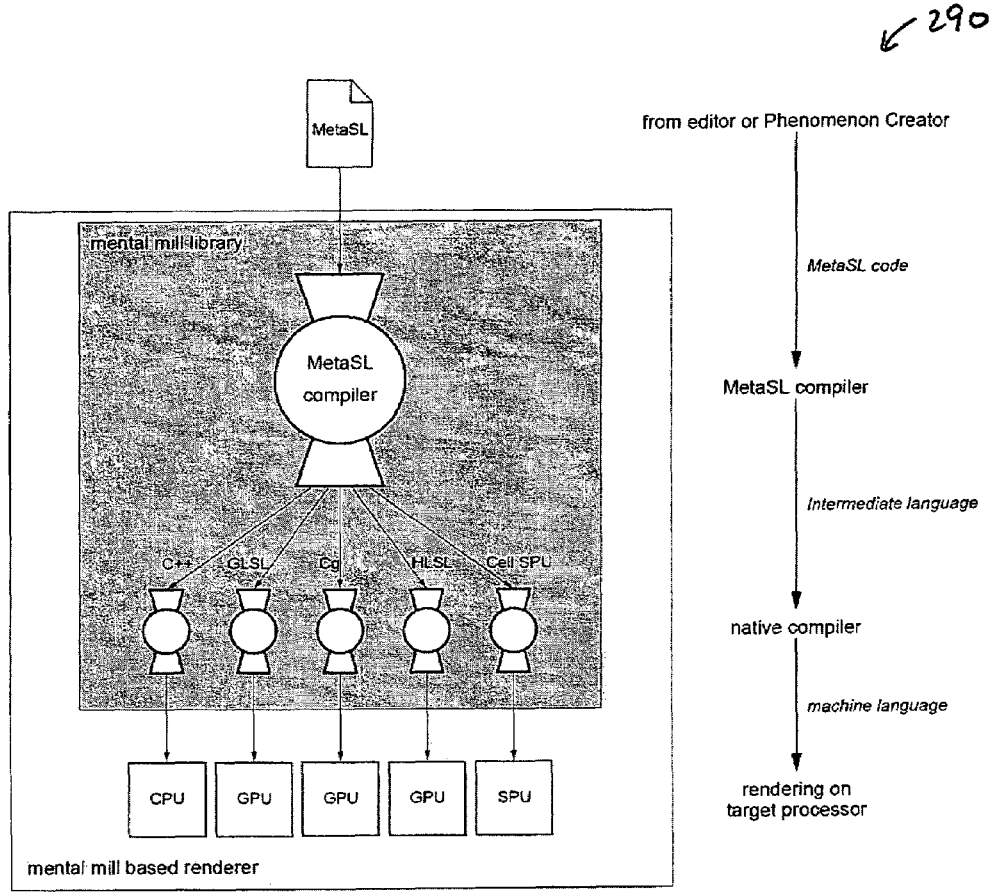
FIG. 17 depicts a diagram of a mental mill based renderer.

According to a further aspect of the invention, mental image's next-generation renderers and the Reality Server® will be based on MetaSL and monolithic C++ shaders. For this purpose, they contain a copy of the MetaSL compiler that generates executable C++ and hardware shader code from MetaSL shaders and Phenomena. FIG. 17 shows a diagram of a renderer 290 according to this aspect of the invention.

In the FIG. 17 configuration, no MetaSL or other shader code is exported. Note that although all language paths are shown in this diagram, typical renderers will not use all five rendering units shown at the bottom; typically only the most appropriate two (one software and one hardware) are used at any one time.

The extensibility of the MetaSL compiler allows multiple target platforms and shading languages to be supported. New targets can be supported in the future as they emerge. This extensibility is accomplished through plug-ins to the back-end of the compiler. The MetaSL compiler handles much of the processing and provides the back-end plug-in with a high level representation of the shader, which it can use to generate shader code. The MetaSL compiler currently targets high level languages, however the potential exists to target GPUs directly and generate machine code from the high level representation. This would allow particular hardware to take advantage of unique optimizations available only because the code generator is working from this high level representation directly and bypassing the native compiler.

The mental mill GUI library provides an intuitive, easy-to-use interface for building sophisticated shader graphs and Phenomenon. The library is implemented in a componentized and platform independent method to allow integration of some or all of the UI components into third-party applications.

A standalone Phenomenon creator application is also provided which utilizes the same GUI components available for integration directly into other applications.

The major GUI components provided by the library are as follows:

Phenomenon Graph editor—The graph editor allows shader graphs to be built by connecting the inputs and output of Metanodes.

Shader Parameter editor—The parameter editor provides intuitive user interface controls to set the parameter values for shader node inputs.

Render Preview window—A preview window provides interactive feedback to the user as they build shader graphs and edit shader parameters.

Phenomenon library explorer—Allows the user to browse a library of pre-built Phenomena. The user can add their own shader graphs to the library and organize its contents.

Metanode library explorer—The Metanode library provides a toolbox of Metanodes that the user can use to build shader graphs. New Metanodes can be created by writing MetaSL code and added to the library.

Code editor and IDE—The code editor and Integrated Development Environment (IDE) allows new Metanodes and monolithic MetaSL shaders to be written directly within the GUI. As the user writes MetaSL code, the code is automatically compiled and the result can be seen immediately in the shader graph and preview windows. An interactive visually based debugger allows the user to step through their MetaSL code and inspect the value of variables. Through the mental mill GUI, the user is able to see the specific numerical value of a variable at a particular pixel location or view the multiple values the variable may take on over the surface of an object.

Figure 18:
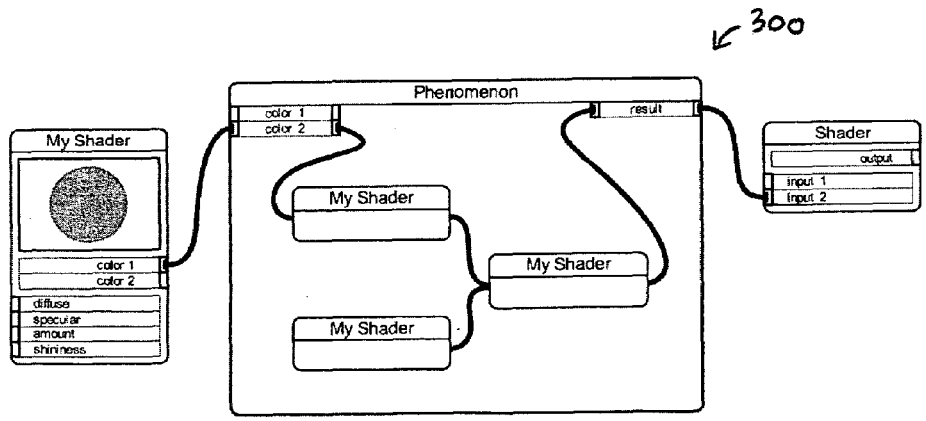
FIG. 18 depicts a screen view of a Phenomenon graph editor.
Figure 19:
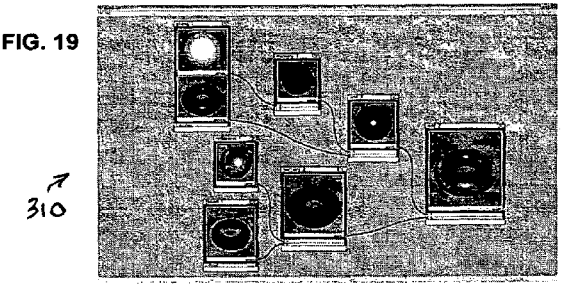
FIGS. 19-23 depict a series of screen shots illustrating the operation of a Phenomenon graph editor and integrated MetaSL graphical debugger.
Figure 20:
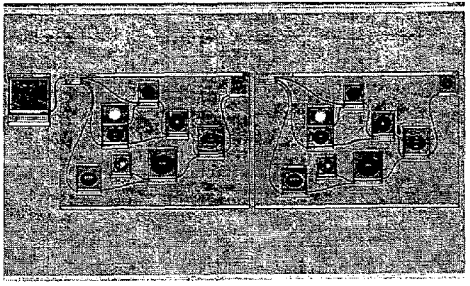
Figure 21:
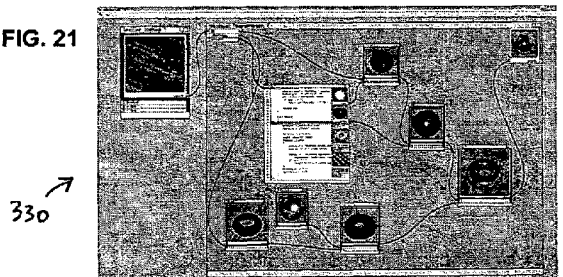
Figure 22:
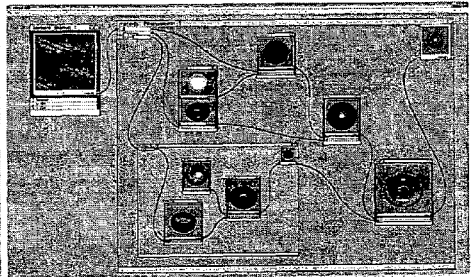
Figure 23:
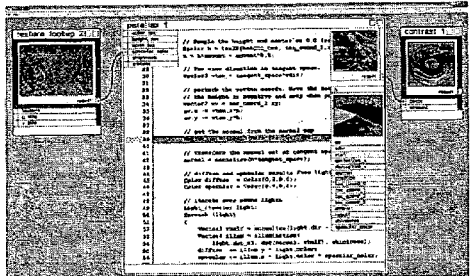

The Phenomenon graph editor allows users to build shaders and Phenomena by clicking and dragging with the mouse to place nodes and attach them together to form a graph. An extensive toolset aids the user in this task, allowing them to easily navigate and maintain a complex shader graph. FIG. 18 shows a diagram of the graph editor user interface 300.

Graph nodes are presented at various levels of detail to allow the user to zoom out to get a big picture of their entire graph, or zoom in to see all the details of any particular node.

Portions of the shader graph can easily be organized into Phenomena that appear as a single node when closed. This allows the user to better deal with large complex graphs of many nodes by grouping subgraphs into single nodes. A Phenomenon can be opened allowing the user to edit its internal graph.

Each node in the shader graph has a preview window to show the state of the shader at that point in the graph. This provides a visual debugging mechanism for the creation of shaders. A user can follow the dataflow of the graph and see the result so far at each node. At a glance, the user can see a visual representation of the construction of their shader.

FIGS. 19-22 show a series of screenshots 310, 320, 330, 340, and 350, illustrating the mental mill Phenomenon graph editor and the integrated MetaSL graphical debugger.

Figures 24, 25A, 25B, 26:
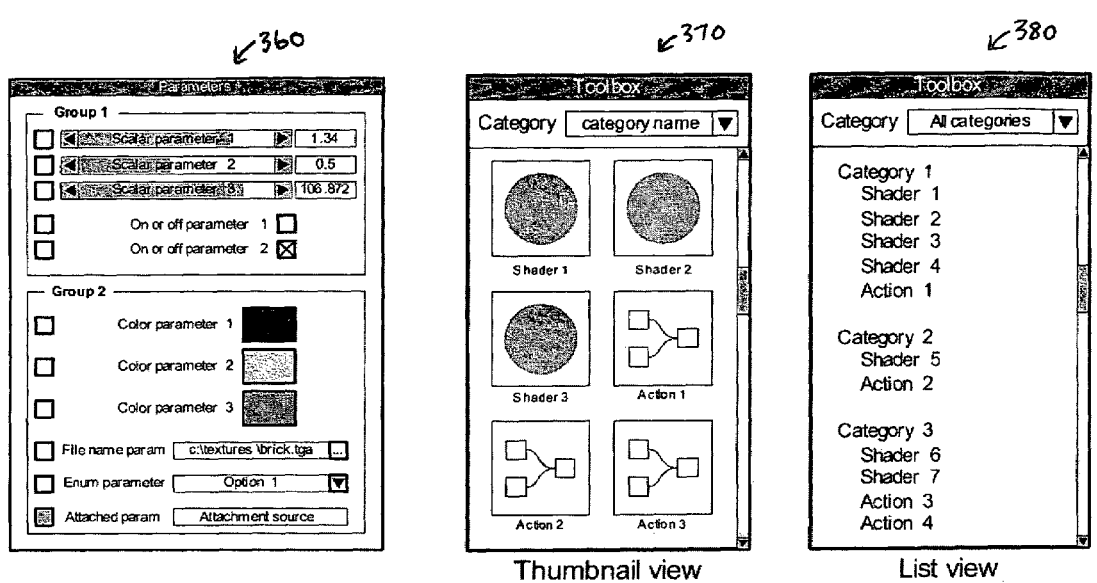
FIG. 24 depicts a view of a shader parameter editor.
FIGS. 25A-B depict, respectively, a thumbnail view and a list view of a Phenomenon/Metanode library explorer.
FIG. 26 depicts a view of a code editor and IDE.

FIG. 24 shows a view of a shader parameter editor 360. The parameter editor 360 allows the user to set specific values for shader and Phenomenon parameters. When creating a new shader type, this allows the user to specify default parameter values for future instances of that type.

Attachments can also be made from within the parameter view and users can follow attachment paths from one node to another within this view. This provides an alternate method for shader graph creation and editing that can be useful in some contexts.

A sizeable render preview window allows the user to interactively visualize the result of their shaders. This preview window can provide real-time hardware accelerated previews of shaders as well as high quality software rendered results involving sophisticated rendering algorithms such as ray tracing and global illumination.

The Phenomenon/Metanode library explorer view allows the user to browse and organize collections of Phenomena and Metanodes. FIG. 25A shows a thumbnail view 370, and FIG. 25B shows a list view 380. To create a new node in the current graph from one of these libraries the user simply drags a node and drops it in their graph.

The libraries can be sorted and categorized for organization. The user can view the libraries in a list view or icon view to see a sample swatch illustrating the function of each node.

The code editor provides the ability for the user to author new Metanodes by writing MetaSL code. The code editor is integrated into the rest of the mental mill GUI so as a user edits shader code, the rest of the user interface interactively updates to reflect their changes.

FIG. 26 shows a code editor and IDE view 390. The code editor is also integrated with the mental mill compiler. As the user edits shader code, they will receive interactive feedback from the compiler. Errors or warnings from the compiler will be presented to the user in this view including an option to highlight the portion of the code responsible for the error or warning.

The mental mill MetaSL debugger presents the user with a source code listing containing the MetaSL code for the shader node in question. The user can then step through the shader's instructions and inspect the values of variables as they change throughout the program's execution. However instead of just presenting the user with a single numeric value, the debugger displays multiple values simultaneously as colors mapped over the surface of an object.

Representing a variable's values as an image rather than a single number has several advantages. First the user can immediately recognize characteristics of the function driving the variable's value and spot areas that are behaving incorrectly. For example, the rate of change of a variable across the surface is visible in an intuitive way by observing how the color changes over the surface. If the user was using the traditional method of debugging a shader one pixel at a time, this would be difficult to recognize.

The user can also use the visual debugging paradigm to quickly locate the input conditions that produce an undesirable result. A shader bug may only appear when certain input parameters take on specific values, and such a scenario may only occur on specific parts of the geometry's surface. The mental mill debugger allows the user to navigate in 3D space using the mouse to find and orient the view around the location on the surface that is symptomatic of the problem.

Traditional debugging techniques allow the user to step through a program line by line and inspect the program state at each statement. Typically the user can only step forward (in the direction of program execution) by one or more lines, but jumping to an arbitrary statement in general requires the program to be restarted.

The mental mill MetaSL debugger allows the user to jump to any statement in their shader code in any order. One particularly nice aspect of this feature is when a code statement modifies the value of a variable of interest. The shader writer can easily step backward and forward across this statement to toggle between the variable's value before and after the statement is executed. This makes it easier for the user to analyze the effect of any particular statement on a variable's value.

Displaying a variable's value as a color mapped over the surface of an object obviously works well when the variable is a color type. This method also works reasonably well for scalar and vector values (with three or less components), but the value must be mapped into the range 0-1 in order to produce a legitimate color. The mental mill UI will allow the user specify a range for scalars and vectors that will be used to map those values to colors. Alternatively mental mill can automatically compute the range for any given viewpoint by determining the minimum and maximum values of the variable over the surface as seen from that viewpoint.

In addition to viewing a variable as colors mapped over the surface of an object, the user can utilize other visualization techniques provided by mental mill. One such technique for vector values allows the user to sweep the mouse over the surface of an object and the mental mill debugger will draw an arrow pointing in the direction specified by the variable at that location on the surface. The debugger will also display the numeric value for a variable at a pixel location, which can be selected by the mouse or specified by the user by providing the pixel coordinates. This technique is illustrated in FIGS. 27A-C, which are a series of screen images 400, 410, 420, displayed in response to different mouse positions at the surface of the image.

The mental mill shader debugger illustrates another benefit of the platform independence of mental mill. The debugger can operate in either hardware or software mode and works independently of any particular rendering algorithm or platform. The fact that the shader debugger is tightly integrated into mental mill's Phenomenon creation environment further reduces the create/test cycle and allows the shader creator to continue to work at a high level, insulated from platform dependencies.

The mental mill GUI library is implemented in a platform independent manner. The shader graph editor component uses a graphics API to insure smooth performance when editing complex shader graphs. A graphics abstraction layer prevents a dependency on any particular API. For example some applications may prefer the use of DirectX over OpenGL to simplify integration issues when their application also uses DirectX.

The rest of the GUI also uses an abstraction layer to prevent dependencies on the user interface libraries of any particular platform operating system. FIG. 28 shows a diagram of a GUI library architecture 430 according to this aspect of the invention. FIG. 28 illustrates how these abstraction layers insulate the application and the mental mill user interface from platform dependencies.

When integrating the mental mill GUI components into a third party application, it is possible to customize the look and feel of the components to better match the standards of the host application. This could involve purely superficial customization such as using specific colors or fonts or could involve customizing the specific appearance of elements and their behaviors as the user interacts with them.

The following are ways in which the mental mill GUI library allows customization:

Phenomenon graph appearance—Elements of the Phenomenon graph, such as Metanodes and connection lines, are drawn by invoking a plug-in callback function. A default drawing function is provided; however, third parties can also provide their own to customize the appearance of the shader graph to better match their application. The callback function also handles mouse point hit testing since it is possible the elements of a node could be arranged in different locations.

Keyboard shortcuts—All keyboard commands are remappable.

Mouse behavior—Mouse behavior such as the mapping of mouse buttons are customizable.

Toolbar items—Each toolbar item can be omitted or included.

View windows—Each view window is designed to operate on its own without dependencies on other windows. This allows a third party to integrate just the Phenomenon graph view into their application, for example. Each view window can be driven by the API so third parties can include any combination of the view windows, replacing some of the view windows with their own user interface.

The mental mill shading language—MetaSL, is simple, intuitive and yet still expressive enough to represent the full spectrum of shaders required for the broad range of platforms supported by mental mill.

The MetaSL language uses concepts found in other standard shading languages as well as programming languages in general; however, MetaSL is designed for efficient shader programming. Users familiar with other languages will be able to quickly learn MetaSL while users without programming technical expertise will likely be able to understand many parts of a MetaSL shader due to its readability.

There is now provided a functional overview of MetaSL.

The shader class The MetaSL shader class declaration describes the shader's interface to the outside world. Shader declarations include the specification of input and output parameters as well as other member variables.

The shader declaration also contains the declaration of the shader's entry point, a method called main. In addition an optional event method allows the shader to respond to initialization and exit events.

Shader classes can also include declarations of other member variables and methods. Other member variables can hold data used by the shading calculation and are initialized from the shader's event method. Other member methods can serve as helper methods called by the shader's main or event methods.

The following is an example shader declaration:

```
shader Phong
{
    input:
        Color ambient;
        Color diffuse;
        Color specular;
        Scalar shininess;
    output:
        Color result;
        void main( );
        void event( );
};
```

MetaSL provides a comprehensive range of built-in data types.

Scalar—floating point values
Bool—Booleans
String—character string
Color colors

Vector—vectors of length 2, 3, or 4 are provided. In addition vectors of booleans and integers are also supported.

Matrix—matrices of size N×M are supported where N and M can be 2, 3, or 4.

Texture—1d, 2d, 3d, and cube map texture types are provided.

Shader—a shader instance data type

A standard set of math functions and operators are provided to work with vectors and matrices. Arithmetic operators are supported to multiply, divide, add and subtract matrices and vectors. This allows for compact and readable expressions such as:

Vector3 result=$pt+v$*mat;

A concept called swizzling is also supported. This allows components of a vector to be read or written to while simultaneously re-ordering or duplicating components. For example:

| | |
|---|---|
| vect.yz | Results in a 2d vector constructed from the y and z components of vect. |
| vect.xxyy | Results in a 4d vector with the x component of vect assigned to the first two components and the y component of vect assigned to the last two. |
| v1.yz = v2.xx | Assigns the x component of v2 to both the y and z components of v1. |

Vector types can also be implicitly converted from one type to another as long as the conversion doesn't result in a loss of data. The Color type is provided primarily for code readability and is otherwise synonymous with Vector4.

In addition to the built-in types provided by MetaSL, custom structure types can be defined. Structures can be used for both input and output parameters as well as other variables. Both structures and built-in types can be declared as arrays. Arrays can have either a fixed or dynamic size. Array elements are accessed with bracket ([ ]) syntax.

```
struct Texture_layer
{
    Texture2d texture;
    Scalar weight;
};
Texture_layer tex_layers[4];
```

This example shows a custom structure type with a variable declared as a fixed length array of that custom type.

MetaSL supports the familiar programming constructs that control the flow of a shader's execution. Specifically these are: for; while; do, while; if, else; switch, case.

The task of iterating over scene lights and summing their illumination is abstracted in MetaSL by a light loop and iterator. An instance of a light iterator is declared and a for each statement iterates over each scene light. Inside the loop the light iterator variable provides access to the resulting illumination from each light.

```
Color diffuse_light(0,0,0,0);
Light_iterator light;
foreach (light) {
    diffuse_light += max(0, light.dot_nl) * light.color;
}
```

The shader writer doesn't need to be concerned with which lights contribute to each part of the scene or how many times any given light needs to be sampled. The light loop automates that process.

Within a shader's main method, a set of special state variables are implicitly declared and available for the shader code to reference. These variables hold values describing both the current state of the renderer as well as information about the intersection that led to the shader call. For example, normal refers to the interpolated normal at the point of intersection. State variables are described in greater detail below.

There are two constructs for handling lights and illumination within MetaSL. The first is the BRDF (bidirectional reflectance distribution function) shader type, which allows a surface's illumination model to be abstracted and rendered in a highly efficient manner. Alternatively, light iterators provide a more traditional method for iterating over scene lights and samples within each light.

The BRDF shader approach is often more desirable for several reasons. It allows for efficient sampling and global illumination without the need to create a separate photon shader. In general a single BRDF implementation can be used unchanged by different rendering algorithms. It facilitates the ability to perform certain lighting computations, such as tracing shadow rays, in a delayed manner which allows for significant rendering optimizations. It also provides a unified description of analytical and acquired illumination models.

In MetaSL, BRDFs are first class shader objects. They have the same event method as regular shaders. However, instead of a main method, several other methods must be supplied to implement BRDFs.

FIG. 29 shows a table 440 listing the methods required to implement a BRDF shader.

The in_dir and out_dir vectors in these methods are specified in terms of a local coordinate system. This coordinate system is defined by the surface normal as the z axis and the tangent vectors as the x and y axis.

A BRDF is declared like a regular shader, except the brdf keyword is used in place of the shader keyword. Also BRDFs differ from regular shaders by the fact that they have no output variables; the BRDF itself is its own output. The following is an example implementation for a Phong BRDF:

```
brdf Phong
{
  input:
    Color diffuse;
    Color glossy;
    Color specular;
    Scalar exponent;
    Color eval_diffuse(
        Vector3 in_dir,
        Vector3 out_dir)
    {
        return in_dir.z * out_dir.z < 0.0 ?
            diffuse : Color(0,0,0);
    }
    Color eval_glossy(
        Vector3 in_dir,
        Vector3 out_dir)
    {
        Vector3 r = Vector3(-in_dir.x, -in_dir.y, in_dir.z);
        return pow( saturate(dot(r, out_dir)), exponent) * glossy;
    }
    Color eval_specular(
        Vector3 in_dir,
        Int specular_component,
        out Vector3 out_dir,
        out Ray_type out_type)
```

-continued

```
    {
        out_dir = Vector3(-in_dir.x, -in_dir.y, in_dir.z);
        out_type = RAY_REFLECT;
        return specular;
    }
    Int specular_components( )
    {
        return 1;
    }
};
```

The combination of a surface shader and direct and indirect BRDF shaders together define the shading for a particular surface. MetaSL supplies two functions which a surface shader can use to perform illumination computations: direct_lighting( ), which loops over some or all lights and evaluates the given BRDF and indirect_lighting( ), which computes the lighting contribution from global illumination. These two functions compute the illumination as separate diffuse, glossy, and specular components and store the results in variables passed to them as out arguments.

```
void direct_lighting(
    out Color diffuse,
    out Color glossy,
    out Color specular);
void indirect_lighting(
    out Color diffuse,
    out Color glossy,
    out Color specular);
```

In most cases the variables passed to the lighting functions as out parameters can be the actual output parameters of the root surface shader node. In other words, the calls to the lighting functions produce the final result of the shader. As long as there are no other immediate dependencies on these output values the renderer is free to defer their computation, which allows for significant optimizations.

Another possibility is that the outputs of the surface shader are attached to the inputs of other nodes. This places an immediate dependency on the results of the lighting functions, which is allowed but removes the possibility for deferred lighting computations and the potential performance gains that go with it.

To avoid placing dependencies on the results of the surface shader, most operations that might have been performed with the surface shader outputs can be applied to the BRDF nodes themselves. A limited set of math operations can be applied to BRDF nodes, but these are usually enough to accomplish the most common use cases. These operations are:

Add two or more BRDFs

Multiply a BRDF with a scalar or color

Dynamically select a BRDF from a set

The ability to add BRDFs after scaling them with a scalar or color makes it possible to blend multiple illumination models represented by BRDF nodes. The scalar or color factor doesn't have to be constant and can be driven by the output of other shaders, for example to blend two BRDFs as a function of a texture of Fresnel falloff. FIG. 30 shows a diagram of an example configuration 450, in which two BRDFs are mixed:

In the FIG. 30, the "Mix BRDF" node is a composite BRDF that is implemented by scaling its two BRDF inputs by "amount" and "1-amount", respectively. In this example, the "amount" parameter is attached to the output of a texture which controls the blending between the two BRDFs. The Phong BRDF's specular reflection is attenuated by a Fresnel falloff function.

The material Phenomenon collects together the surface shader, which itself may be represented by a shader graph, and the direct and indirect BRDF shaders. When the surface shader invokes the lighting functions, the BRDF shaders in the material Phenomenon are used to iterate over light samples to compute the result of the lighting functions. Since there are no dependencies on the result of the surface shader in this case, the lighting calculation can be deferred by the renderer to an optimal time.

The BRDF shader type unifies the representation of BRDFs represented by an analytical model, such as Phong, with acquired BRDFs which are represented by data generated by a measuring device. The direct_lighting( ) and indirect_lighting( ) functions are not concerned with the implementation of the BRDFs they are given and thus operate equally well with acquired or analytical BRDFs.

The raw data representing acquired BRDFs may be provided in many different forms and is usually sparse and unstructured. Typically the raw data is given to a standalone utility application where it is preprocessed. This application can organize the data into a regular grid, factor the data, and/or compress the data into a more practical size. By storing the data in a floating point texture, measured BRDFs can be used with hardware shading.

FIG. 31 is a diagram illustrating a pipeline 460 for shading with acquired BRDFs. The standalone utility application processes raw BRDF data and stores structured data in an XML file, optionally with references to a binary file or a texture to hold the actual data. The XML file provides a description of the data format and associated model or factorization. This file and its associated data can then be loaded by a BRDF shader at render time and used to define the BRDF. The XML file can also be fed back into the utility application for further processing as required by the user.

Storing the data in a floating point texture allows a data-based BRDF to operate in hardware. In this case the texture holding the data and any other parameter to describe the data model can be made explicit parameters of the BRDF node.

For software shading with measured BRDFs, there are two options to load the data. The first is to implement a native C++ function that reads the data from a file into an array. This native function can then be called by a Level 2 MetaSL BRDF shader. The other option is to implement the entire BRDF shader as a Level 3 MetaSL shader, which gives the shader complete access to all the features of C++. This shader can read the data file directly, but loses some of the flexibility of Level 2 shaders. As long as the data can be loaded into a Level 2 compatible representation such as an array, the first option of loading the data from a native C++ function is preferable. If the data must be represented by a structure requiring pointers (such as a kd-tree) then the part of the implementation which requires the use of pointers will need to be a Level 3 shader.

A technique is a variation of a shader implementation. While some shaders may only require a single technique, there are situations where it is desirable to implement multiple techniques. The language provides a mechanism to declare multiple techniques within a shader.

Techniques can be used when it is desirable to execute different code in hardware or software contexts, although often the same shader can be used for both hardware and software. Another use for techniques is to describe alternate versions of the same shader with differing quality levels.

A technique is declared within the shader class. Each technique has its own version of the main and event methods, but shares parameters and other member variables or methods with other techniques.

The following is an example of technique declarations within a shader.

```
Shader my_shader {
    input:
        Color c;
    output:
        Color result;
    technique software {
        void event (Event_type event);
        void main( );
    }
    technique hardware {
        void event(Event_type event);
        void main( );
    }
};
```

The language includes a mechanism to allow material shaders to express their result as a series of components instead of a single color value. This allows the components to be stored to separate image buffers for later compositing. Individual passes can also render a subset of all components and combine those with the remaining components that have been previously rendered.

A material shader factors its result into components by declaring a separate output for each component. The names of the output variable define the names of layers in the current rendering.

```
shader Material_shader {
    input:
        ...
    output:
        Color diffuse_lighting;
        Color specular_lighting;
        Color indirect_lighting;
};
```

This example shows a material shader that specifies three components for diffuse, specular, and indirect lighting.

When multiple material shaders exist in a scene that factor their result into different layers, the total number of layers could be large. A user may not wish to allocate separate image buffers for each of these layers. A mechanism in the scene definition file will allow the user to specify compositing rules for combining layers into image buffers. The user will specify how many image buffers are to be created and for each buffer they would specify an expression which determines what color to place in that buffer when a pixel is rendered. The expression can be a function of layer values such as:

```
Image1 = indirect_lighting
Image2 = diffuse_lighting + specular_lighting
```

In this example, the three layers from the shader result structure in the previous example are routed to two image buffers.

In order for users of shaders to interact with them in a GUI and set their parameter values, an application must know some additional information about the shader parameters and the shader itself. MetaSL provides functionality to annotate shader parameters, techniques, and the shader itself with additional metadata.

Shader annotations can describes parameter ranges, default values, and tooltip descriptions among other things. Custom annotation types can be used to attach arbitrary data to shaders as well.

MetaSL includes a comprehensive collection of built in functions. These include math, geometric, and texture lookup functions to name a few. In addition functions that may only be supported by software rendering platforms are also included. Some examples are functions to cast reflection rays or compute the amount of global illumination at a point in space.

B. Mental Mill GUI Specification

The mental mill™ Phenomenon™ creation tool allows users to construct shaders interactively, without programming. Users work primarily in a shader graph view where Metanodes™ are attached to other shader nodes to build up complex effects. Metanodes are simplistic shaders that form the building blocks for constructing more complicated Phenomena™.

The definition of "Phenomena" was introduced with the mental ray® renderer to completely capture the notion of "visual effects." In short, a Phenomenon can be a shader, a shader tree, or a set of cooperating shader trees (DAGs), including geometry shaders, resulting in a single parameterized function with a domain of definition and a set of boundary conditions in 3D space, which include those boundary conditions which are created at run-time of the renderer, as well as those boundary conditions which are given by the geometric objects in the scene.

A Phenomenon is a structure containing one or more shaders or shader DAGs and various miscellaneous "requirement" options that control rendering. To the outside, a Phenomenon looks exactly like a shader with input parameters and outputs, but internally its function is not implemented with a programming language but as a set of shader DAGs that have special access to the Phenomenon interface parameters. Additional shaders or shader DAGs for auxiliary purposes can be enclosed as well. Phenomena are attached at a unique root node that serves as an attachment point to the scene. The internal structure is hidden from the outside user, but can be accessed with the mental mill Phenomenon creation tool.

For users that wish to develop shaders by writing code, mental mill will also provide an integrated development environment (IDE) for creating Metanodes using mental images' shader language: MetaSL™. Users may develop complete monolithic shaders by writing code, or Metanodes which provide specific functionality with the intention that they will be components of Phenomenon shader graphs.

The mental mill tool also provides an automatically generated graphical user interface (GUI) for Phenomena and Metanodes. This GUI allows the user to select values for parameters and interactively preview the result of their settings.

Prior to being attached to a scene, parameter values must be specified to instantiate the Phenomenon. There are two primary types of Phenomena which a user edits. A Phenomenon whose parameter values have not been specified (referred to as free-valued Phenomena) and Phenomena whose parameters have been fixed, or partially fixed (referred to as fixed Phenomena). When a user creates a new Phenomenon by building a shader graph or writing MetaSL code (or a combination of both), they are creating a new type of Phenomenon with free parameter values. The user can then create Phenomena with fixed parameter values based on this new Phenomena type. Typically many fixed value Phenomena will exist based on a particular Phenomenon. If the user changes a Phenomenon, all fixed Phenomena based on it will inherit that change. Changes to a fixed Phenomenon are isolated to that particular Phenomenon.

When the user chooses to create a new Phenomenon type, mental mill begins by creating a new empty Phenomenon leaving the user to construct its shader graph. The user will also be able to specify the Phenomenon interface parameters which form the public interface for their shader. In addition, they will be able to specify the number of Phenomenon roots and other options.

There is now described the mental mill user interface and the features it provides.

The mental mill application UI is comprised of several different views with each view containing different sets of controls. The view panels are separated by four movable splitter bars. These allow the relative sizes of the views to be adjusted by the user.

FIG. 32 is a screenshot 470 illustrating the basic simplified layout. The primary view panels are labeled, but for simplicity the contents of those views aren't shown. These view panels include the following: toolbox 472; phenomenon graph view 474; code editor view 476; navigation controls 478; preview 480; and parameter view 482.

The Phenomenon graph view 474 allows the user to create new Phenomena by connecting Metanodes or Phenomenon nodes together to form graphs. An output of a node can be connected to one or more inputs which allow the connected nodes to provide values for the input parameters they are connected to.

The Phenomenon graph view area 474 can be virtually infinitely large to hold arbitrarily complex shader graphs. The user can navigate around this area using the mouse by holding down the middle mouse button to pan and the right mouse button to zoom (button assignments are remappable). The navigation control described in a following section provides more methods to control the Phenomenon view.

The user can create nodes by dragging them from the toolbox 472, as described below, into the Phenomenon graph view 474. Once in the graph view 474, nodes can be positioned by the user. A layout command will also perform an automatic layout of the graph nodes.

FIG. 33 shows a graph node 490. The graph node 490 (either a Phenomenon node or Metanode) comprises several elements:

Preview—The preview window portion of the node allows the user to see the result of the shader node rendered on a surface. A sphere is the default surface, but other geometry can be specified. All nodes can potentially have preview windows, even if they are internal nodes of the shader graph. The preview is generated by considering the individual node as a complete shader and rendering sample geometry using that shader. This allows the user to visualize the dataflow through the shader graph since they can see the shader result at each stage of the graph. The preview part of the node can also be closed to reduce the size of the node.

Output—Each node has at least one output, but some nodes may have more than one output. The user clicks and drags on an output location to attach the output to another node's input. An output can be attached to more than one input.

Inputs—Each node has zero or more input parameters. An input can be attached to the output of another node to allow that shader to control the input parameter's value; otherwise the value is settable by the user. An input can be attached to only one output. When the user hovers the mouse over an input for a short period of time, a tooltip is displayed that provides a short description of the parameter. The text for the tooltip is provided by an attribute associated with the shader.

Some input or output parameters may be structures of sub-parameters. In this case the node's input parameter will have a + or button to open or close the structure. Attachments can be made to individual elements of the structure. FIG. 34 shows a graph node 500 including sub-parameters.

Phenomenon nodes themselves contain shader graphs. At the top level, the user can create multiple Phenomenon nodes, each representing a new shader. A command will let the user dive into a Phenomenon node which causes the Phenomenon graph view to be replaced with the graph present inside the Phenomenon. Alternatively a Phenomenon can be opened directly in the graph in which it resides. This allows the user to see the nodes outside the Phenomenon, and possibly connected to it, as well as the contents of the Phenomenon itself.

Inside the Phenomenon, the user has access to the Phenomenon interface parameters as well as the Phenomenon output and auxiliary roots. The inputs to a Phenomenon (the interface parameters) appear in the upper left corner of the Phenomenon and behave like outputs when viewed from the inside of the Phenomenon. The outputs of a Phenomenon appear in the upper right corner and behave as inputs when viewed from inside.

A shader graph inside a Phenomenon can also contain other Phenomenon nodes. The user can dive into these Phenomenon nodes in the same way, and repeat the process as long as Phenomena are nested.

Figure 35:
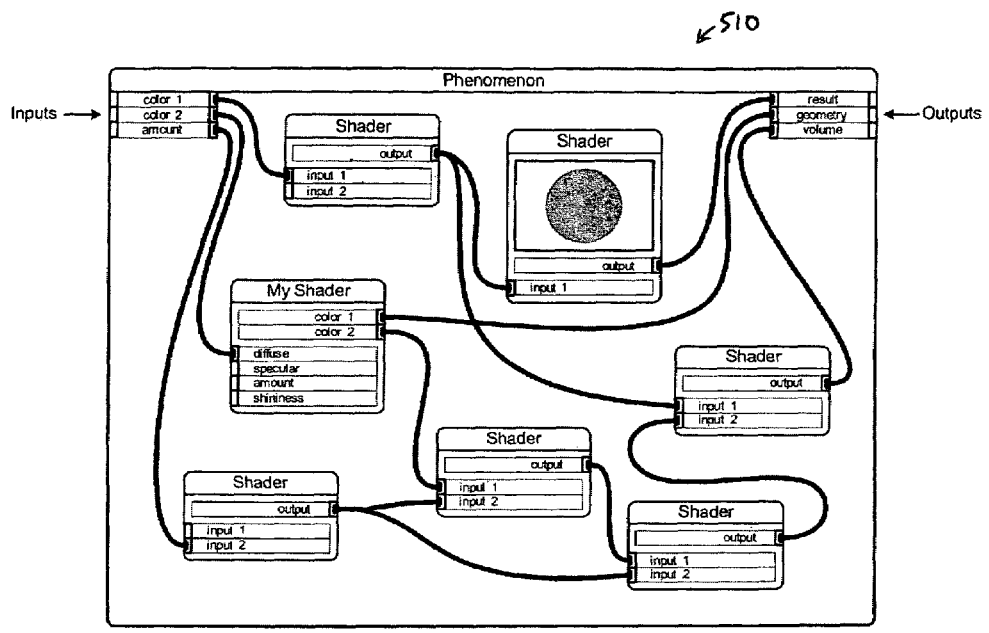
FIG. 35 depicts a sample graph view when inside a Phenomenon.

FIG. 35 shows a sample graph view 510 when inside a Phenomenon. Although the entire graph is shown in this view, it may be common to have a large enough graph such that the whole graph isn't visible at once, unless the user zooms far out. Notice that in this example all of the nodes except one have their preview window closed.

Figure 36:
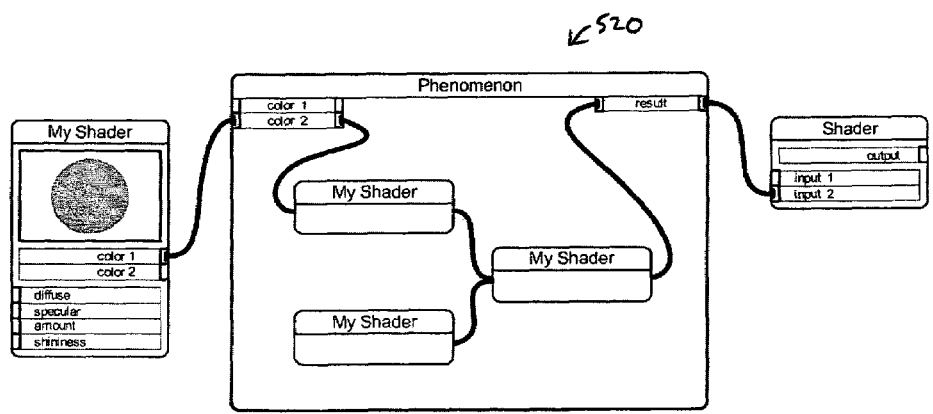
FIG. 36 depicts a sample graph view when the Phenomenon is opened in-place.

When a Phenomenon is opened inside a graph it can either be maximized, in which case it takes over the entire graph view, or it can be opened in-place. When opened in place, the user is able to see the graph outside the Phenomenon as well as the graph inside as shown in the graph view 520 in FIG. 36.

Figure 37:
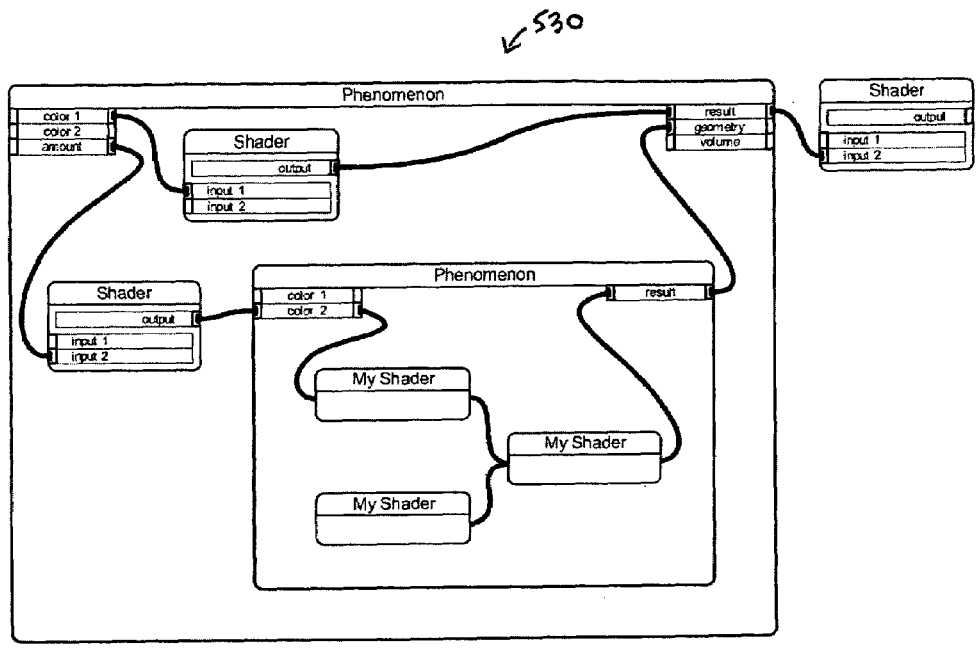
FIG. 37 depicts a sample graph view when a Phenomenon is opened inside another Phenomenon.

Since Phenomena can be nested inside other Phenomena, it's possible to open a Phenomenon inside another open Phenomenon and create new nested Phenomenon. FIG. 37 shows a graph view 530 illustrating such a case.

If the user drags a node into the top level, they will create a Phenomenon with fixed values based on the Phenomenon type that they chose to drag. The top level fixed Phenomenon node has parameters which may be edited, but not attached to other nodes. The fixed Phenomenon refers back to the Phenomenon from which it was created and inherits any changes to that Phenomenon. A command is available that converts a fixed Phenomenon into a free-valued Phenomenon, which allows the user to modify the Phenomenon without affecting other instances.

If the user drags a node into a Phenomenon, a fixed-valued Phenomenon or Metanode will be created inside the Phenomenon, depending on the type of the node created. Nodes inside Phenomena can be wired to other nodes or Phenomenon interface parameters. If the node the user dragged into a Phenomenon was itself a Phenomenon node, then a Phenomenon with fixed values is created. Its parameter values can be set, or attached to other nodes, but because it is a fixed Phenomenon that refers back to the original, the user can not dive into the Phenomenon node and change it. Also any changes to the original will affect the node. If the user wishes to change the Phenomenon, a command is available that converts the node into a new free-valued Phenomenon which the user can enter and modify.

To create shader attachments, the user clicks on the output area of one node and drags to position the mouse cursor over the input of another node. When they release the mouse, a connection line is drawn which represents the shader connection. If the connection is not a valid one, the cursor will indicate this to the user when the mouse is placed over a potential input during the attachment process.

A type checking system will ensure that shaders can only be attached to inputs that match their output type. In some cases an attachment can be made between two parameters of different types if an adapter shader is present to handle the conversion. For example a scalar value can be attached to a color input using an adapter shader. The adapter shader may convert the scalar to a gray color or perform some other conversion depending on settings selected by the user. Adapter shaders are inserted automatically when they are available. When the user attaches parameters that require an adapter, the adapter will automatically be inserted when the user completes the attachment. In addition, mental mill will ensure that the user doesn't inadvertently create cycles in their graphs when making attachments.

Figure 38:
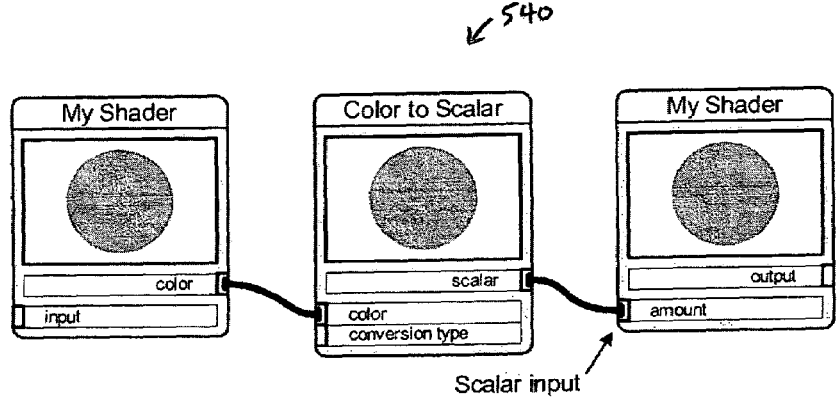
FIG. 38 depicts a view illustrating the result of attaching a color output to a scalar input.

FIG. 38 shows a view 540, illustrating the result of attaching a color output to a scalar input. The 'Color to Scalar' adapter shader node is inserted in-between to perform the conversion. The conversion type parameter of the adapter node would allow the user to select the method in which the color is converted to a scalar. Some options for this parameter might be:

Average—Take the average of the red, green, and blue components.

NTSC weighted luminance—Take the weighted average of red, green, and blue.

Select component—Take only one of the color's red, green, blue or alpha components.

Both nodes and connection lines can be selected and deleted. When deleting a node, all connections to that node are also deleted. When deleting a connection, only the connection itself is deleted.

As a shader graph becomes more complex, the user can organize the graph by boxing up parts of the graph into Phenomenon nodes. A command is available that takes the currently selected subgraph and converts it to a Phenomenon node. The result is a new Phenomenon with interface parameters for each input of selected nodes that are attached to an unselected node. The Phenomenon will have an output for each selected node whose output is attached to an unselected node. The new Phenomenon will be attached in place of the old subgraph which is moved inside the Phenomenon. The result is no change in behavior of the shader graph, but the graph will appear simplified since several nodes will be replaced by a single node. The ability of a Phenomenon to encapsulate complex behavior in a single node is an important and powerful feature of mental mill.

Figure 39:
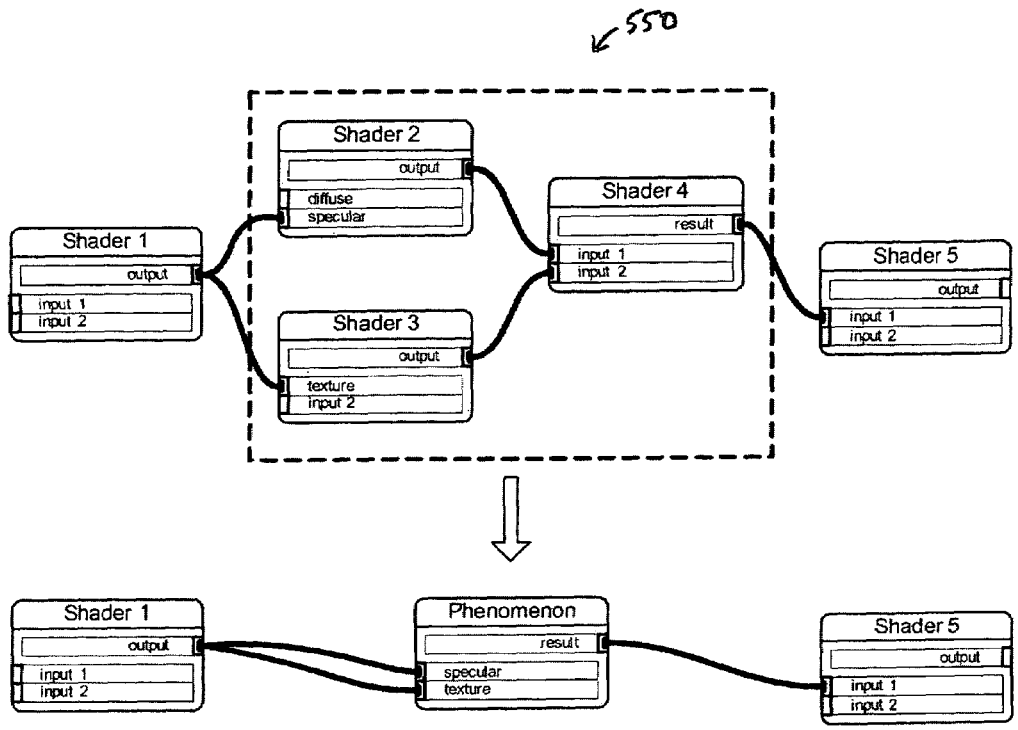
FIG. 39 depicts a view illustrating shaders boxed up into a new Phenomenon node.

FIG. 39 shows a view 550, in which shaders 2, 3, and 4 are boxed up into a new Phenomenon node. The connections to outside nodes are maintained and the results produced by the graph aren't changed, but the graph has become slightly more organized. Since Phenomenon can be nested, this type of grouping of sub-graphs into Phenomenon can occur with arbitrary levels of depth.

A preview window displays a sample rendering of the currently selected Phenomenon. The image is the same image shown in the preview window of the Phenomenon node, but can be sized larger to show more detail.

The preview will always show the result of the topmost Phenomenon node. Once the user enters a Phenomenon, the preview will show the result of that Phenomenon regardless of which node is selected. This allows the user to work on the shader graph inside a Phenomenon while still previewing the final result.

The navigation window provides controls to allow the user to navigate the Phenomenon graph. Buttons will allow the user to zoom to fit the selected portion of the graph within the Phenomenon graph view or fit the entire graph to the view.

A "bird's eye" control shows a small representation of the entire shader graph with a rectangle that indicates the portion of the graph shown in the Phenomenon graph view. The user can click and drag on this control to position the rectangle on the portion of the graph they wish to see. There are also "zoom in" and "zoom out" buttons and a slider to allow the user to control the size of the view rectangle. As the user changes the zoom level, the rectangle becomes larger or smaller. Conformal views are also being considered.

Figure 40:
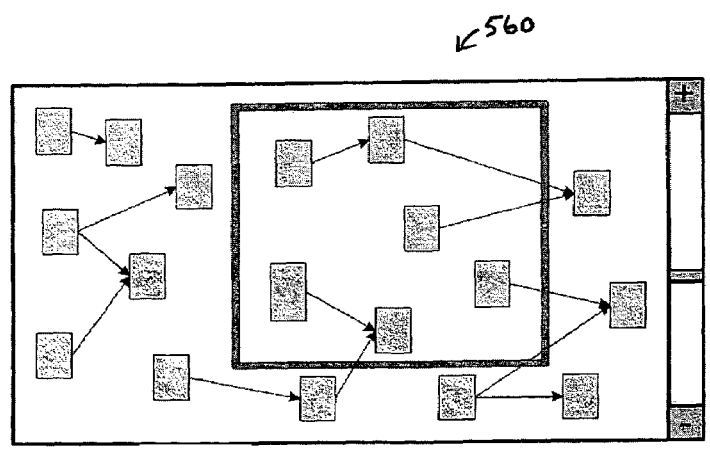
FIG. 40 depicts a bird's eye view control for viewing a sample shader graph.
Figures 41A, 41B, 41C, 41D:
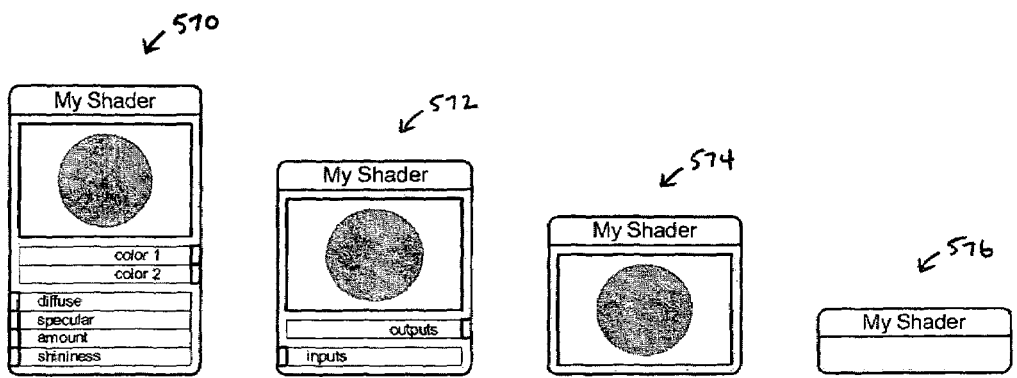
FIGS. 41A-D depict a series of views illustrating the progression of node levels of detail.

FIG. 40 is a view 560 showing the bird's eye view control viewing a sample shader graph. The dark gray rectangle 562 indicates the area visible in the Phenomenon graph view.

When the user zooms in and out, shader nodes in the graph view become larger or smaller. As the user zooms further out and the nodes become smaller, certain element of the node disappear to simplify the node. FIGS. 41A-D shows a series of views 570, 572, 574, and 576, illustrating the progression of node levels of detail.

When the inputs or outputs collapse, the user can still make attachments. When dragging an attachment to a node, a popup list will let the user select the actual input when they release the mouse.

As described in the Phenomenon graph section, the user can dive into a Phenomenon node which causes the graph view to be replaced with the graph of the Phenomenon they entered. This process can continue as long as Phenomena are nested in other Phenomena. The navigation window provides back and forward buttons to allow users to retrace their path as they navigate through nested Phenomenon.

The toolbox window contains the shader nodes which make up the building blocks that shader graphs are built from. The user can click and drag nodes from the toolbox into the Phenomenon graph view to add nodes to the shader graph.

Nodes appear in the toolbox as an icon and a name. Typically the icon will be a sphere rendered using the shader, but in some cases other icons may be used. The list of nodes can also be viewed in a condensed list without icons to allow more nodes to fit in the view. Some nodes may be Phenomenon nodes, i.e., nodes defined by a shader graph, and other nodes may be Metanode, i.e., nodes defined by MetaSL code. This often is not important to the user creating shader graphs since both types of nodes can be used interchangeably. Phenomenon nodes will be colored differently from Metanodes, or otherwise visually distinct, allowing the user to differentiate between the two. Phenomenon nodes can be edited graphically by editing their shader graphs while Metanodes can only be edited by changing their MetaSL source code.

Nodes are sorted by category and the user can choose to view a single category or all categories by selecting from a drop down list of categories. There is also a command to bring up a dialog which allows the user to organize their categories. In this dialog the user can create or delete categories and control the category assigned to each node type.

In addition to Phenomena or Metanodes, the toolbox also contains "actions." Actions are fragments of a complete shader graph that the user can use when building new shader graphs. It is common for patterns of shader nodes and attachments to appear in different shaders. A user can select a portion of a shader graph and use it to create a new action. In the future if they wish to create the same configuration of nodes they can simply drag the action from the toolbox into the shader graph to create those nodes.

Figures 42A, 42B, 43:
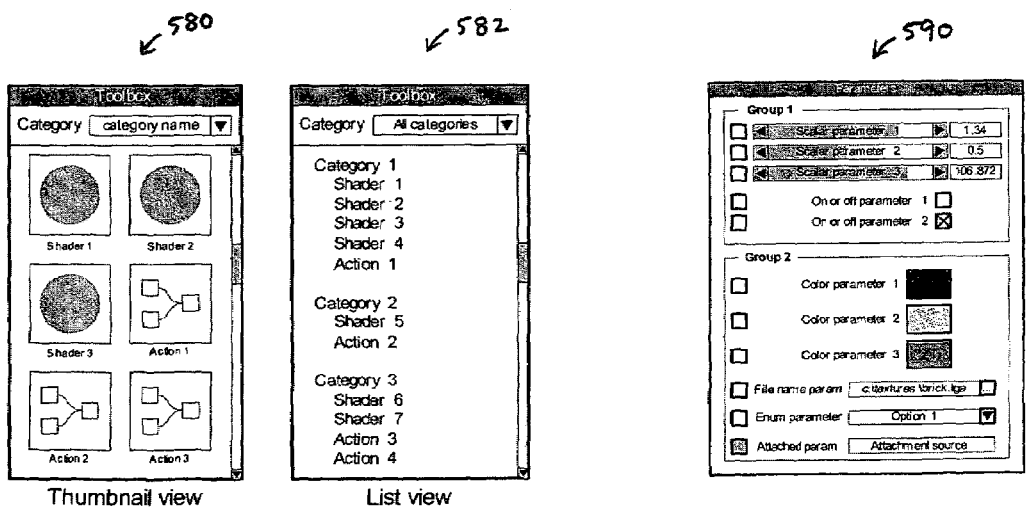
FIGS. 42A-B depict a toolbox in thumbnail view and list view.
FIG. 43 depicts a parameter view for displaying controls that allows parameters of a selected node to be edited.

FIGS. 42A-B are views 580 and 582, illustrating the toolbox in the two different view modes. The FIG. 42A view 580 shows a thumbnail view mode and the FIG. 38B view 582 shows a list view mode.

The toolbox is populated with nodes defined in designated shader description files. The user can select one or more shader description files to use as the shader library that is accessible through the toolbox. There are commands to add node types to this library and remove nodes. The mental mill tool will provide an initial library of Metanodes as well.

FIG. 43 shows a partial screenshot 590 illustrating a sample of some controls in the parameter view. The parameter view displays controls that allow parameters of the selected node to be edited. These controls include sliders, color pickers, check boxes, drop down lists, text edit fields, and file pickers, to name a few.

When editing free-valued Phenomenon interface parameters, it is the default value that is being edited. Fixed-valued Phenomena may override those parameter values.

When shader attachments are allowed, a column of buttons is present that allows the user to pick an attachment source from inside the parameter view. It should be noted that, as currently implemented, shader attachments are not allowed when editing a top-level Phenomenon. This button will cause a popup list to appear that allows the user to pick a new node or choose from other available nodes currently in the graph. A "none" option is provided to remove an attachment. When an attachment is made, the normal control for the parameter is replaced by a label indicating the name of the attached node.

Some parameters are structures, in which case controls will be created for each element of the structure. According to a further aspect, the structures are displayed by the UI in "collapsed" form, and are opened with a + button to open them (recursively for nested structures). Alternatively, the structures may be always displayed in expanded form.

In the UI, parameters will appear in the order in which they are declared in the Phenomenon or Metanode however attributes in the node can also control the order and grouping of parameters. When editing the default parameters for a free-valued Phenomenon, there are commands available to change the order of parameters as well as organize parameters into groups. These commands edit attributes associated with the node.

Most parameters can have hard or soft limits associated with them. Hard limits are ranges for which the parameter is not allowed to exceed. Soft limits specify a range for the parameter that is generally useful, but the parameter is not strictly limited to that range. The extents of a slider control will be set to the soft limits of a parameter. A command in the parameter view will allow the user to change the extents of a slider past the soft limits as long as they do not exceed the hard limits.

Controls in the parameter view will display tooltips when the user hovers the mouse over a control for a short period of time. The text displayed in the tooltip is a short description of the parameter that comes from an attribute associated with the shader. Similarly a button at the top of all controls will display a relatively short description of the function of the shader as a whole. This description is also taken from an attribute associated with the node.

Figures 44, 45:
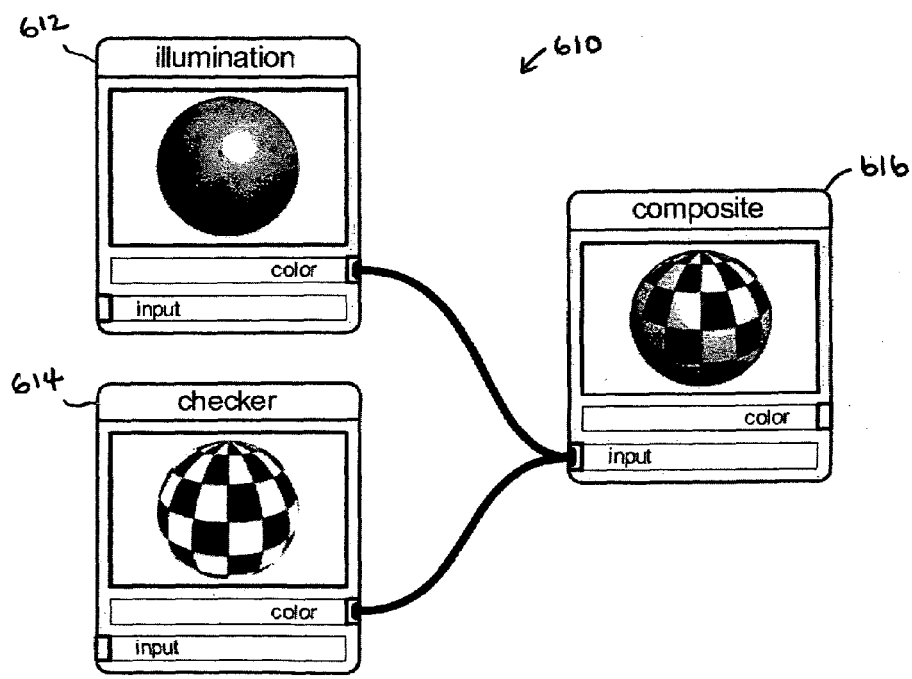
FIG. 44 depicts a view of a code editor that allows a user of MetaSL to create shaders by writing code.
FIG. 45 depicts a view illustrating the combination of two metanodes into a third metanode.

FIG. 44 shows a partial screenshot 600 illustrating a code editor view according to the present aspect of the invention. The code editor view allows users that wish to create shaders by writing code to do so using MetaSL. Users will be able to create monolithic shaders by writing code if need be, but more likely they will create new Metanodes that are intended to be used as a part of shader graphs.

A command allows the user to create a new Metanode. The result is a Metanode at the top level of the graph (not inside a Phenomenon) that represents a new type of Metanode. The user can always create an instance of this new Metanode inside a Phenomenon if they wish to.

When the user creates a new Metanode, mental mill will create the initial skeleton code for a minimal compile-able shader. The user can then immediately focus on implementing the specific functionality their shader is intended to provide.

When a top level Metanode (outside of a Phenomenon) is selected, the corresponding MetaSL code will appear in the code editor view for the user to edit. After making changes to the code, a command is available to compile the shader. The MetaSL compiler and a C++ compiler for the user's native platform are invoked by mental mill to compile the shader. Cross-compilation for other platforms is also possible. Any errors are routed back to mental mill which in turn displays them to the user. Clicking on errors will take the user to the corresponding line in the editor. If the shader compiles successfully then the Metanode will update to show the current set of input parameters and outputs. The preview window will also update to give visual feedback on the look of the shader. This integration of the MetaSL and C++ compilers will greatly simplify the development of Metanodes and monolithic shaders.

The parameter view will also display controls for selected top level Metanodes allowing the user to edit the default value for the node's input parameters. This is analogous to editing a free-valued Phenomenon's interface parameters.

Many users, especially non-technical users, may not be interested in writing code and want to only use the graph editing method of building Phenomena. The UI will allow the code editing window to be closed with the extra space relinquished to the Phenomenon graph view.

The main menu may be configured in a number of ways, including the following:

File—The file menu contains the following items:
1. New Phenomenon—This command is used to create a new free-valued Phenomenon. Once created, other Phenomena with fixed parameter values can be created based on this Phenomenon.
2. New Metanode—Creates a new Metanode type. A top level Metanode is created that when selected, its code is editable in the code editor.
3. Open File—Opens a shader description file for editing. The contents of the file will appear in the Phenomenon graph view. This could include free or fixed Phenomena as well as Metanode types. Files that are designated to be part of the toolbox can also be opened and edited. Editing a Phenomenon's shader graph will affect all fixed-valued Phenomena based on the Phenomenon. Therefore opening a toolbox file is much different than dragging a Phenomenon or Metanode from the toolbox into the Phenomenon graph view. Dragging a node from the toolbox creates a fixed-valued Phenomenon that can be modified without affecting the original. Opening a description file used by the toolbox allows the original Phenomenon to be modified.
4. Save—Saves the currently opened file. If the file has never been saved before, this command prompts the user to pick a file name for the new file.
5. Save as—Saves the currently opened file, but allows the user to pick a new name for the file.
6. Exit—Quits the mental mill application Edit—The edit menu contains the following items:
1. Undo—Undoes the last change. This could be a change to the shader graph, a change of the value of a parameter, or a change to the shader code made in the code editor view. The mental mill tool will have virtually unlimited levels of undo. The user will be able to set the maximum number of undo levels as a preference, however this application is not memory intensive and therefore the number of undo levels can be left quite high.
2. Redo—Redoes the last change that was previously undone.
3. Cut—Deletes the selected item, but copies it to the clipboard. The selected item could either be a node (or nodes) or text in the code editor view. If keyboard focus is in the code view, then text will be cut, otherwise the shader graph selection will be cut. This applies to copy, paste, delete, select all, select none, and select invert as well.
4. Copy—Copies selected items to the clipboard
5. Paste—Pastes the contents of the clipboard into the shader graph or code view.
6. Delete—Deletes selected items
7. Select All—Selects all items. Either shader nodes or text in the code editor, depending on keyboard focus.
8. Select None—Clears the selection
9. Select Invert—Selects all items that are not selected and deselects all items that are selected.
10. Preferences—Brings up a dialog that allows the user to set preferences for the mental mill application.

Help—The help menu contains the following items:
1. mental mill help—Brings up the help file for mental mill
2. About—Brings up an about box A toolbar contains tool buttons which provide easy access to common commands. In general, toolbar commands operate on the shader graph selection. Some toolbar commands replicate commands found in the main menu. The list of toolbar items may include the following commands: Open file; Save file; New shader graph (Phenomenon); New shader code-based; Undo; Redo; Copy; Paste; Close.

An important aspect of the creation of shaders is the ability to analyze flaws, determine their cause, and find solutions. In other words, the shader creator must be able to debug their shader. Finding and resolving defects in shaders is necessary regardless of whether the shader is created by attaching Metanodes to form a graph or writing MetaSL code, or both. The mental mill provides functionality for users to debug their shaders using a high level, visual technique. This allows shader creators to visually analyze the states of their shader to quickly isolate the source of problems.

The present aspect of the invention provides structures for debugging Phenomena. The mental mill GUI allows users to construct Phenomena by attaching Metanodes, or other Phenomena, to form a graph. Each Metanode has a representation in the UI that includes a preview image describing the result produced by that node. Taken as a whole, this network of images provides an illustration of the process the shader uses to compute its result. FIG. 45 shows a partial screenshot 610, illustrating this aspect of the invention. A first Metanode 612 might compute the illumination over a surface while another Metanode 614 computes a textured pattern. A third node 616 combines the results of the first two to produce its result.

By visually traversing the Metanode network, a shader creator can inspect their shading algorithm and spot the location where a result is not what they expected. A node in the network might be a Phenomenon, in which case it contains one or more networks of its own. The mental mill allows the user to navigate into Phenomenon nodes and inspect their shader graphs visually using the same technique.

In some cases, viewing the results of each node in a Phenomenon does not provide enough information for the user to analyze a problem with their shader. For example, all of the inputs to a particular Metanode may appear to have the correct value and yet the result of that Metanode might not appear to be as the user is expecting. Also when authoring a new Metanode by writing MetaSL code, a user may wish to analyze variable values within the Metanode as the Metanode computes its result value.

Traditional models for debugging generic programs are not perfectly suited for debugging shaders. Generic programs that execute on a CPU are typically linear in nature, where a sequence of instructions is executed that manipulate data. Some programs have multiple threads of execution, but usually a relatively small number of threads, often under a dozen, with each thread representing a separate and independent sequence of instructions.

Shader programs on the other hand, while also representing a linear sequence of instructions, differ in that they operate on a large number of data points in parallel. While the shader program executes a sequential list of instructions, it appears to do so simultaneously for each data point. In some cases shaders are processed using a SIMD (single instruction/multiple data) model where each instruction is in fact applied to many data points simultaneously.

The traditional model of stepping through a program line by line and inspecting the value of variables must be modified to take into account for the fact that each variable potentially has many different values spread across each data point at any particular stage of execution of the shader. This makes the traditional method of inspecting the individual values of variables impractical much of the time.

The mental mill extends the visual debugging paradigm into the MetaSL code behind each Metanode. The mental mill MetaSL debugger presents the user with a source code listing containing the MetaSL code for the shader node in question. The user can then step through the shader's instructions and inspect the values of variables as they change throughout the program's execution. However instead of just presenting the user with a single numeric value, the debugger displays multiple values simultaneously as colors mapped over the surface of an object.

Representing a variable's values as an image rather than a single number has several advantages. First the user can immediately recognize characteristics of the function driving the variable's value and spot areas that are behaving incorrectly. For example, the rate of change of a variable across the surface is visible in an intuitive way by observing how the color changes over the surface. If the user was using the traditional method of debugging a shader one pixel at a time, this would be difficult to recognize. Often defects in a shader are caused by discontinuities in the functions behind the shader. Observing a shader's rate of change allows the user to isolate such discontinuities.

The user can also use the visual debugging paradigm to quickly locate the input conditions that produce an undesirable result. A shader bug may only appear when certain input parameters take on specific values, and such a scenario may only occur on specific parts of the geometry's surface. The mental mill debugger allows the user to navigate in 3D space using the mouse to find and orient the view around the location on the surface that is symptomatic of the problem.

The mental mill MetaSL debugger presents the user with a list of all variables that are in scope at the selected statement. FIG. 46 shows a partial screenshot 620 illustrating a variable list according to this aspect of the invention. As the user selects different statements, new variables may come into scope and appear in the list while others will go out of scope and be removed from the list. Each variable in the list has a button next to its name that allows the user to open the variable and see additional information about it such as its type and a small preview image displaying its value over a surface. As the user steps past a statement that modifies a variable, the preview image for that variable will update to reflect the modification.

In addition, the user can select a variable from the list to display its value in a larger preview window.

Traditional debugging techniques allow the user to step through a program line by line and inspect the program state at each statement. Typically the user can only step forward in the direction of program execution by one or more lines. Jumping to an arbitrary statement in general requires the program to be restarted.

The mental mill MetaSL debugger allows the user to jump to any statement in their shader code in any order. One particularly nice aspect of this feature is that when a code statement modifies the value of a variable of interest, the shader writer can easily step backward and forward across this statement to toggle between the variable's value before and after the statement is executed. This makes it easier for the user to analyze the effect of any particular statement on a variable's value.

Loops (such as for, foreach, or while loops) and conditional statements (such as if and else) create an interesting circumstance within this debugging model. Because the shader program is operating on multiple data points simultaneously, the clause of an if/else statement may or may not be executed for each data point.

The MetaSL debugger provides the user several options for viewing variable values inside a conditional statement. At issue is how to handle data points that do not execute the if or else clause containing the selected statement. These optional modes include the following:

Show final shader result—in this mode, data points that do not reach the selected statement are processed by the complete shader and the final result is produced in the output image.

Show a constant color—in this mode, a constant color replaces the final result for data points that don't reach the selected statement. This allows the user to easily identify which data points are processed by the selected statement and which are not—a useful debugging tool in and of itself.

Discard—in this mode, if the selected statement is not reached for a particular data point, the shader is aborted for that data point only and the output image is not modified. This essentially removes the portions of the surface containing data points for which the selected statement was not reached.

Similarly, a loop may execute a different number of times for each data point. Furthermore, because the user can arbitrarily jump to any statement in the shader program, if they select a statement inside a loop they must also specify which iteration of the loop they wish to consider. Given that the loop is potentially executed a different number of times for each data point, some data points may have already exited the loop before the desired number of iterations is reached.

The mental mill debugger allows the user to specify a loop count value that specifies the desired number of iterations though a loop. The loop counter can be set to any value greater than zero. The higher the value, the more data points will likely not reach the selected statement and in fact given a large enough value no data points will reach the selected statement. The same options that control the situation where the selected statement isn't reached for a conditional apply to loops as well.

Displaying a variable's value as a color mapped over the surface of an object obviously works well when the variable is a color type. This method also works reasonably well for scalar and vector values with three or less components, but the value must be mapped into the range 0-1 in order to produce a legitimate color. The mental mill UI will allow the user specify a range for scalars and vectors that will be used to map those values to colors. Alternatively mental mill can automatically compute the range for any given viewpoint by determining the minimum and maximum values of the variable over the surface as seen from that viewpoint.

Mapping scalars and vectors to colors using user specified ranges can be effective; however, it still requires the user to deduce the value of the variable by looking at the surface colors. The mental mill UI provides other techniques for visualizing these data types. For vector types that represent direction (not position), one visualization technique is to draw the vector as an arrow positioned on the surface as the user drags the mouse over the surface as in the following illustration. This visualization technique is illustrated in a series of partial screenshots 630, 632, and 634 shown in FIGS. 47A-C.

The numeric values of the variable are also displayed in a tooltip window as the user moves the mouse over the surface of the object.

Matrix type variables pose another challenge to visualize. Matrices with 4 rows and columns can be viewed as a grid of numeric values formatted into standard matrix notation. This visualization technique is illustrated in the partial screenshot 640 shown in FIG. 48.

Matrix type variables with three rows and columns can be considered to be a set of three direction vectors that make up the rows of the matrix. A common example of this is the tangent space matrix which is comprised of the 'u' derivative, the 'v' derivative and the normal. The three row vectors of the matrix can be drawn as arrows under the mouse pointer as shown below. In addition, the individual values of the matrix can be displayed in a standard matrix layout. This visualization technique is illustrated in the partial screenshot 650 shown in FIG. 49.

Vector type values that don't represent direction can be viewed using a gauge style display. The same user specified range that maps these values to colors can be used to set the extent of a gauge, or set of gauges, that appear as the user selects positions on the surface. As the user moves the mouse over the surface, the gauges graphically display the values relative to the user specified range. This visualization technique is illustrated in the partial screenshot 660 shown in FIG. 50.

When vector arrows, gauges, or tooltips containing numeric values are displayed, the user can opt to view the final shader result on the object's surface instead of the variable value mapped to colors. This allows the user to locate portions of the surface that correspond to features in the final shader result while also monitoring the value of the selected variable.

Another useful feature the mental mill debugger provides is to lock onto a particular pixel location instead of using the mouse pointer to interactively sweep over the surface. The user can choose a pixel location (either by selecting it with the mouse or providing the numeric pixel coordinates) and the value of the variable at that pixel location will be displayed as the user steps through statements in the code.

The mental mill shader debugger illustrates another benefit of the platform independence of mental mill. A single MetaSL Metanode, or an entire Phenomenon can be created and debugged once and yet targeted to multiple platforms.

The debugger can operate in either hardware or software mode and works independently of any particular rendering algorithm. The fact that the shader debugger is tightly integrated into mental mill's Phenomenon creation environment further reduces the create/test cycle and allows the shader creator to continue to work at a high level, insulated from platform dependencies.

A prototype application has been created as a proof of concept of this shader debugging system.

The mental mill application is built on a modular library containing all the functionality utilized by the application. An API allows third-party tools to integrate the mental mill technology into their applications.

Future generations of mental ray® will access some sub-components of the mental mill libraries, however they will do so only to facilitate rendering with mental ray. The complete mental mill library will be licensed separately from mental ray.

More detailed documentation of the mental mill API will be forthcoming in a future document.

When integrating mental mill technology into a third party application, the mental mill GUI can be customized to match the look and feel of that application. There are several ways in which the mental mill API will allow GUI customization:

Phenomenon graph appearance—Elements of the Phenomenon graph, such as Metanodes and connection lines, will be drawn by invoking a plug-in callback function. A default drawing function will be provided, however third parties can also provide their own to customize the appearance of the shader graph to better match their application. The callback function will also handle mouse point hit testing since it is possible the elements of a node could be arranged in different locations.

Keyboard shortcuts—All keyboard commands will be remappable.

Mouse behavior—Mouse behavior such as the mapping of mouse buttons will be customizable.

Toolbar items—Each toolbar item can be omitted or included.

View windows—Each view window will be designed to operate on its own without dependencies on other windows. This will allow a third party to integrate just the Phenomenon graph view into their application, for example. Each view window can be driven by the API so third parties can include any combination of the view windows, replacing some of the view windows with their own user interface.

C. MetaSL Design Specification

The mental mill™ shading language (MetaSL™) provides a powerful interface for implementing custom shading effects and serves as an abstraction from any particular platform where shaders may be executed.

Rendering can be executed on either the CPU or on a graphics processor unit (GPU) and therefore shaders themselves operate on either the CPU or GPU. There is a significant amount of variation in both the capabilities of graphics hardware and the APIs that drives them. As such, a shader written in a language directly targeted at graphics hardware will likely have to be rewritten as hardware and APIs change. Furthermore, such a shader will not operate in a software renderer and will not support features, such as ray tracing, that are currently only available to software renderers.

MetaSL solves this problem by remaining independent of any target platform. A shader can be written once in MetaSL and the MetaSL compiler will automatically translate it to any supported platform. As new platforms emerge and the capabilities of graphics hardware changes, shaders written in MetaSL will automatically take advantage of new capabilities without the need to be rewritten.

This insulation from target platforms also allows a MetaSL shader to automatically operate in software or hardware rendering modes. The same shader can be used to render in software mode on one machine and in hardware mode on others. Another use for this capability is the automatic re-purposing of shaders for a different context. For example, a shader created for use in a visual effect for film could also be used for a video game based on that film.

In many cases the same MetaSL shader can be used regardless of whether rendering takes place in software or hardware so the user isn't required to implement multiple shaders. In some cases however the user may wish to customize a shader for the GPU or CPU. The language provides a mechanism to do this while still implementing both techniques in MetaSL.

Hardware shaders generated by the MetaSL compiler are restricted such that they can be used only for rendering with the next generation of mental ray® and the Reality Server® based on neuray™. The mental mill™ Phenomenon™ creation technology provides the capability of generating hardware shaders that can be used for either rendering with mental ray or externally by other applications, such as games.

The following sections describe the MetaSL language specification. MetaSL has been designed to be easy to use with a focus on programming constructs needed for common shading algorithms rather than the extensive and sometime esoteric features found in generic programming languages.

All components of a MetaSL shader are grouped together in a shader class denoted with the shader keyword.

```
shader my_shader {
    // Contents of the shader are found here
};
```

A single source file can have multiple shader definitions. A shader class can also inherit the definition of another shader by stating the name of the parent shader following the name of the child shader and separated by a colon. For example:

```
shader my_parent_shader {
    // ...
};
shader my_shader : my_parent_shader {
    // ...
};
```

This allows variations of a shader type to be implemented while sharing parts of the shader that are common to all variations. A shader definition can only inherit from a single parent shader.

A shader can have zero or more input parameters which the shader uses to determine its result value. Parameters can use any of the built-in types, described below, or custom structure types, also described below.

When used in a scene, input parameters may store literal values or be attached to the result of another shader, however a shader doesn't need to be concerned with this possibility. A shader can refer to an input parameter as it would any another variable. Note though that input parameters can only be read and not written to.

A shader declares its input parameters in a section denoted by the input: label followed by a declaration of each parameter.

```
shader my_shader {
    input:
        Color c0;
        Color c1;
};
```

This example declares a shader with two color input parameters.

An input parameter can also be a fixed or variable sized array. Since the size of a dynamic array isn't known in advance, array input parameters include a built-in count parameter. The length of an array named my_array can be referred to as my_array.count. An input parameter of fixed length will have the length indicated as part of the declaration while a dynamic array will not.

```
shader my_shader {
    input:
        int n[4]; // Fixed size array (count = 4)
        int m[ ]; // Variable sized array
};
```

Arrays of arrays are not supported as input parameter types.

A shader must have at least one output parameter, but may have more than one. Output parameters store a shader's result. The purpose of a shader is to compute some function of its input parameters and store the result of that function in its output parameters.

An output parameter can be of any type, including a user defined structure type; however it cannot contain a dynamic array.

A shader declares its output parameters in a section denoted by the output: label followed by a declaration of each parameter.

```
shader my_shader {
    output:
        Color ambient_light;
        Color direct_light;
};
```

This example declares a shader with two color outputs. Many shaders will only have a single output parameter, which by convention is named "result."

Shaders can declare other variables which are not input or output parameters, but instead store other values read by the shader. When initializing before rendering begins, a shader can compute values and store them in member variables.

Member variables are designed to hold values that are computed once before rendering begins but do not change thereafter. This avoids redundantly computing a value each time the shader is called.

Member variables are declared in a section denoted by the member: keyword. For example:

```
shader my_shader {
    input:
        Scalar amount;
    output:
        Color result;
    member:
        Scalar noise_table[1024];
};
```

The primary task of a shader is to compute one or more result values. This is implemented in the shader class by a method named main. This method is called when the renderer needs the result of the shader or when the shader is attached to an input parameter of another shader and that shader needs the parameter's value.

The return type of this method is always void which means it doesn't return a value. Instead the result of a shader should be placed in its output parameters.

```
shader mix_colors {
    input:
        Color c0;
        Color c1;
        Scalar mix;
    output:
        Color result;
        void main( ) {
            result = c0*(1.0−mix) + c1*mix;
        }
};
```

This example shader blends two colors based on a third mix parameter.

The main method can be implemented as an inline method which may be convenient for simple shaders. In cases where the method is large it may be desirable to implement the method separately from the shader definition. To do this the method name must be prefixed with the shader name and separated by two colons. For example:

```
void mix_colors::main( ) {
    result = c0*(1.0−mix) + c1*mix;
}
```

In addition to the main method, other methods can be defined in the shader class that act as helper methods to the main method. These methods can return values of any type and accept calling parameters of any type. A method declaration is placed in the shader class and looks like the following example:

```
Vector3 average_normals(Vector3 norm1, Vector3 norm2);
```

As is the case with the main method, the implementation of a helper method can either occur directly in the shader class definition or outside it. When it is implemented outside of the shader class definition, the method name must be prefixed with the name of the shader followed by two colons.

MetaSL also allows the definition of functions that are not directly associated with a particular shader class the way methods are. Functions are declared the same way as methods except the declaration appears outside of any shader class. Functions must have a declaration that appears before any reference to the function is made. The function body can be included as part of the declaration or a separate function definition can occur later in the source file, after the function declaration.

Both methods and functions can be overloaded by defining another method or function with the same name but a different set of calling parameters. Overloaded versions of a function or method must have a different number of parameters or parameters that differ in type, or both. It is not sufficient for overloaded functions to only differ by return type.

Parameters to functions and methods are always passed by value. Calling parameter declarations can be qualified with one of the following qualifiers to allow a function or method to modify a calling parameter and allow that modification to be visible to the caller:

in—The parameter value is copied into the function being called, but not copied out.

out—The parameter value is not copied into the function being called and is undefined if read by the called function. The called function can however set the parameter's value and that result will be copied back to the variable passed by the caller.

inout—The parameter value is both copied into the function being called and copied out to the variable passed by the caller.

It should also be noted that, according to the present aspect of the invention, neither functions nor shader methods can be called recursively.

Another specially named method in the shader class is a method called event. This method is called to allow the shader to perform tasks before and after shading operations take place; sometimes these are referred to as init or exit functions.

The event method is passed a single Event_type parameter that identifies the event. FIG. 51 shows a table 670 setting forth a list of Event-type parameters according to this aspect of the invention.

All init/exit events have access to threadlocal variables except for

```
Module_init/exit and Class_init/exit.
    shader my_shader {
        input:
            Color c;
        output:
            Color result;
        member:
            Scalar noise_table[1024];
            void main( );
            void event(Event_type event) {
                if (event == Instance_init) {
                    for (int i=0; i<1024; i++)
                        noise_table[i] = Random( );
                }
            }
    };
```

In this example the Instance init event is handled and a noise table array is initialized to contain random values.

MetaSL includes a comprehensive set of fundamental types. These built-in types cover most of the needs shaders will have, but can also be used to define custom structures, as described below.

The following is a list of MetaSL intrinsic types:
Int—A single integer value
Bool—A Boolean value (either true or false)
Scalar—A floating point value of unspecified precision. This type maps to the highest possible precision of the target platform.
Vector2—A vector with 2 scalar components
Vector3—A vector with 3 scalar components
Vector4—A vector with 4 scalar components
Vector2i—A vector with 2 integer components
Vector3i—A vector with 3 integer components
Vector4i—A vector with 4 integer components
Vector2b—A vector with 2 Boolean components
Vector3b—A vector with 3 Boolean components
Vector4b—A vector with 4 Boolean components
Matrix2×2—A matrix with 2 rows and 2 columns
Matrix3×2—A matrix with 3 rows and 2 columns
Matrix2×3—A matrix with 2 rows and 3 columns
Matrix3×3—A matrix with 3 rows and 3 columns
Matrix4×2—A matrix with 4 rows and 2 columns
Matrix2×4—A matrix with 2 rows and 4 columns
Matrix4×3—A matrix with 4 rows and 3 columns
Matrix3×4—A matrix with 3 rows and 4 columns
Matrix4×4—A matrix with 4 rows and 4 columns
Color—A color with r, g, b, and a scalar components
Texture1d—A 1 dimensional texture
Texture2d—A 2 dimensional texture
Texture3d—A 3 dimensional texture
Texture cube—A cube map texture
Shader—A reference to a shader.
String—A character string that supports the== and + operators.

MetaSL provides the capability to define an enumeration as a convenient way to represent a set of named integer constants. The enum keyword is used followed by a comma separated list of identifiers enclosed in brackets. For example:

```
enum { LOW, MEDIUM, HIGH };
```

An enumeration can also be named in which case it defines a new type. The enumerators can be explicitly assigned values as well. For example:

```
enum Detail {
    LOW = 1,
    MEDIUM = 2,
    HIGH = 3
};
```

This example defines a new type called Detail with possible values of LOW, MEDIUM and HIGH. Enumeration type values can be implicitly cast to integers which results in an integer with the explicitly assigned value. If explicit values are not specified, values are assigned beginning with zero for the first enumerator and incremented by one thereafter.

All the vector types have components that can be accessed in a similar manner. The components can be referred to by appending a period to the variable name followed by one of [x, y, z, w]. Vectors of length 2 only have x and y components, vectors of length 3 have x, y, and z, and vectors of length 4 have all 4 components.

When referring to vector components, multiple components can be accessed at the same time, the result being another vector of the same or different length. Also the order of the components can be arbitrary and the same component can be used more than once. For example given a vector V of length 3:
V·xy Returns a 2 component vector <x,y>
V·zyx Returns a 3 component vector <z,y,x>
V·xxyy Returns a 4 component vector <x,x,y,y>

A similar syntax can be used as a mask when writing to a vector. The difference is that a component on the left side of the assignment can not be repeated.

```
V.yz = Vector2(0.0, 0.0);
```

In this example the y and z components are set to 0.0 while the x and y components are left unchanged.

Vector components can also be accessed using array indices and the array index can be a variable.

```
Scalar sum = 0.0;
for (int i=0; i<4; i++)
    sum += V[i];
```

In this example the Vector4 V has its components summed using a loop.

Vectors can be constructed directly from other vectors (or colors) providing the total number of elements is greater than or equal to the number of elements in the vector being constructed. The elements are taken from the constructor parameters in the order they are listed.

```
Vector4 v4(1.0, 2.0, 3.0, 4.0);
Vector2 v2(v4);
Vector3 v3(0.0, v2);
```

All three vector constructor calls above are legal. The example would result in the three vectors initialized with the values set forth in the table 680 set forth in FIG. 52.

The standard math operators (+,−,*,/) apply to all vectors and operate in a component-wise fashion. The standard math operators are overloaded to allow a mixture of scalars and vectors of different sizes in expressions however in any single expression all vectors must have the same size. When Scalars are mixed with vectors, the scalar is promoted to a vector of the same size with each element set to the value of the scalar.

```
Vector2 v1(a,b);
Vector2 v2(c,d);
Vector2 result = (v1 + v2) * e;
```

In this example the variables a, b, c, d and e are all previously declared scalar values. The variable result would have the value <(a+c)*e, (b+d)*e>.

The standard Boolean logic operators also can be applied to individual or vectors of Booleans. When applied to vectors of Booleans they operate in a component-wise fashion and produce a vector result. These operators are listed in the table 690 set forth in FIG. 53.

Bitwise operators are not supported. Comparison operators are supported and operate on vectors in a component-wise fashion and produce a Boolean vector result. A list of supported comparison operators is set forth in the table 700 shown in FIG. 54.

A ternary conditional operator can be applied to vector operands as well in a component-wise fashion. The conditional operand must be a single Boolean expression or a vector Boolean expression with the number of components equal to the number of components of the second and third operands.

```
Vector2 v1(1.0, 2.0);
Vector2 v2(2.0, 1.0);
Vector2 result = v1 < v2 ? Vector2(3.0, 4.0): Vector2(5.0, 6.0);
```

In this example the result variable would hold the value <3.0, 6.0>.

Instances of the Color type are identical in structure to instances of Vector4 although their members are referred to by [r, g, b, a] instead of [x, y, z, w] to refer to the red, green, blue and alpha components, respectively.

They can be used any place a Vector4 can be used and all operations that apply to Vector4 will work with Color as well. The primary purpose of this type is for code readability. Otherwise this type is logically synonymous with Vector4.

Matrices are defined with row and column sizes ranging from 2 to 4. All matrices are comprised of Scalar type elements. Matrix elements can also be referred to using array notation (row-major order) with the array index selecting a row from the matrix. The resulting row is either a Vector2, Vector3, or Vector4 depending on the size of the original matrix. Since the result of indexing a matrix is a vector and vector types also support the index operator, individual elements of a matrix can be accessed with syntax similar to a multidimensional array.

```
Matrix4x3 mat(
    1.0, 0.0, 0.0, 0.0, 1.0, 0.0, 0.0, 0.0, 1.0, 0.0, 0.5, 0.0);
Vector4 row;
Scalar element;
// row will equal <0.0, 1.0, 0.0> after the assignment
row = mat[1];
// element will equal 0.5 after the assignment
element = mat[3][1]
```

As illustrated by this example, matrices also have a constructor which accepts element values in row-major order. Matrices can also be constructed by specifying the row vectors as in the following example:

```
Vector3 row0(1.0, 0.0, 0.0);
Vector3 row1(0.0, 1.0, 0.0);
Vector3 row2(0.0, 0.0, 1.0);
Vector3 row3(0.0, 0.0, 0.0);
Matrix4x3 mat(row0, row1, row2, row3);
```

The number of elements of the vectors passed to the matrix constructor must match the number of elements in a row of the matrix being constructed.

The multiplication operator is supported to multiply two matrices or a matrix and a vector and will perform a linear algebra style multiplication between the two. As should be expected when multiplying two matrices, the number of columns of the matrix on the left must equal the number of rows of the matrix on the right. The result of multiplying a N×T matrix with a T×M matrix is a N×M matrix. A vector can be multiplied on the right or left side provided the number of elements equals the number of rows when the vector is on the left side of the matrix and the number of elements equals the number of columns when the vector is on the right.

Automatic type conversions are allowed to cast a variable of one type to a value of another type. The only restriction is that when implicitly converting a vector, the conversion is to a vector of the same size. To convert between vectors of different sizes or scalars, either a constructor can be used or the .xyzw notation can be used. For example:

```
Vector3 v3(0,0,0);
Vector2 v2 = Vector2(v3.x, v3.y);
or:
Vector3 v3(0,0,0);
Vector2 v2 = v3.xy;
```

The .xyzw notation can be applied to variables of type Scalar to generate a vector. For example:

```
Scalar s = 0.0;
Vector3 v3 = s.xxx;
```

Only the x element is valid for a scalar which in this context is considered a one element vector.

Conversions that potentially result in a loss of precision, such as converting a scalar to an integer, are allowed but produce a compiler warning. This warning can be disabled if the shader writer desires.

MetaSL supports arrays of any of the built-in types or user defined structures, however only fixed length arrays can be declared in shader functions. There are two exceptions. As stated in the input parameter section, shader inputs can be declared as dynamically sized arrays. The other exception is for parameters to functions or methods, which can also be arrays of unspecified size. In both these cases, by the time the shader is invoked during rendering the actual size of the array variable will be known. The shader code can refer to the size of an array as name.count where name is the array variable name.

```
Scalar sum_array(Scalar values[ ]) {
    Scalar sum = 0.0;
    for (int i=0; i<values.count; i++)
        sum += values[i];
    return sum;
}
Scalar a_function( ) {
    Scalar foo[8]; ... // initialize members of foo
    return sum_array(foo);
}
```

This simple example loops over an array and sums the components. The code for this function was written without actual knowledge of the size of the array but when shading the size will be known. Either the array variable will come from an array shader parameter or a fixed size array declared in a calling function.

Custom structure types can be defined to extend the set of types used by MetaSL shaders. The syntax of a structure type definition looks like the following example:

```
struct Color_pair {
    Color a;
    Color b;
};
```

In this example a new type called Color pair is defined that is comprised of two colors.

Structure member variables can be of any built-in type or another user-defined structure type to produce a nested structure. Structure members can also be arrays.

User-defined structures and enumerations are the only form of user-defined types in MetaSL.

Within a shader's main method, a set of special state variables are implicitly declared and available for the shader code to reference. These variables hold values describing both the current state of the renderer as well as information about the intersection that led to the shader call. For example, normal refers to the interpolated normal at the point of intersection.

These variables are only available inside the shader's main method. If a shader wishes to access one of these state variables within a helper method, the variable must be explicitly passed to that method.

This set of state variables can be viewed as an implicit input to all shaders. The state input's data type is a struct containing all the state variables available to shaders. A special state shader can be connected to this implicit input. The state shader has an input for each state member and outputs the state struct.

Data members of the state cannot be directly modified, however exposing the state as an input allows one shader to refer to state variables while allowing another shader to drive the state values used by that shader. When the state input of a shader is left un-attached, any references to state variables from within the shader revert to a reference to unmodified state values.

For example, a shader that computes illumination will likely refer to the surface normal at the point of intersection. A bump map shader could produce a modified normal which it computes from a combination of the state normal and a perturbation derived from a gray-scale image. A state shader can be attached to the illumination shader thus exposing the normal as an input. The output of the bump shader can then be attached to the state shader's normal input.

The illumination shader will most likely contain a light loop that iterates over scene lights and indirectly causes light shaders to be evaluated. The state values passed to the light shaders will be the same state values provided to the surface shader. If the state was modified by a state shader, the modification will also affect the light shaders.

This system of implicit state input parameters simplifies shader writing. A shader can easily refer to a state variable while at the same time maintaining the possibility of attaching another shader to modify that state variable. Since the state itself isn't actually modified, there is no danger of inadvertently affecting another shader.

Figure 55:
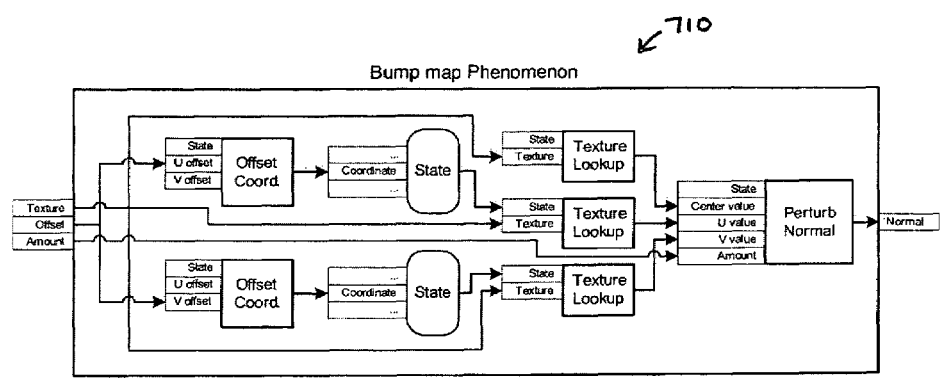
FIG. 55 depicts a schematic of a bump map Phenomenon.

FIG. 55 shows a schematic 710, illustrating bump mapping according to the present aspect of the invention. At first this might seem slightly complex, however the graph implementing bump mapping can be boxed up inside a Phenomenon node and viewed as if it was a single shader.

The "Perturb normal" shader uses three samples of a gray-scale image to produce a perturbation amount. The texture coordinate used to sample the bump map texture is offset in both the U and V directions allowing the slope of the gray-scale image in the U and V directions to be computed.

An "amount" input scales the amount of the perturbation. The "Perturb normal" shader adds this perturbation to the state's normal to produce a new modified normal.

Three "Texture lookup" shaders drive the inputs of the "Perturb normal" shader. Two of these shaders are fed modified texture coordinates from the attached state shaders. The state shaders themselves are fed modified texture coordinates produced by "Offset coordinate" shaders.

The whole schematic is contained in a Phenomenon so not all users have to be concerned with the details. The bump map Phenomenon has an input of type Texture2d which is fed to all three texture lookups. An "offset" input allows the user to control the offset in the U and V direction with a single parameter. The "amount" input of the "Perturb normal" shader is also exposed as an input to the bump map Phenomenon.

Figure 56:
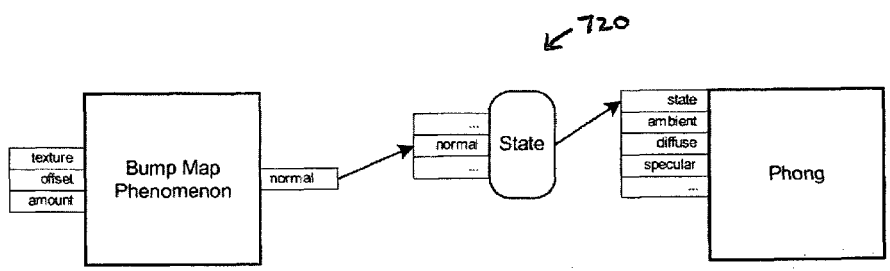
FIG. 56 depicts a diagram illustrating the bump map Phenomenon in use.

FIG. 56 shows a diagram 720 illustrating the bump map Phenomenon in use. The phong shader implicitly refers to the state's normal when it loops over scene lights. In this case the phong shader's state input is attached to a state shader and the modified normal produced by the bump shader is attached to the state shader's normal input.

The presence of the state shader makes it very clear to the user what is happening behind the scenes. An interested user can open up the bump map Phenomenon and see the graph visually depicting the bump map algorithm.

A set of state variables includes the following: position; normal; origin; direction; distance; texture_coord_n; and screen_position. This list can be supplemented to make it more comprehensive. Note that the preprocessor can be used to substitute common short name abbreviations, often single characters, for these longer names.

In an alternative configuration, state variable parameters are added to nodes. According to this aspect of the invention, a set of special state variables are implicitly declared within a shader's main method, and are available for the shader code to reference. These variables hold values describing both the current state of the renderer as well as information about the intersection that led to the shader call. For example, the normal variable refers to the interpolated normal at the point of intersection.

According to the present aspect of the invention, these variables are only available inside the shader's main method. If a shader wishes to access one of these state variables within a helper method, the variable must be explicitly passed to that method. Alternatively, the state variable itself may be passed to another method, in which case all the state variables are then available to that method.

This set of state variables can be viewed as implicit inputs to all shaders, which by default are attached to the state itself. However, one or more input parameters can be dynamically added to an instance of a shader that corresponds by name to a state variable. In that case, these inputs override the state value and allow a connection to the result of another shader without modifying the original shader source code. In addition to modifying a state variable with an overriding input parameter, a shader can also directly modify a state variable with an assignment statement in the MetaSL implementation.

Exposing state variables as inputs allows one shader to refer to state variables while allowing another shader to drive the state values used by that shader. If no input parameter is present for a particular referenced state variable, that variable will continue to refer to the original state value.

For example, a shader that computes illumination typically refers to the surface normal at the point of intersection. A bump map shader may produce a modified normal which it computes from a combination of the state normal and a perturbation derived from a gray-scale image. A parameter called "normal" can be added to an instance of the illumination shader thus exposing the normal as an input, just for that particular instance. The output of the bump shader can then be attached to the shader's normal input.

According to a further aspect of the invention, the illumination shader contains a light loop that iterates over scene lights and indirectly causes light shaders to be evaluated. The state values passed to the light shaders will be the same state values provided to the surface shader. If a state variable was overridden by a parameter or modified within the shader, that modification will also affect the light shaders. It is not possible, however, to make modifications to a state variable that will affect shaders attached to input parameters because all input parameters are evaluated before a shader begins execution.

This system of implicit state input parameters simplifies shader writing. A shader can easily refer to a state variable while at the same time maintaining the possibility of attaching another shader to modify that state variable.

Figure 57:
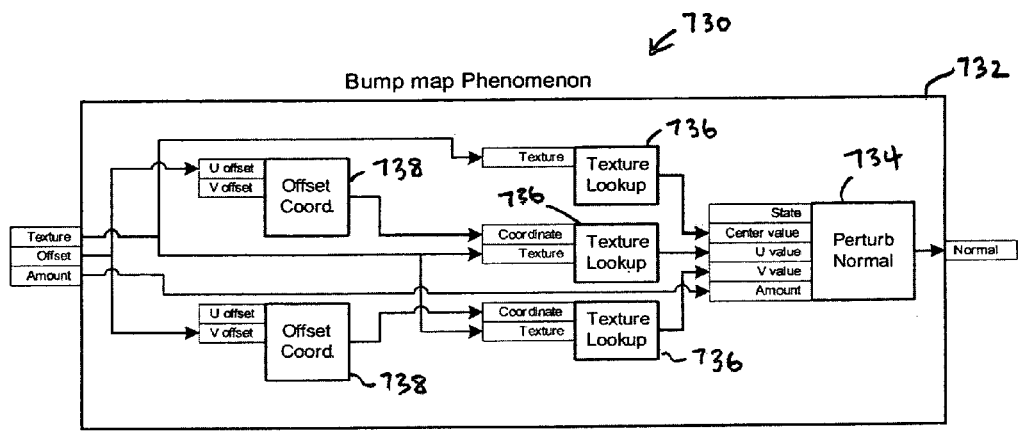
FIG. 57 depicts a schematic of a bump map Phenomenon according to a further aspect of the invention.

FIG. 57 shows a schematic 730 of a bump map Phenomenon 732. As shown in FIG. 57, the graph implementing bump mapping can be boxed up inside a Phenomenon node and viewed as if it was a single shader.

The "Perturb normal" shader 734 uses three samples of a gray-scale image to produce a perturbation amount. The texture coordinate used to sample the bump map texture is offset in both the U and V directions allowing the slope of the gray-scale image in the U and V directions to be computed. An "amount" input scales the amount of the perturbation. The "Perturb normal" shader 734 adds this perturbation to the state's normal to produce a new modified normal.

Three "Texture lookup" shaders 736 drive the inputs of the "Perturb normal" shader 004. Two of these shaders are fed modified texture coordinates from the attached "Offset coord." shaders 738.

The whole schematic is contained in a Phenomenon 732 so not all users have to be concerned with the details. The bump map Phenomenon has an input of type Texture2d which is fed to all three texture lookups. An "offset" input allows the user to control the offset in the U and V direction with a single parameter. The "amount" input of the "Perturb normal" shader is also exposed as an input to the bump map Phenomenon.

Figure 58:
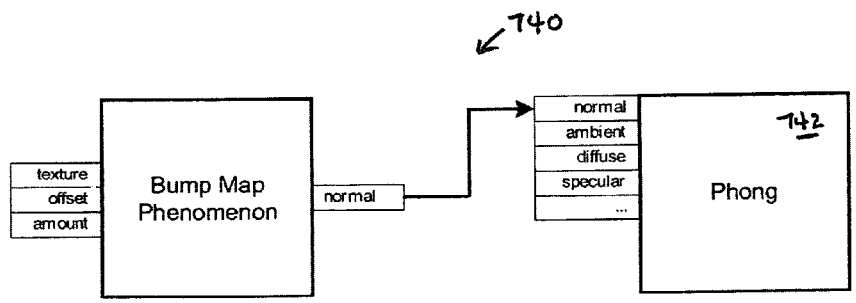
FIG. 58 depicts a diagram of a bump map Phenomenon in use.

FIG. 58 shows a diagram of a bump map Phenomenon 740 in use. The phong shader 742 implicitly refers to the state's normal when it loops over scene lights. This illustration shows an instance of the phong shader which has an added "normal" input allowing the normal to be attached to the output of the bump map shader. FIGS. 59A-B show a table 750 listing the complete set of state variables.

State vectors are always provided in "internal" space. Internal space is undefined and can vary across different platforms. If a shader can perform calculations independently of the coordinate system then it can operate with the state vectors directly, otherwise it will need to transform state vectors into a known space.

There are several defined spaces and the state provides matrices and functions to transform vectors, points and normals between these coordinate systems. FIG. 60 shows a table 760 listing the transformation matrices.

There are additional state variables available for light and volume shaders that provide access to properties of lights and the input value for volume shaders. A shader node that refers to light or volume shader state variable can only be used as a light or volume shader or in a graph which is itself used as a light or volume shader.

Light shaders can also call the state transformation functions and pass the value "light" as the from or to parameter.

FIG. 61 shows a table 770 listing light shader state variables, and FIG. 62 shows a table 780 listing volume shader state variables.

The ray that is responsible for the current intersection state is described by the ray type, ray shader, is ray_dispersal_group( ) and is ray_history_group( ) state variables and functions. These variables and functions use the following strings to describe attributes of the ray:

A ray has exactly one of the following types:
 "eye"—First generation ray with its origin at the eye position
 "transparent"—Transparency ray into the current object
 "refract"—Refraction into the current object
 "reflect"—Reflection away from the current object
 "shadow"—Shadow ray
 "occlusion"—Ambient occlusion ray
 "environment"—Environment ray A ray can be a member of at most one of the following groups:
 "specular"—Specular transparency, reflection, or refraction
 "glossy"—Glossy transparency, reflection, or refraction
 "diffuse"—Diffuse transparency, reflection, or refraction A shader is a member of exactly one of the following groups:
 "regular"—Regular surface or volume
 "photon"—Global illumination or caustic photon
 "light"—Light shader call
 "displace"—Displacement shader call A ray can have zero or more of the following history flags:
 "lightmap"—Lightmap shader call
 "final gather"—Final gather ray
 "probe"—Probe ray that doesn't call shaders
 "hull"—Pass through a hull surface
 "volume"—Ray origin is in empty space A predefined Trace_options class holds parameters used by the trace( ) and occlusion( ) functions described in the next section. A shader can declare an instance of this type once and pass it to multiple trace calls.

When a Trace_options instance is declared, all its member values are initialized to default values. The shader can then call various 'set' methods to change the values to something other than the default. FIG. 63 sets forth a table 790 listing the methods of the Trace_options class.

FIGS. 64 and 65 sets forth tables 800 and 810 listing the functions that are provided as part of the intersection state and depend on values accessible through the state variable. These functions, like state variables, can only be called within a shader's main method or any method in which the state variable is passed as a parameter.

MetaSL supports the familiar programming constructs that control the flow of a shader's execution. Specifically these are:
 The loop statements for, while, and do, while. The keywords continue and break are supported to control execution of the loop The branch statements if with optional else clauses and switch, case statements.

A return statement to terminate a function or method and return a value if the function or method does not have a void type.

The syntax for the flow control statements is identical to that used with the standard C programming language.

A Light_iterator class facilitates light iteration and an explicit light list shader input parameter is not required. The light iterator implicitly refers to scene lights through the state. An instance of this iterator is declared and specified as part of the for each statement. The syntax looks like the following.

```
Light_iterator light;
foreach (light) {
    // Statements that refer to members of 'light'
}
```

Most surface shaders will loop over light sources to sum up the direct illumination from lights in the scene. In addition, area lights require multiple samples to be taken over points on the surface of the area light. The for each statement will enumerate both lights in the scene and sample points on the surface of an area light when appropriate.

Inside the foreach block, members of the light iterator can be accessed that contain the results from invoking the light shader for each light. Members of the Light-iterator class are listed in the table 820 shown in FIG. 66.

The shader does not need to be aware of how many lights or how many samples it is accumulating, it is only responsible for providing the BRDF for a single sample at a time with the renderer driving the enumeration of lights and samples. The shader will likely declare one or more variables outside the loop to store the result of the lighting. Each trip through the loop the shader will add the result of the BRDF to these variables.

```
Color diffuse_light(0,0,0,0);
Light_iterator light; foreach (light) {
    diffuse_light += light.dot_nl * light.color;
}
```

This is a simple example that loops over lights and sums the diffuse illumination.

A powerful feature of MetaSL is its ability to describe shaders independent of a particular target platform. This includes the ability to run MetaSL shaders in software with software based renderers and in hardware when a GPU is available.

Software rendering is typically more generalized and flexible allowing a variety of rendering algorithms including ray tracing and global illumination. At the time of this writing, graphics hardware doesn't generally support these features. Further more, different graphics hardware have different capabilities and resource limitations.

The MetaSL compiler will provide feedback to the shader writer indicating the requirements for any particular shader it compiles. This will let the user know if the shader they have written is capable of executing on a particular piece of graphics hardware. When possible, the compiler will specifically indicate which part of the shader caused it to be incompatible with graphics hardware. For example, if the shader called a ray tracing function the compiler may indicate that the presence of the ray tracing call forced the shader to be software compatible only. Alternatively the user may specify a switch that forces the compiler to produce a hardware shader. Calls to APIs that aren't supported by hardware will be removed from the shader automatically.

MetaSL includes support for the following preprocessor directives: #define; #undef; #if; #ifdef; #ifndef; #else; #elif; #endif.

These directives have the same meaning as their equivalents in the C programming language. Macros with arguments are also supported such as:

```
#define square(a) ((a)*(a))
```

The # include directive is also supported to add other MetaSL source files to the current file. This allows structure definitions and shader base classes to be shared across files.

A technique is a variation of a shader implementation. While some shaders may only require a single technique, there are situations where it is desirable to implement multiple techniques. The language provides a mechanism to declare multiple techniques within a shader.

Often times a single shader implementation can map to both software and hardware so the exact same shader can be used regardless of whether rendering takes place on the CPU or GPU. In some cases though, such as when the software shader uses features not supported by current graphics hardware, a separate method for the shader needs to be implemented to allow the shader to also operate on the GPU. Different graphics processors have different capabilities and limitations as well so a shader that works on a particular GPU might be too complicated to work on another GPU. Techniques also allow multiple versions of a shader to support different classes of hardware.

Some shaders will also want to implement various shading methods that are used in different contexts. For example a material shader might implement a shadow technique that provides the amount of transparency at a surface point used when tracing shadow rays. Different techniques can also be used to implement shaders that are faster but lower quality or slower and higher quality.

While in a sense techniques are like different versions of a shader, techniques of a shader are declared within the shader class and share shader parameters and other variables. This keeps techniques grouped within the class for organization. When a shader has only one technique, it is not necessary for the shader class to formally declare the technique.

The technique declaration appears somewhat like a nested class definition inside the shader class definition. The technique declaration provides a name that can be used to refer to the technique. The technique must at least define the main method which performs the primary functionality of the shader technique. In addition the technique can implement an event method to handle init and exit events. The main and event methods are described in previous sections. In addition the technique can contain other local helper methods used by the two primary technique methods.

```
Shader my_shader {
    input:
        Color c;
    output:
        Color result;
    technique software {
```

```
        void event(Event_type event);
        void main( );
    }
    technique hardware {
        void event (Event_type event);
        void main( );
    }
};
void my_shader::software::event(Event_type event) {
    ...
}
void my_shader::software::main( ) {
    ...
}
void my_shader::hardware::event(Event_type event) {
    ...
}
void my_shader::hardware::main( ) {
    ...
}
```

This example shows a shader that implements two separate techniques for hardware and software. The main and event methods of the techniques can be implemented inline in the class definition or separately as illustrated in this example.

A separate rule file accessible by the renderer at render time will inform the renderer how to select different techniques of a shader. A rule describes the criteria for selecting techniques based on the values of a predefined set of tokens. The token values describe the context in which the shader is to be used. Possible token values are:

Shading quality—Surface points that appear in reflections (that may be bumpy, blurry, or otherwise distorted) can often be shaded with a faster but lower quality version of a shader.

Shadow—This token value is true when shading a surface point in order to determine the transparency while tracing a shadow ray.

Energy—This token value is true when calling a light shader to determine the energy produced by the light to allow the renderer to sort rays by importance.

Hardware/Software—These token values indicate whether rendering is taking place in software on the CPU or in hardware on the GPU.

Shader version—The highest pixel shader version supported by the current hardware.

Hardware vender chipset—A string identifying the chipset of the current hardware. For example nv30 or r420.

Rules need to specify the name of the technique and an expression based on token values which defines when the particular technique should be selected. Multiple rules can match any particular set of token values. The process in which the renderer uses to select a technique for a shader is the following: first only rules for techniques present in the shader are considered. Out of these rules, each one is tested in order and the first matching rule selects the technique. If no rule matches then either an error/warning is produced or a default technique is used for the shader.

The following shows an example of a rule file:

```
beauty:          software and shade_quality > 1
fast:            software and shade_quality = 1
standard:        software
fancy_hardware:  hardware and shader_version >= 3.0
nvidia_hardware: hardware and chipset == "nv30"
basic_hardware:  hardware
```

The first three rules support software shaders that either have a single technique, called "standard," to handle all shading quality levels or shaders that have two techniques, "beauty" and "fast," to separately handle shading two different quality levels. Token values can also be available to shaders at runtime so the shader with a single standard technique could still perform optional calculations depending on the desired quality level.

The second three rules are an example of different techniques to support different classes of hardware. The fancy hardware technique might take advantage of functionality only available within shader model 3.0 or better. The nvidia_hardware technique may use features specific to NVIDIA's nv30 chipset. Finally, basic_hardware could be a catchall technique for handling generic hardware.

The language includes a mechanism to allow material shaders to express their result as a series of components instead of a single color value. This allows the components to be stored to separate image buffers for later compositing. Individual passes can also render a subset of all components and combine those with the remaining components that have been previously rendered.

When a shader factors its result into multiple components, it is possible for variations of the shader to be automatically generated that compute all components at the same time, or a subset of all components. When only a subset of components are being calculated, it's possible that some other computations on which the components don't depend on can be omitted from the automatically generated shader. For example if a shader used global illumination to compute indirect lighting and stored that indirect lighting in a separate layer, other layers could be re-rendered and composited with the indirect lighting layer without re-computing the global illumination. The same shader source code can be used for each pass, but the renderer will automatically generate individual shaders from the single source which compute only the necessary components. This obviously depends on having the source code available as well as a C++ compiler if any of the layers involve software rendering.

A material shader factors its result into components by declaring a separate output for each component. The names of the output variable define the names of layers in the current rendering.

```
shader Material_shader {
    input:
        ...
    output:
        Color diffuse_lighting;
        Color specular_lighting;
        Color indirect_lighting;
};
```

This example shows a material shader that specifies three components for diffuse, specular, and indirect lighting.

When multiple material shaders exist in a scene that factor their result into different layers, the total number of layers could be large. A user may not wish to allocate separate image buffers for each of these layers. A mechanism in the scene definition file will allow the user to specify compositing rules for combining layers into image buffers. The user will specify how many image buffers are to be created and for each buffer they would specify an expression which determines what color to place in that buffer when a pixel is rendered. The expression can be a function of layer values such as:

```
Image1 = indirect_lighting
Image2 = diffuse_lighting + specular_lighting
```

In this example, the three layers from the shader result structure in the previous example are routed to two image buffers.

The standard MetaSL library provides API functions to allow shaders to cast rays. Ray tracing can be computationally intensive; to optimize rendering times the renderer provides a mechanism to allow the delay of ray tracing so that multiple shader calls can be grouped together. This improves cache coherency and therefore overall shader performance. A shader has the option of calling a function to schedule a ray for ray tracing. This function returns immediately before the ray is actually traced allowing the shader and other shaders to continue processing.

When the shader schedules a ray trace, it must also provide a factor to help control the compositing of the result from the ray trace with the shader's result. In addition it will provide a weight factor that describes the significance of the ray to the final image to allow for importance driven sampling. The factor could for example be the result of a fresnel falloff function combined with a user specified reflection amount. Ray scheduling implicitly defines a layer. The expressions in the layer compositing rules can refer to the factors provided when scheduling a ray. For example:

```
Image1 = diffuse + reflectionFactor * reflection
```

There are some cases where a shader needs to act on the result of tracing a ray immediately and cannot schedule a ray for later compositing. For these cases, the synchronous ray trace functions will still be available.

Shader parameters are often set by users in an application using a graphical user interface (GUI). In order for users to interact with shaders in a GUI, an application must know some additional information about the shader parameters and the shader itself.

Informational attributes can be attached to shaders, parameters, or techniques by annotating the shader source code. Annotations are placed immediately after a shader, parameter, or technique declaration by enclosing a list of attributes in curly braces. An attribute instance is declared in a similar fashion to a class with optional parameters passed to its constructor. The syntax is:

```
{
    attribute_name(param1, param2, ... );
    attribute_name(param1, ... );
    ...
}
```

Note that parameters to attribute constructors must be literals, except for the special case of assigning state values as default values. Some standard attributes are predefined.

default value (object value)—Attached to parameters to specify a default value for the parameter.
   value—The value to be used as a default for the parameter. The type of this value is the same as the type of the parameter.

soft range (object min, object max)—Specifies a range of useful values for the parameter. This range can be exceeded if the user desires.
   min—The lower end of the range. The type of this value is the same as the type of the parameter.
   max—The upper end of the range. The type of this value is the same as the type of the parameter.

hard range (object min, object max)—Specifies bounds for the parameter that cannot be exceeded.
   min—The lower end of the range. The type of this value is the same as the type of the parameter.
   max—The upper end of the range. The type of this value is the same as the type of the parameter.

display name (string name)—The name of the shader, parameter, or technique that should be displayed to the user.
   name—The display name. This can be a more readable name than a typical variable name might be and can contain white space.

description (string description)—A description of a shader, parameter or technique.
   description—The description. An application can use this string to provide tool tips in a GUI.

hidden—Attached to a parameter to indicate that the parameter should not be shown in an application's GUI. This attribute has no parameters. If the attribute is present, the parameter is considered hidden otherwise it is not.

enum label (int value, string label)—Attached to a parameter that is an enum type. More than one instance of this attribute would likely be attached to an enum type parameter; one for each possible enum value.
   value—One of the possible enum values that the parameter can be set to.
   label—The label to use when presenting the enum value as an option in a GUI.

These attributes and other GUI related attributes can also be assigned to shaders through an external file. It may not always be desirable to clutter up the shader source code with a lot of annotations.

The following is an example of attributes in use:

```
shader mix_colors {
    input:
        Color color1 {
            default_value(Color(0,0,0,1));
            display_name("Color 1");
        };
        Color color2 {
            default_value(Color(1,1,1,1));
            display_name("Color 2");
        };
        Scalar mix {
            default_value(0.5);
            soft_range(0.0, 1.0);
            display_name("Mix amount");
        };
    output:
        Color result;
        void main( ) {
```

-continued

```
        result = color1*(1.0-mix) + color2*mix;
    }
} { Description("Blends two colors using a mix amount parameter") };
```

The following keywords are currently not used within MetaSL but are reserved for use in future versions: class; const; private; protected; public; template; this; typedef; union; virtual.

MetaSL includes a standard library of intrinsic functions. The following lists, which may be expanded without departing from the scope of the invention, do not include software-only methods, including lighting functions and ray-tracing functions.

Math functions: abs; acos; all; any; acos; asin; atan; ceil; clamp; cos; degrees; exp; exp2; oor; frac; lerp; log; log2; log10; max; min; mod; pow; radians; round; rsqrt; saturate; sign; sin; smoothstep; sqrt; step; tan.

Geometric functions: cross; distance; dot; faceforward; length; normalize; reflect; refract.

Texture map functions: texture lookup. The texture functions pose an interesting problem for unifying software and hardware shaders. Hardware texture functions usually come in several versions that allow projective texturing (the divide by w is built into the texture lookup), explicit filter width, and depth texture lookup with depth compare. Cg also has RECT versions of the texture lookup which use pixel coordinates of the texture instead of normalized coordinates. Thus, functionality may be provided in both hardware and software. However, it may be desirable to provide a software-only texture lookup with elliptical filtering.

Derivatives: ddx; ddy; fwidth.

Figure 67:
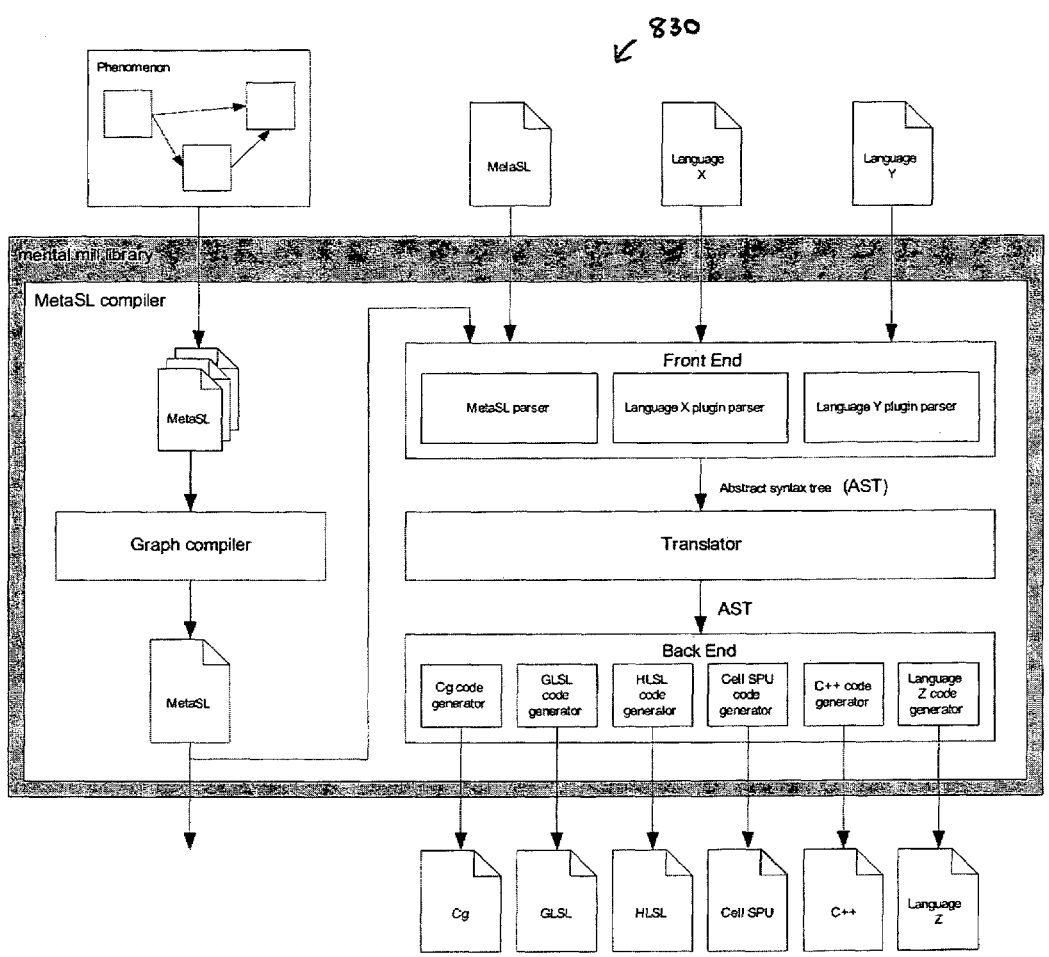
FIG. 67 depicts a diagram of the MetaSL compiler.

FIG. 67 shows a diagram illustrating the architecture 830 of the MetaSL compiler according to a further aspect of the invention. The MetaSL compiler handles both conversion of MetaSL shaders to target formats and the compilation of shader graphs into single shaders. The architecture of the MetaSL compiler is extendable by plug-ins, which allows it to support future language targets as well as different input syntaxes.

The compiler front end supports pluggable parser modules to support different input languages. While MetaSL is expected to be the primary input language, other languages can be supported through an extension. This will allow for example, an existing code base of shaders to be utilized if a parser is created for the language the shaders were written in.

The compiler back end is also extensible by plug-in modules. The MetaSL compiler handles much of the processing and provides the back-end plug-in with a high level representation of the shader, which it can use to generate shader code. Support is planned for several languages and platforms currently in use, however in the future new platforms will almost certainly appear. A major benefit of the mill technology is to insulate shaders from these changes. As new platforms or languages become available, new back-end plug-in modules can be implemented to support these targets.

The MetaSL compiler currently targets high level languages, however the potential exists to target GPUs directly and generate machine code from the high level representation. This would allow particular hardware to take advantage of unique optimizations available only because the code generator is working from this high level representation directly and bypassing the native compiler.

Another component of the mill's MetaSL compiler is the Phenomenon shader graph compiler. The graph compiler processes shader graphs and compiles them into single shaders. These shaders avoid the overhead of shader attachments which makes it possible to build graphs from a greater number of simple nodes rather than a few complex nodes. This makes the internal structure of a shader more accessible to users that are not experienced programmers.

Figure 68:
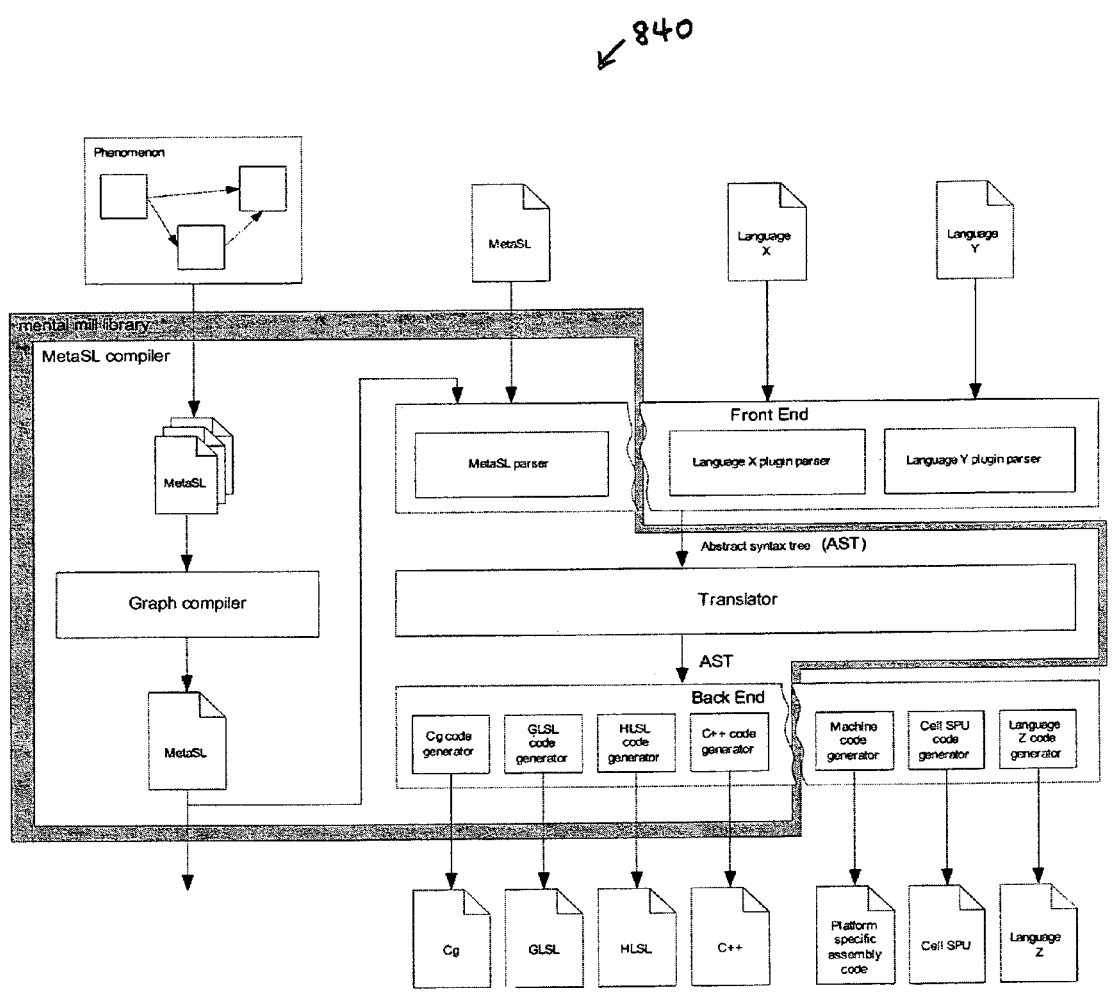
FIG. 68 depicts a diagram of the MetaSL compiler according to an alternative aspect of the invention.

FIG. 68 shows a diagram illustrating the architecture 840 of the MetaSL compiler according to an alternative aspect of the invention.

The following example shows a phong shader implemented in MetaSL.

```
shader Phong {
    input:
        Color ambience;
        Color ambient;
        Color diffuse;
        Color specular;
        Scalar exponent;
    output:
        Color result;
        void main( ) {
            result = ambience * ambient;
            Light_iterator light;
            foreach (light) {
                result += light.color * max(0,light.dot_nl);
                result += light.color * specular *
                    phong_specular(light.direction, exponent);
            }
        }
};
```

The phong_specular function called in this example is a built-in function provided by MetaSL. State parameters such as surface normal and ray direction are implicitly passed to the function.

The following example shows a simple checker texture shader implemented in MetaSL.

```
shader Checker {
    input:
        Color color1;
        Color color2;
        Vector2 coords;
        Vector2 size;
    output:
        Color result;
        void main( ) {
            Vector2 m = fmod(abs(coords), size)/size;
            Vector2b b = m < 0.5f;
            result = lerp(color1, color2, b.x ^ b.y);
        }
};
```

D. MetaSL Shader Debugger

There is now provided a description of the mental mill MetaSL shader debugger application, which provides an implementation of the concept of images-based shader debugging.

Figure 69:
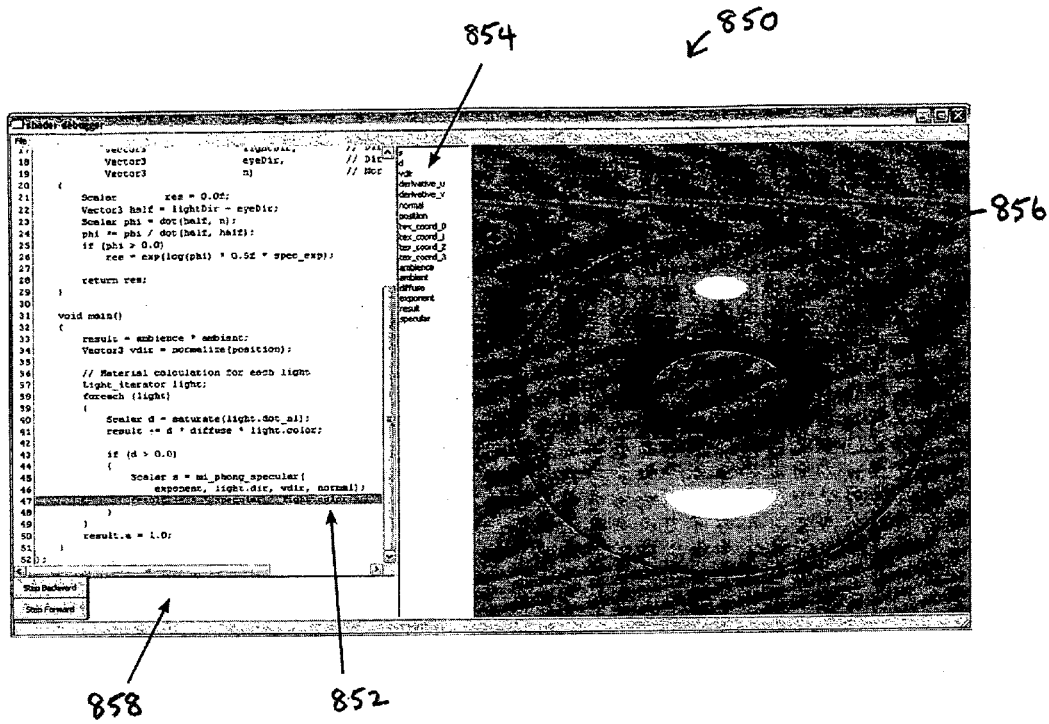
FIG. 69 depicts a screenshot of a debugger screen according to a further aspect of the invention.

FIG. 69 shows a screenshot of a debugger UI 850 according to a further aspect of the invention. The shader debugger UI 850 comprises a code view panel 852 that displays the MetaSL code for the currently loaded shader, a variable list panel 854 that displays all variables in scope at the selected statement, and a 3D view window 856 that displays the values of the selected variable, or the result of the entire shader if no variable is selected. There is also provided an error display window 858.

Figure 70:
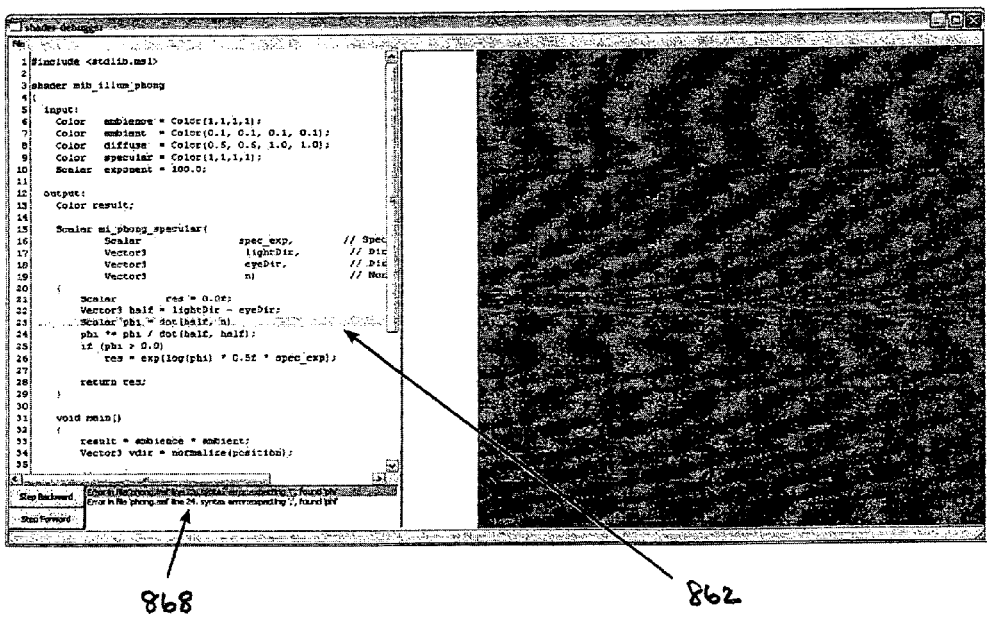
FIG. 70 depicts a screenshot of a debugger screen if there are compile errors when loading a shader.

FIG. 70 shows a screenshot of the debugger UI 860 that appears when loading a shader, if there are compile errors they are listed in error display window 868. Selecting an error in the list highlights the line of code 862 where the error occurred. A shader file is reloaded by pressing the F5 key.

Figure 71:
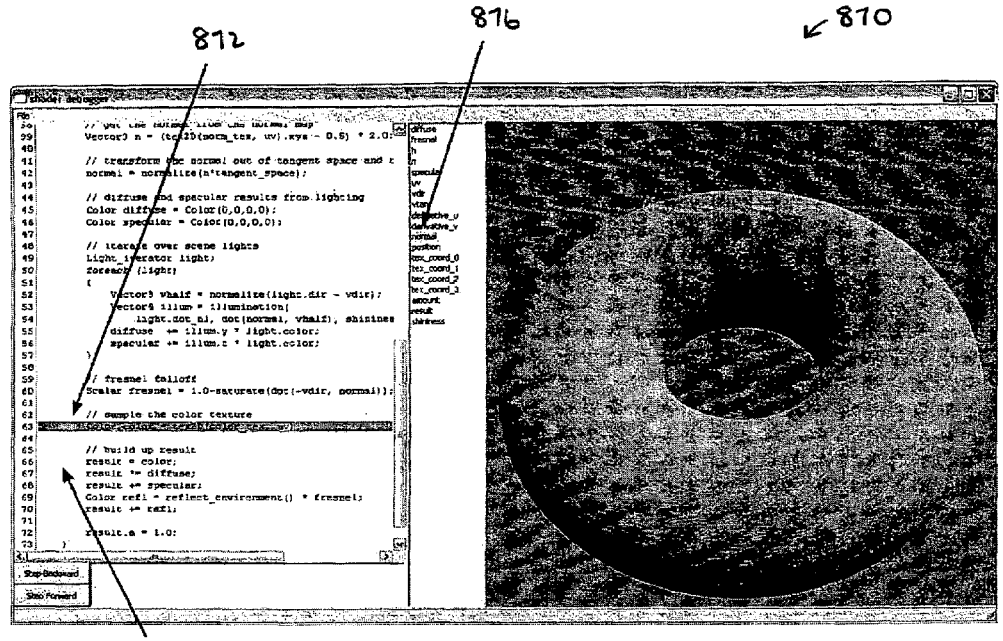
FIG. 71 depicts a screenshot of a debugger screen once a shader has been successfully loaded and compiled without errors, at which point debugging can begin by selecting a statement.

FIG. 71 shows a screenshot of the debugger UI 870 that appears once a shader is successfully loaded and compiles without errors. Debugging begins by selecting a statement 872 in the code view panel 874. Selected statements are shown by a light green highlight along the line of the selected statement. The variable window displays variables 876 that are in scope for the selected statement.

As shown in FIG. 71, a statement is selected by clicking on the line of code click on a variable to display its value in the render window. In the FIG. 71 screenshot 870, the "normal" variable is selected (which is of type Vector3). The vector values are mapped to the respective colors. Lines that are statements have a white background. Lines that are not statements are gray.

Figure 72:
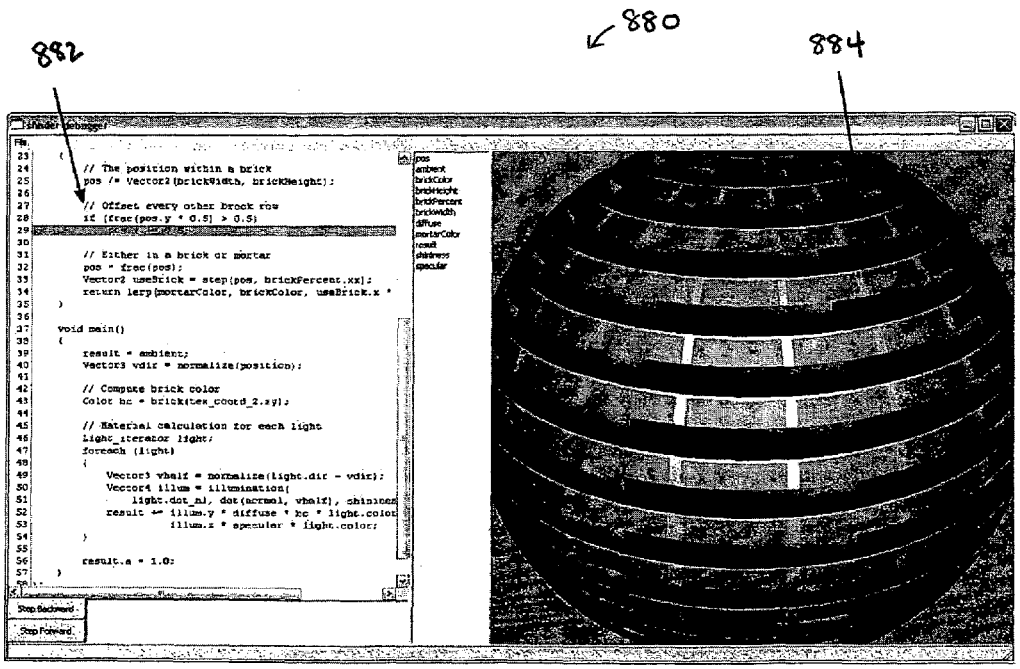
FIG. 72 depicts a screenshot of a debugger screen when the selected statement is conditional.

FIG. 72 shows a screenshot of the debugger screen 880, illustrating how conditional statements and loops are handled. Conditional statements and loops may not be executed for some data points, and therefore variables can not be viewed for certain data points when the selected statement is in a conditional clause.

As shown in FIG. 72, when the selected statement 882 is in a conditional, only pixels 884 where the conditional value evaluated to true display the debug value. The rest of the pixels display the original result.

Figures 73, 74:
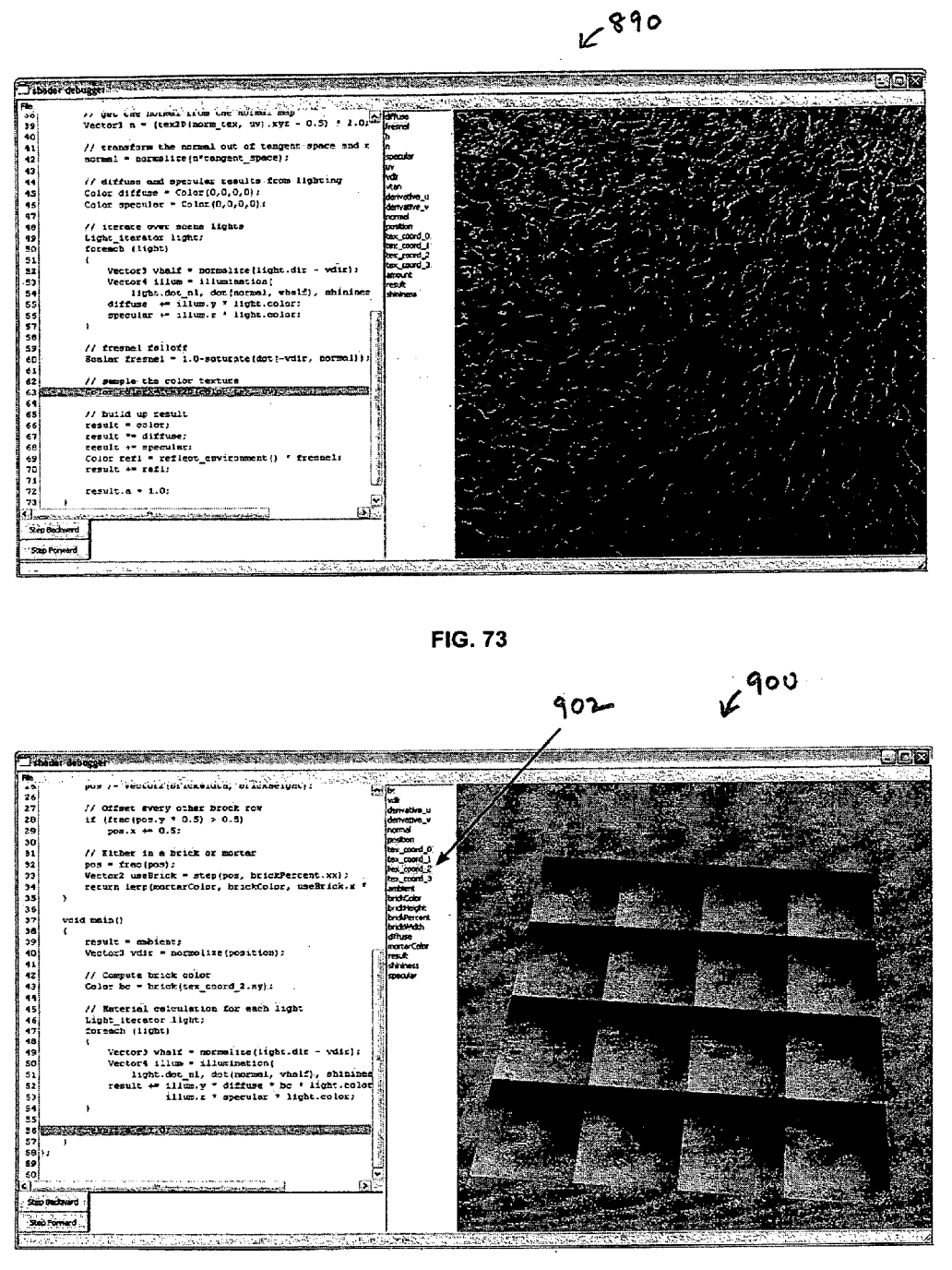

FIG. 73 shows a screenshot of a debugger screen 890, illustrating what happens when the selected statement is in a loop. In that case, the values displayed represent the first pass through the loop. A loop counter may be added to allow the user to specify which pass through the loop they want to debug.

The user can step through statements by using the left and right arrow keys to move forward and backward through the lines of code. The up and down arrow keys move through the variable list.

The space bar cycles through sample object types in the viewport.

FIG. 74 shows a screenshot of a debugger screen 900 showing how texture coordinates are handled. The user can select and view texture coordinates as shown in this example. The prototype provides four sets of texture coordinate, each tiled twice as many times as the previous set. U and V derivative vectors are also supplied.

When vector values are mapped to colors, they are set to wrap when their value exceeds one. In this example, the selected texture coordinates repeat four times, which is clearly visible when viewing the variable 902 in the debugger.

In FIG. 74, sets of texture coordinates are available with tiling in multiples of 2.

Figure 75:
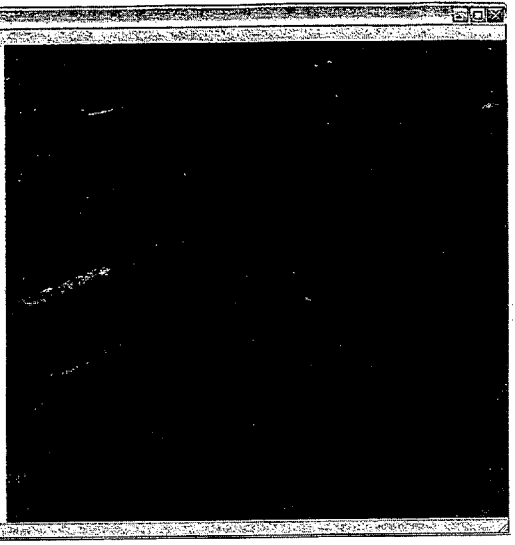
FIG. 75 depicts a screenshot of a debugger screen, in which parallax mapping produces the illusion of depth by deforming texture coordinates.
Figure 76:
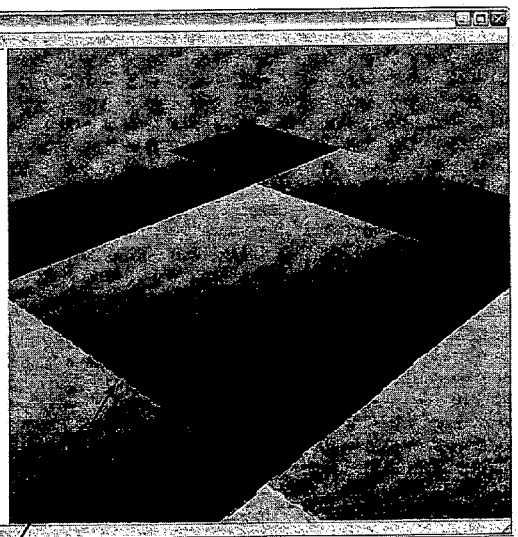
FIG. 76 depicts a screenshot of a debugger screen, in which the offset of texture coordinates can be seen when looking at texture coordinates in the debugger.

FIG. 75 shows a screenshot of a debugger screen 910, in which parallax mapping produces the illusion of depth by deforming texture coordinates. In the FIG. 76 screenshot 920, the offset of the texture coordinates can be clearly seen when looking at the texture coordinates in the debugger.

Figure 77:
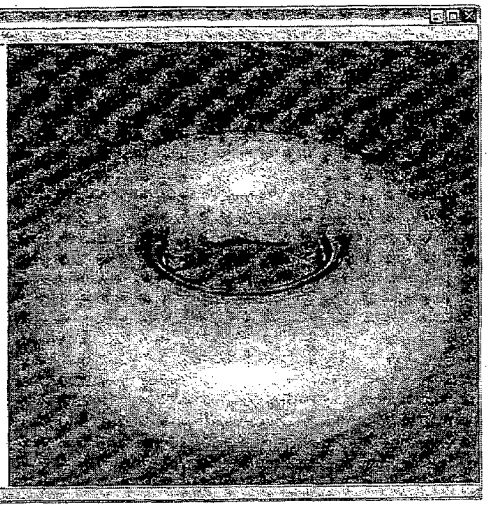
FIGS. 77 and 78 show screenshots of a debugger screen illustrating other shader examples.
Figure 78:
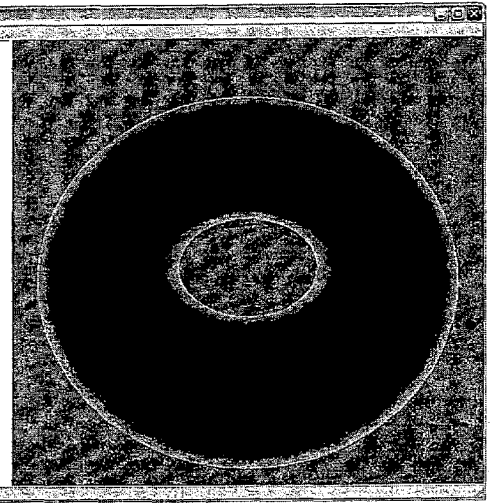

FIGS. 77 and 78 are screenshots of debugger screens 930 and 940, illustrating other shader examples.

CONCLUSION

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

We claim:

1. In a computer graphics system for generating an image of a scene from a representation to which at least one instantiated phenomenon has been attached, the instantiated phenomenon comprising an encapsulated shader DAG comprising at least one shader node, the improvement comprising:
    a metanode environment operable for the creation of metanodes, the metanodes comprising component shaders that can be combined to build more complex shaders,
    a graphical user interface (GUI) in communication with the metanode environment and operable to manage the metanode environment to enable a user to construct shader graphs and phenomena using the metanode environment, and
    a software language useable by a human operator and operable to manage the metanode environment, implement shaders and unify discrete shading applications,
    wherein:
        the software language is configurable as a superset of a plurality of selected shader languages for selected hardware platforms, and
        the software language is operable to enable a compiler function to generate, from a single, re-usable description of a phenomenon expressed in the software language, optimized software code for a selected hardware platform in a selected shader language.

2. In the computer graphics system of claim 1, the further improvement comprising:
    converting the optimized software code for the selected hardware platform and selected shader language to machine code for selected integrated circuit instantiations, using a native compiler function for the selected shader language.

3. In a computer graphics system for enabling an operator to create a phenomenon, the phenomenon comprising an encapsulated shader DAG comprising at least one shader node, the computer graphics system comprising (A) a base shader node database configured to store a plurality of base shader nodes, each base shader node including a shader, and (B) a phenomenon creator configured to enable the operator to interconnect the base shader nodes from the base shader node database into a DAG, the phenomenon creator verifying that interconnections among the base shader nodes as provided by the operator comprise a DAG, the improvement wherein the phenomenon creator comprises:
    a metanode environment operable for the creation of metanodes, the metanodes comprising component shaders that can be combined to build more complex shaders, and
    a graphical user interface (GUI) in communication with the metanode environment and operable to manage the metanode environment to enable a user to construct shader graphs and phenomena using the metanode environment, and a software language useable by the operator and operable to manage the metanode environment, implement shaders and unify discrete shading applications, the software language configurable as a superset of a plurality of selected shader languages for selected hardware platforms, and operable to enable a compiler function to generate, from a single, re-usable description of a phenomenon expressed in the software language, optimized software code for a selected hardware platform in a selected shader language.

4. In the computer graphics system of claim 3, the further improvement in which the phenomenon creator stores the phenomenon created by the operator in a phenomenon database.

5. In the computer graphics system of claim 3, the further improvement in which the phenomenon creator is further configured to enable the operator to interconnect the base shader nodes in phenomena comprising a plurality of cooperating DAGs, in which a shader node in one of the cooperating DAGs, when used during rendering of an image of a scene, provides at least one value which is used in connection with another of the cooperating DAGs.

6. In the computer graphics system of claim 3, the further improvement comprising:
performance analysis of shaders via profiling, the profiling including a graphical representation on the GUI.

7. In the computer graphics system of claim 6, the further improvement wherein shader performance for a given node can be analyzed relative to a shader graph in which the node resides, such that the performance results are relative to input values driving the node.

8. In the computer graphics system of claim 6, the further improvement wherein profiling information is provided at the node level for nodes that are part of a graph or phenomenon, and at the statement level for computer language software code contained in a metanode.

9. In the computer graphics system of claim 6, the further improvement wherein performance information at a given granularity is normalized to the overall performance cost of a node, the associated shader, or the cost to render an entire scene with multiple shaders.

10. In the computer graphics system of claim 6, the further improvement wherein execution time of a computer software code statement within a metanode can be expressed as a percentage of the total execution time of the metanode or the total execution time of the entire shader if the metanode is a member of a graph.

11. In the computer graphics system of claim 6, the further improvement wherein graphical representation of performance can be provided using multiple visualization methods.

12. In the computer graphics system of claim 11, the further improvement wherein one method is to present normalized performance cost information by mapping a percentage value associated with the normalized performance cost information to a color gradient.

13. In the computer graphics system of claim 12, the further improvement wherein the mapping comprises presenting an operator-discernable color bar adjacent to each computer software code statement to be evaluated.

14. In the computer graphics system of claim 11, the further improvement wherein the graphical representation of the performance results updates dynamically in accordance with the progress of an animated scene.

15. In the computer graphics system of claim 11, the further improvement wherein the visualization methods comprise displaying a graph of performance results with respect to a range of values of a given input parameter.

16. In the computer graphics system of claim 11, the further improvement wherein the visualization methods comprise displaying performance results in tabular form.

17. In the computer graphics system of claim 11, the further improvement wherein the visualization methods comprise displaying performance timings of each node of a phenomenon with respect to the overall performance cost of an entire shader.

18. In the computer graphics system of claim 3, the further improvement wherein one of the shaders is a bidirectional reflectance distribution function (BRDF) shader type that enables a surface illumination model to be abstracted and rendered.

19. In the computer graphics system of claim 18, the further improvement comprising employing multiple illumination models represented by respective ones of a plurality of BRDF nodes.

20. In the computer graphics system of claim 19, the further improvement comprising enabling the scaling of BRDF values by a scalar or color.

21. In the computer graphics system of claim 20, the further improvement comprising enabling the blending of multiple illumination models represented by respective ones of a plurality of BRDF nodes.

22. In the computer graphics system of claim 18, the further improvement comprising the utilization of an acquired BRDF represented by data generated by a sensing device.

23. In a computer graphics system for enabling an operator to generate, from a phenomenon, an instantiated phenomenon, the phenomenon comprising an encapsulated shader DAG comprising at least one shader DAG including at least one shader node, the computer graphics system comprising (A) a phenomenon database configured to store the phenomenon, and (B) a phenomenon editor configured to enable the operator to select the phenomenon and provide a value for at least one parameter associated with the at least one shader node, the improvement wherein the phenomenon editor comprises:
a metanode environment operable for the creation of metanodes, the metanodes comprising component shaders that can be combined to build more complex shaders, and
a graphical user interface (GUI) in communication with the metanode environment and operable to manage the metanode environment to enable a user to construct shader graphs and phenomena using the metanode environment, and
a software language useable by the operator and operable to manage the metanode environment, implement shaders and unify discrete shading applications, the software language configurable as a superset of a plurality of selected shader languages for selected hardware platforms, and operable to enable a compiler function to generate, from a single, re-usable description of a phenomenon expressed in the software language, optimized software code for a selected hardware platform in a selected shader language.

24. In a computer graphics system for generating an image of a scene from a representation to which at least one instantiated phenomenon has been attached, the instantiated phenomenon comprising an encapsulated shader DAG comprising at least one shader node, the computer graphics system comprising (A) a pre-processor configured to determine whether the at least one instantiated phenomenon requires a pre-processing operation in connection with the representation, and, if so, performing the pre-processing operation to generate a pre-processed representation of the scene, and (B)

a renderer configured to generate a rendered image from the pre-processed representation of the scene, the improvement comprising:

a metanode environment operable for the creation of metanodes, the metanodes comprising component shaders that can be combined to build more complex shaders, and a graphical user interface (GUI) in communication with the metanode environment and operable to manage the metanode environment to enable a user to construct shader graphs and phenomena using the metanode environment, and a software language useable by a human operator and operable to manage the metanode environment, implement shaders and unify discrete shading applications, the software language configurable as a superset of a plurality of selected shader languages for selected hardware platforms, and operable to enable a compiler function to generate, from a single, re-usable description of a phenomenon expressed in the software language, optimized software code for a selected hardware platform in a selected shader language.

25. In the computer graphics system of claim 24, the further improvement in which at least one type of shader node is of a geometry shader node type, and the pre-processor is configured to perform the pre-processing operation if the at least one shader node is of the geometry shader node type to define geometry for the scene.

26. In the computer graphics system of claim 24, the further improvement in which at least one type of shader node is of a photon shader node type, the further improvement in which the pre-processor is configured to perform the pre-processing operation if the at least one shader node is of the photon shader node type to control the paths of photons in the scene and the characteristics of interaction of photons with surfaces of objects in the scene.

27. In the computer graphics system of claim 24, the further improvement in which at least one type of shader node is of a photon emitter shader node type, the pre-processor being configured to perform the pre-processing operation if the at least one shader node is of the photon emitter shader node type to simulate generation of photons by a light source illuminating the scene.

28. In the computer graphics system of claim 24, the further improvement in which at least one type of shader node is of a photon volume shader node type, the pre-processor being configured to perform the pre-processing operation if the at least one shader node is of the photon volume shader node type to simulate interaction of photons from a light source with a three-dimensional volume of space in the scene.

29. In the computer graphics system of claim 24, the further improvement comprising a post-processor configured to determine whether the at least one instantiated phenomenon requires a post-processing operation in connection with the representation and, if so, performing the post-processing operation.

30. In the computer graphics system of claim 24, the further improvement in which the at least one shader node is of an output shader node type, the post-processor being configured to perform the post-processing operation if the at least one shader node is of the output shader node type.

31. In the computer graphics system of claim 30, the further improvement in which the rendered image comprises a plurality of pixels each associated with a pixel value, the post-processor being configured to perform the post-processing operation in connection with the pixel values.

32. In a computer graphics system for generating an image of a scene from a representation to which at least one instantiated phenomenon has been attached, the instantiated phenomenon comprising an encapsulated shader DAG comprising at least one shader node, the improvement comprising:

a metanode environment operable for the creation of metanodes, the metanodes comprising component shaders that can be combined to build more complex shaders, a graphical user interface (GUI) in communication with the metanode environment and operable to manage the metanode environment to enable a user to construct shader graphs and phenomena using the metanode environment, a software language useable by a human operator and operable to manage the metanode environment, implement shaders and unify discrete shading applications, the software language configurable as a superset of a plurality of selected shader languages for selected hardware platforms, and operable to enable a compiler function to generate, from a single, re-usable description of a phenomenon expressed in the software language, optimized software code for a selected hardware platform in a selected shader language, at least one GUI library usable in connection with the metanode environment to generate a GUI operable to construct shader graphs and phenomena, an interactive, visual, real-time debugging environment in communication with the GUI, operable to (1) enable the user to detect and correct potential flaws in shaders, and (2) provide a viewing window in which a test scene with a shader, metanode, or phenomenon under test is constantly rendered, and a facility in communication with the compiler function, operable to convert the optimized software code for the selected hardware platform and selected shader language to machine code for selected integrated circuit instantiations, using a native compiler function for the selected shader language.

33. In a computer graphics system for generating an image of a scene from a representation to which at least one instantiated phenomenon has been attached, the instantiated phenomenon comprising an encapsulated shader DAG comprising at least one shader node, a method of enabling the generation of an image of a scene, the method comprising:

configuring a metanode environment operable for the creation of metanodes, the metanodes comprising component shaders that can be combined to build more complex shaders, configuring a graphical user interface (GUI) in communication with the metanode environment and operable to manage the metanode environment to enable a user to construct shader graphs and phenomena using the metanode environment, providing a software language as an interface useable by a human operator and operable to manage the metanode environment, implement shaders and unify discrete shading applications, the software language configurable as a superset of a plurality of selected shader languages for selected hardware platforms, and operable to enable a compiler function to generate, from a single, re-usable description of a phenomenon expressed in the software language, optimized software code for a selected hardware platform in a selected shader language, providing at least one GUI library usable in connection with the metanode environment to generate a GUI operable to construct shader graphs and phenomena, configuring an interactive, visual, real-time debugging environment in communication with the GUI, operable to (1) enable the user to detect and correct potential flaws in shaders, and (2) provide a viewing window in which a test scene with a shader, metanode, or phenomenon under test is constantly rendered, and configuring a facility in communication with the compiler function, operable to convert the optimized software code for the selected hardware platform and selected shader language to machine code for selected integrated circuit instantiations, using a native compiler function for the selected shader language.

* * * * *